(12) United States Patent
Donati et al.

(10) Patent No.: US 7,007,099 B1
(45) Date of Patent: Feb. 28, 2006

(54) HIGH SPEED MULTI-PORT SERIAL-TO-PCI BUS INTERFACE

(75) Inventors: Joseph Steven Donati, River Grove, IL (US); Minerva Elena Gordon, Aurora, IL (US); Steven Craig Martin, Naperville, IL (US); Kathy Louise Schleicher, Winfield, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/563,245

(22) Filed: May 1, 2000

Related U.S. Application Data

(60) Provisional application No. 60/132,306, filed on May 3, 1999.

(51) Int. Cl.
*G06F 15/16* (2006.01)

(52) U.S. Cl. ...................................... 709/237; 370/229

(58) Field of Classification Search ................ 709/237, 709/238, 212–215; 711/147; 370/229
See application file for complete search history.

(56) References Cited

U.S. PATENT DOCUMENTS

| | | | | |
|---|---|---|---|---|
| 5,283,869 A | * | 2/1994 | Adams et al. | 395/200 |
| 5,333,269 A | * | 7/1994 | Calvignac et al. | 709/215 |
| 5,590,369 A | * | 12/1996 | Burgess et al. | 395/800 |
| 5,634,035 A | * | 5/1997 | Gheorghiu et al. | 711/147 |
| 5,638,370 A | * | 6/1997 | Seconi et al. | 370/466 |
| 6,226,706 B1 | * | 5/2001 | Kim | 710/131 |
| 6,388,989 B1 | * | 5/2002 | Malhotra | 370/229 |
| 6,446,232 B1 | * | 9/2002 | Chan et al. | 714/746 |

* cited by examiner

*Primary Examiner*—Dung C. Dinh
*Assistant Examiner*—Aaron Strange

(57) ABSTRACT

An HDLC formatter and a message processing core exchange messages over a high speed message exchange interface. The interface includes a memory shared by the HDLC formatter and the message processing core. A handshaking arrangement is used to coordinate message storage and retrieval in the shared memory by the HDLC formatter and the message processing core with minimal utilization of processing resources of the message processing core. This handshaking coordination, together with the use of a message buffer accessed by the HDLC formatter to buffer channelized messages exchanged with the message processing core, facilitates message processing on multiple serial links (e.g., 3) over multiple timeslots (e.g., 256).

19 Claims, 47 Drawing Sheets

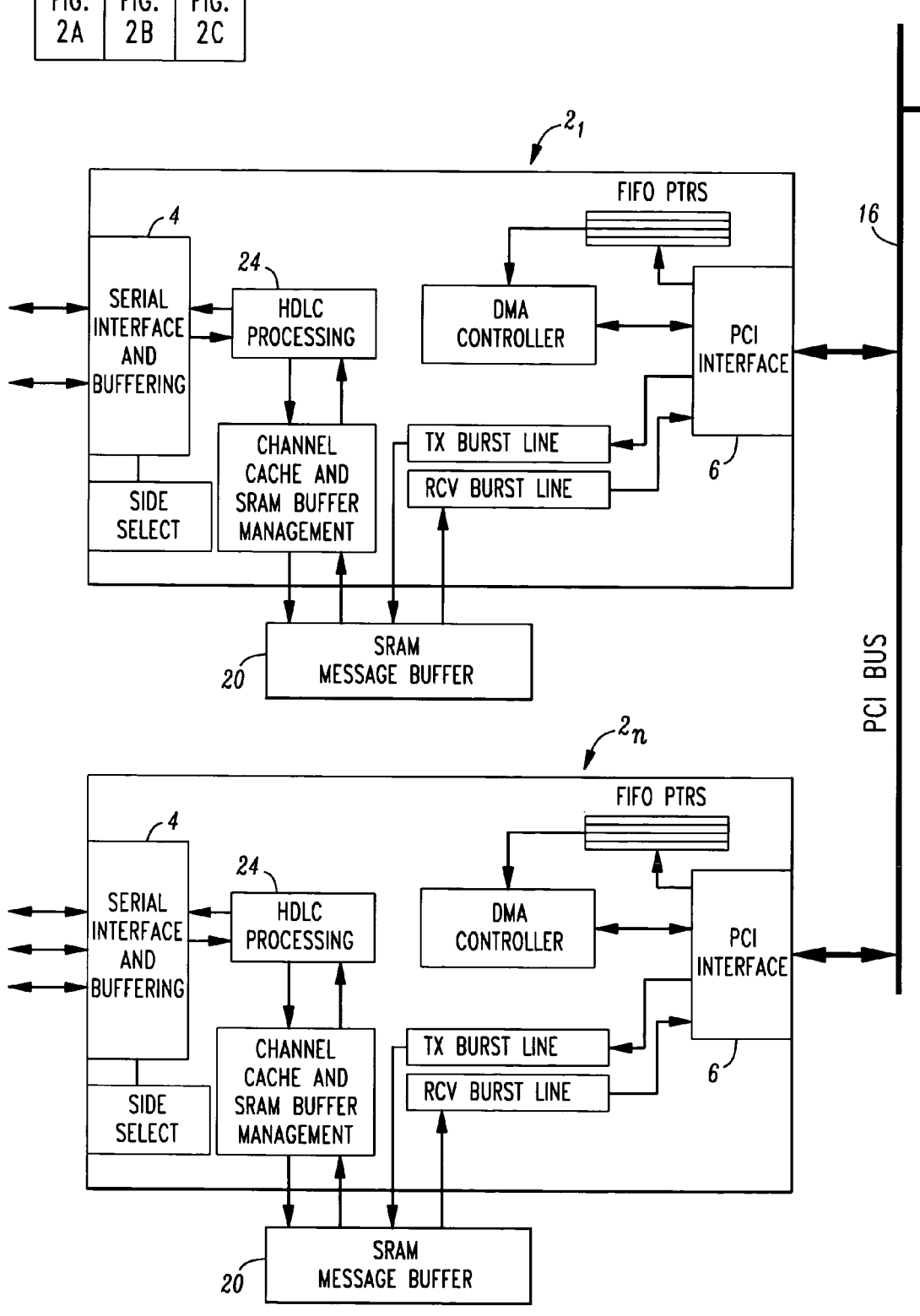

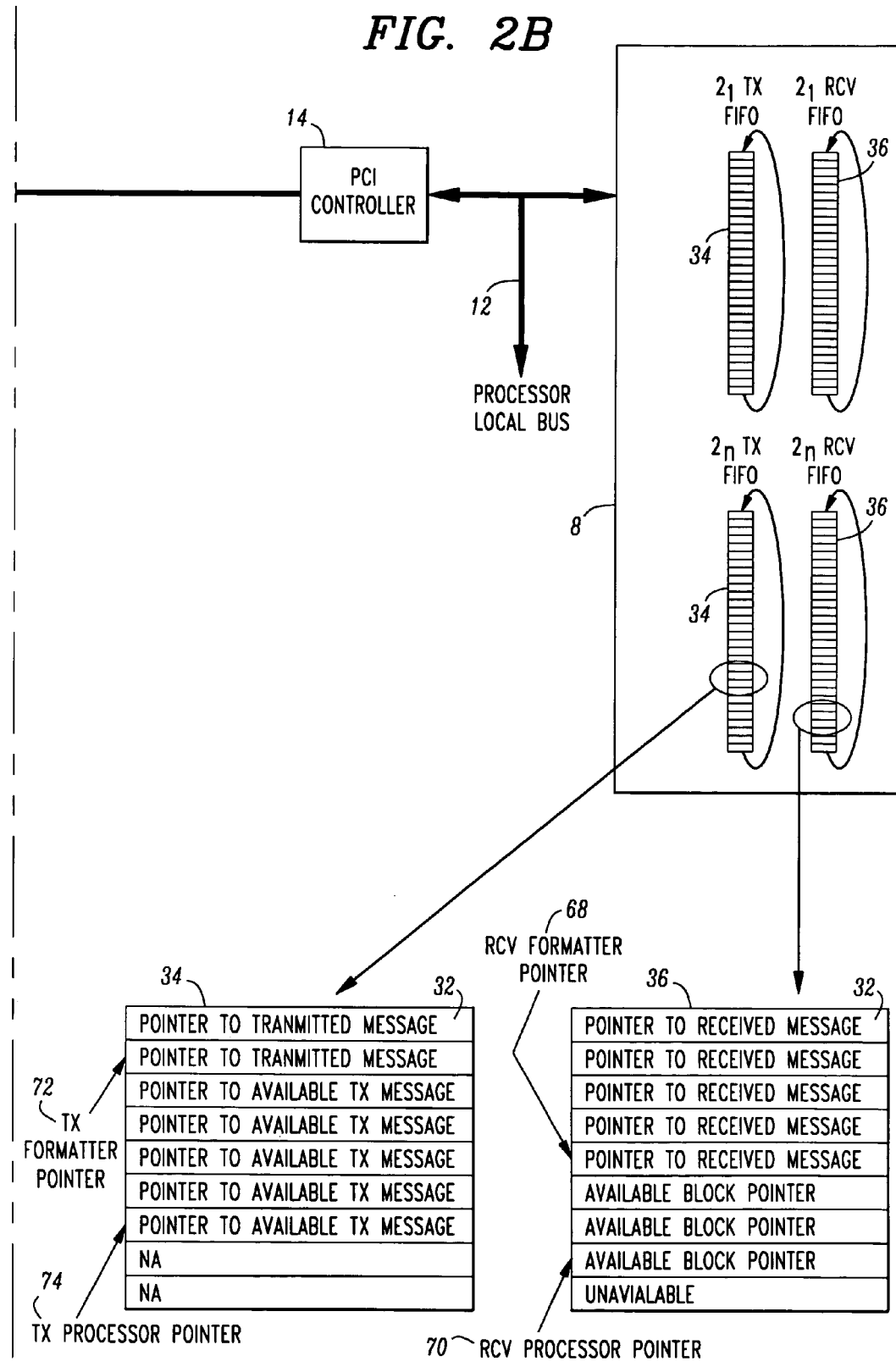

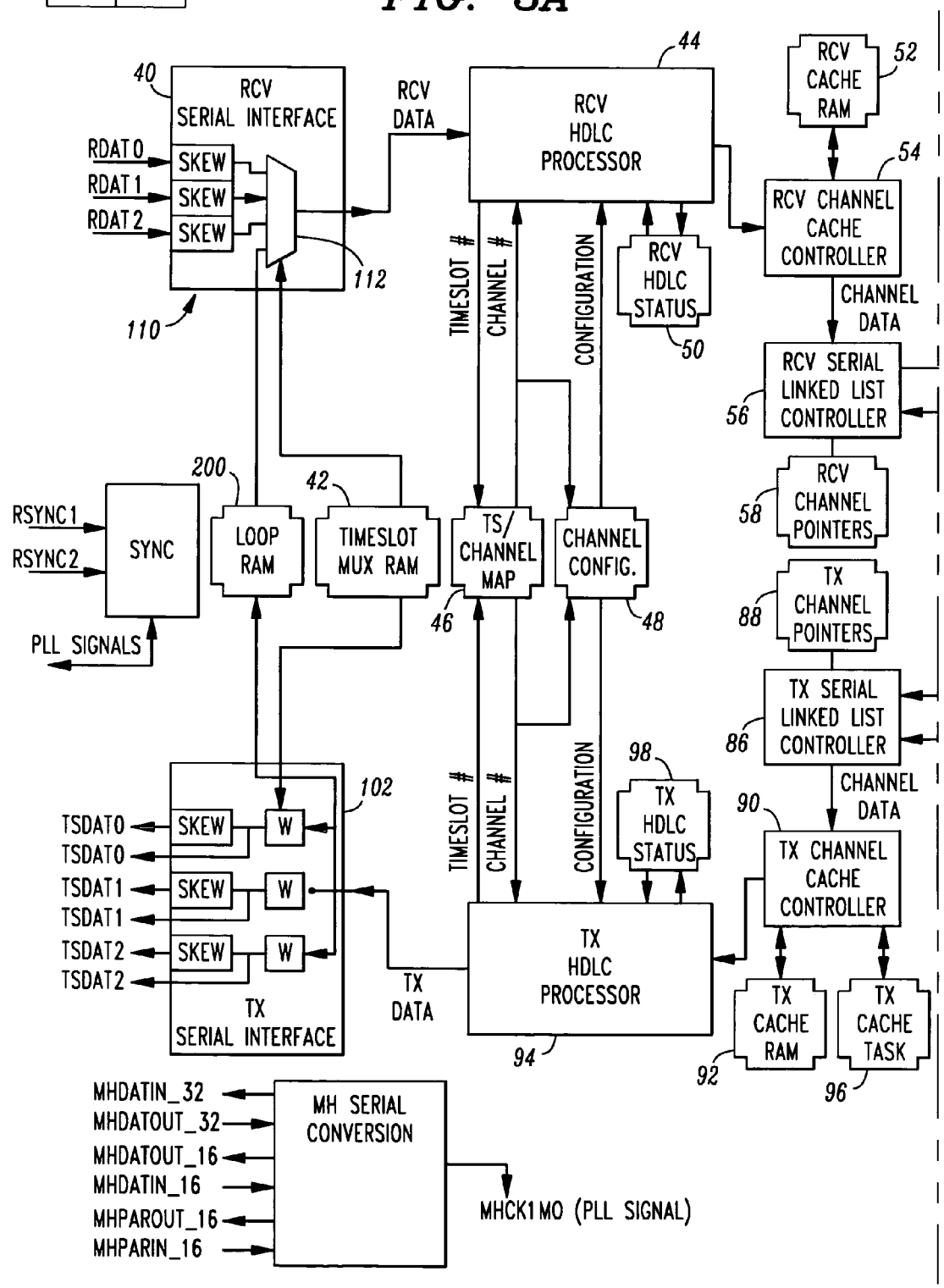

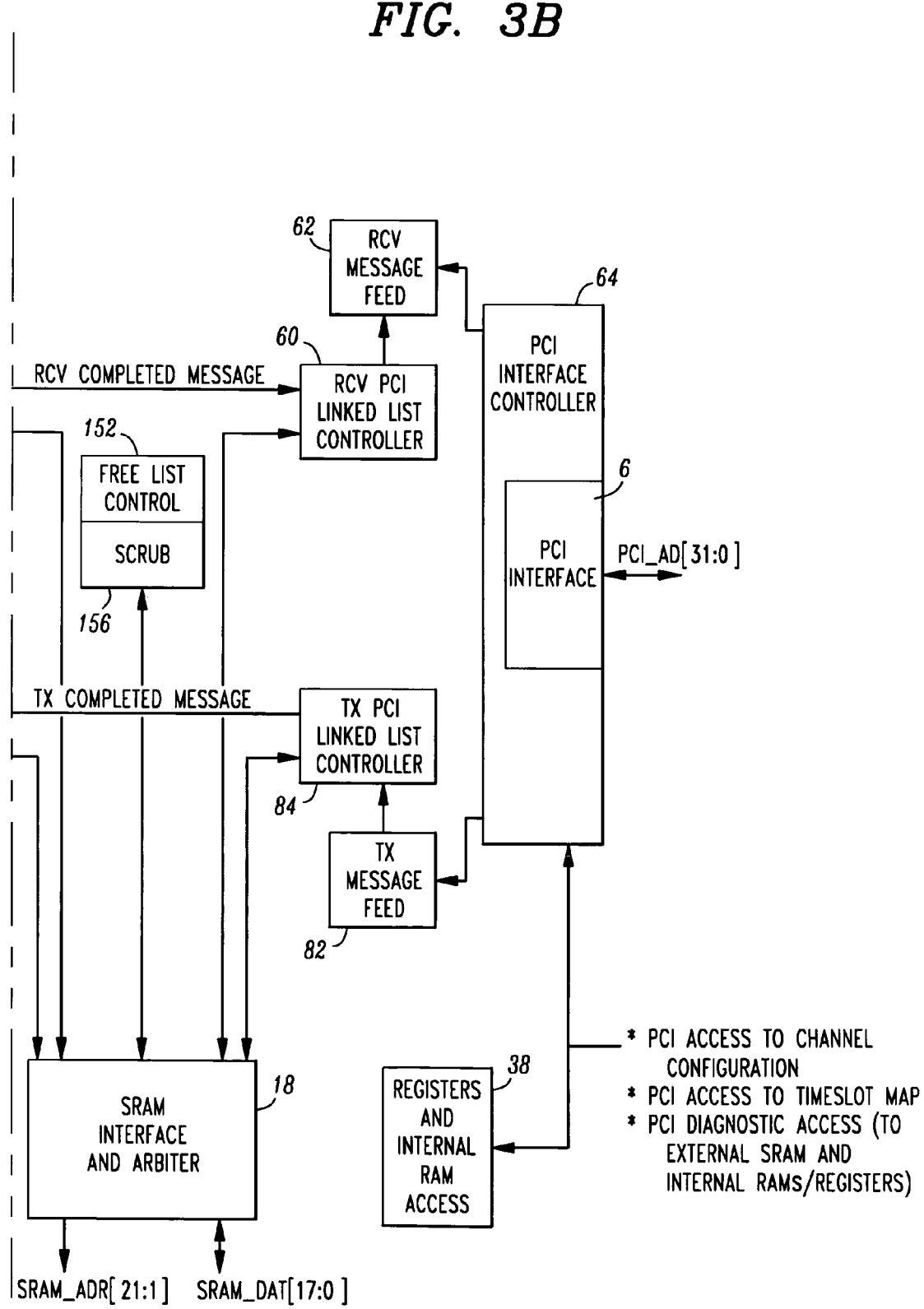

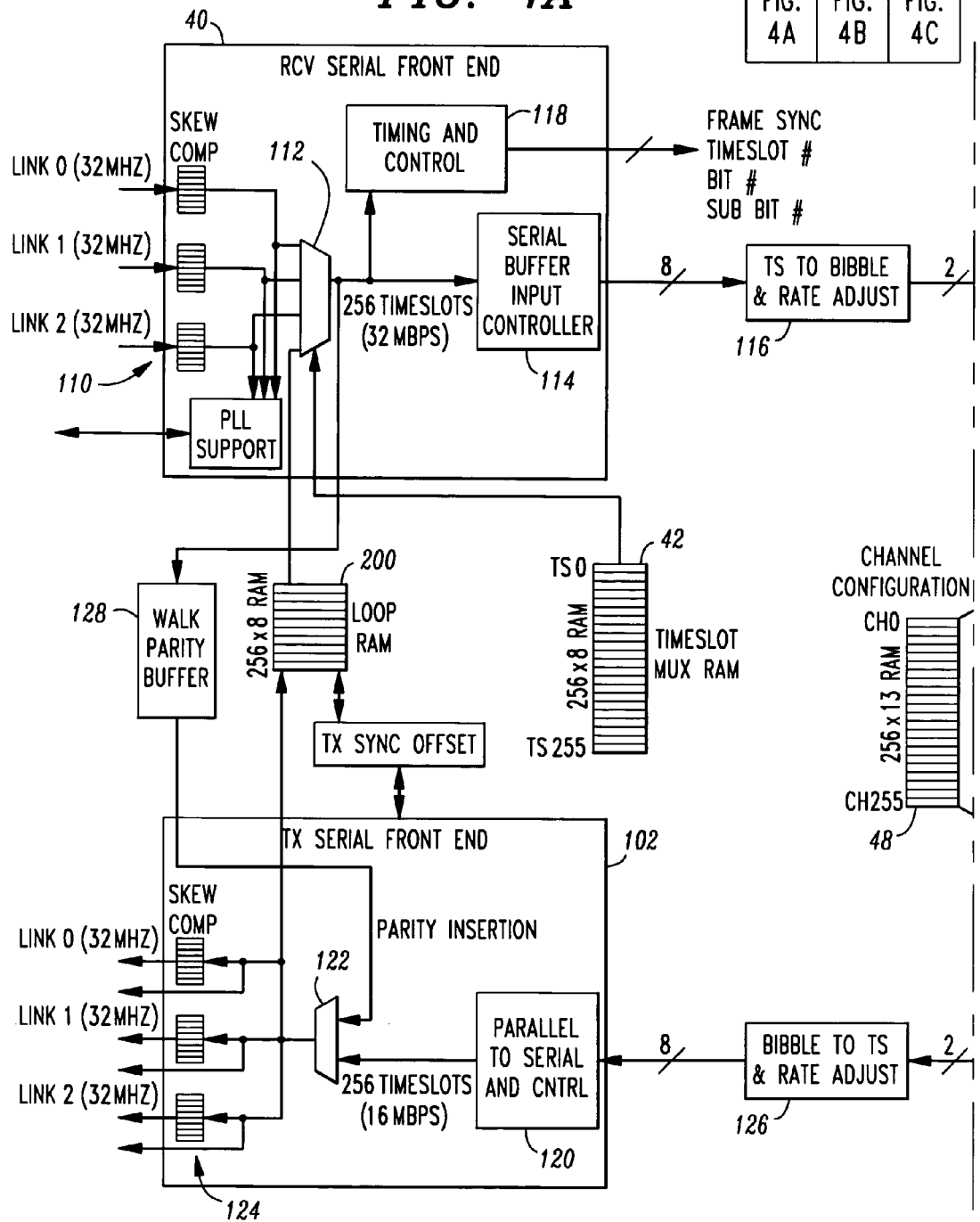

DRAM MESSAGE FORMAT

DRAM MESSAGE HEADER FORMAT
(TX AND RCV)

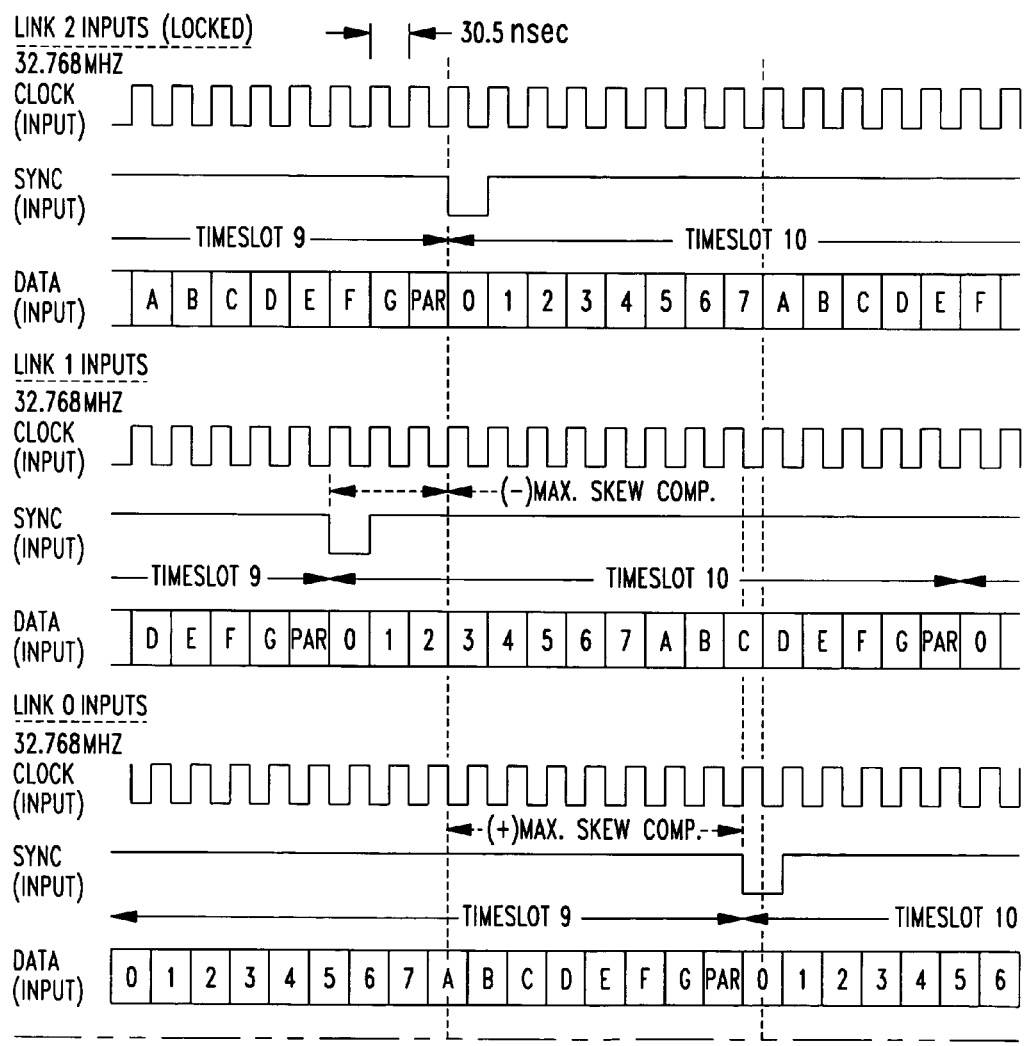

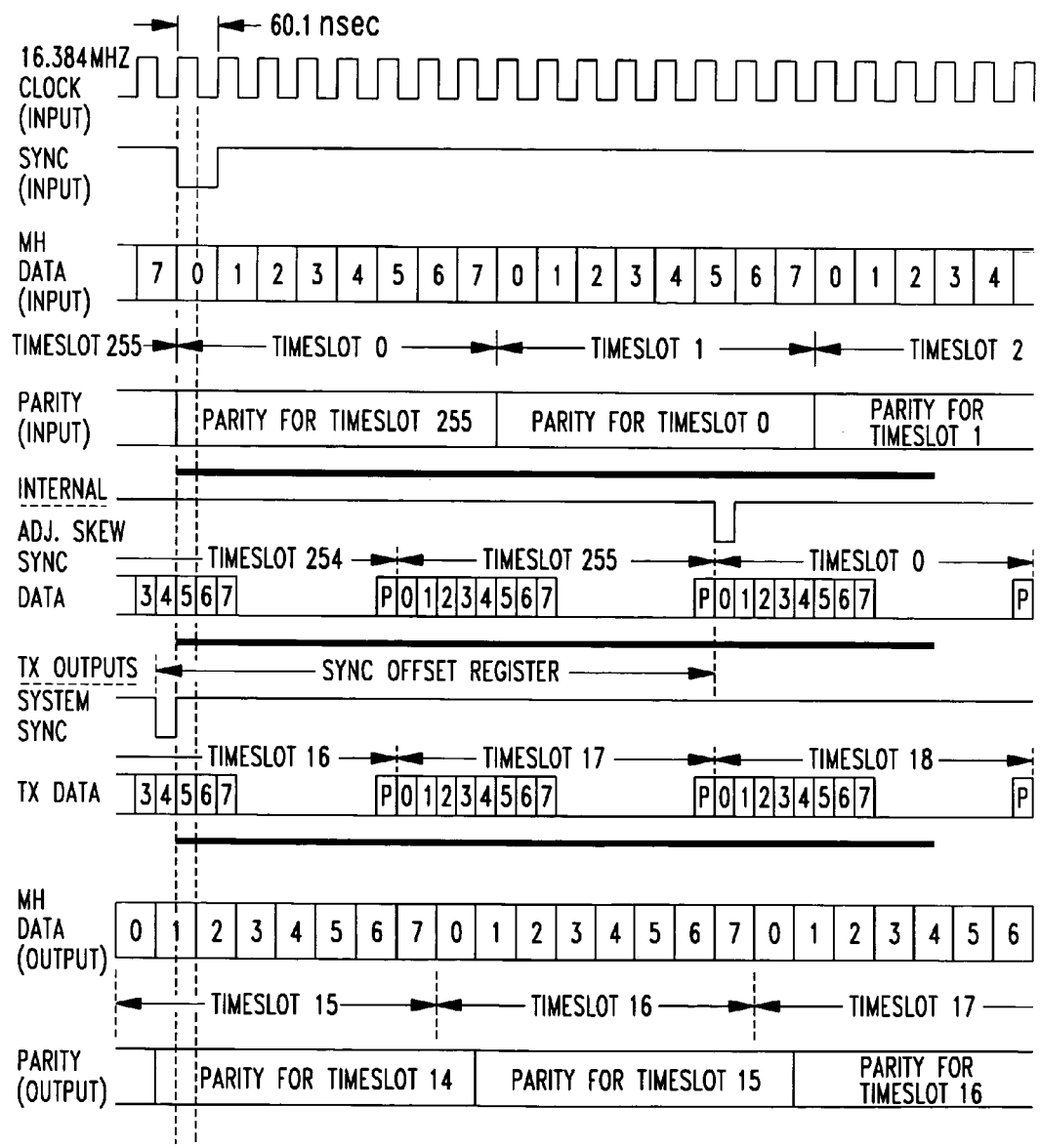

CONTROL MODULE APPLICATION

HDLC PROCESSOR

TRANSMIT CHANNEL CACHE

NOTE: THE MESSAGE BODY INCLUDES THE 16-BIT CRC DATA

RCV SERIAL LINKED LIST CONTROLLER STATE DIAGRAM (ASSEMBLY)

RCV PCI LINKED LIST CONTROLLER STATE DIAGRAM (DISASSEMBLY)

TX SERIAL LINKED LIST CONTROLLER STATE DIAGRAM (DISASSEMBLY)

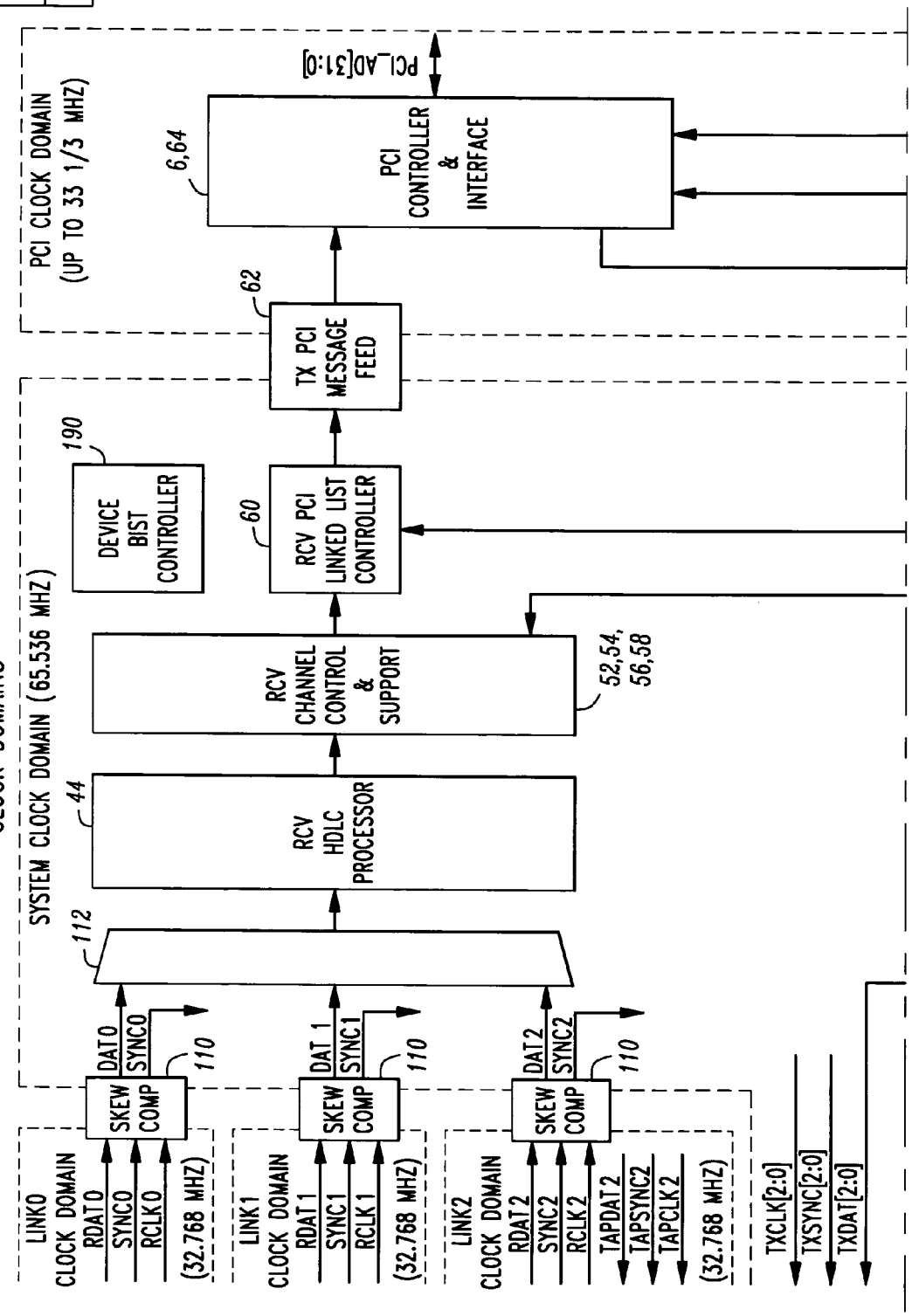

FIG. 35

| 0 | SYOFF0 |
|---|---|
| 1 | |
| 2 | |
| 3 | |
| 4 | |
| 5 | |
| 6 | |
| 7 | |
| 8 | |
| ... | |
| 11 | SYOFF11 |
| ... | |
| 15 | |
| 16 | MSYOFF0 |
| ... | |
| 23 | |
| 24 | |
| ... | |
| 27 | MSYOFF11 |
| ... | |
| 31 | |

FIG. 36

| 0 | RCVBIT0 |
|---|---|
| ... | |
| 3 | RCVBIT3 |
| 4 | RCVT50 |
| ... | |
| 7 | |
| 8 | |
| ... | |
| 11 | RCVT57 |
| ... | |
| 15 | |
| 16 | |
| ... | |
| 31 | |

FIG. 37

| 0 | TXBIT0 |
|---|---|
| ... | |
| 3 | TXBIT3 |
| 4 | TXT50 |
| ... | |
| 7 | |
| 8 | |
| ... | |
| 11 | TXT57 |
| ... | |
| 31 | |

FIG. 38

| 0 | 0 |
|---|---|
| 1 | 0 |
| 2 | 0 |
| 3 | 0 |
| 4 | 0 |
| 5 | TFF ST15 |
| ... | |
| 31 | TFF ST31 |

FIG. 39

| 0 | 0 |
|---|---|
| 1 | 0 |
| 2 | 0 |
| 3 | 0 |
| 4 | 0 |
| 5 | TFF SZE5 |
| ... | |
| 15 | |
| 16 | TFF SZE17 |
| ... | |
| 31 | |

FIG. 50

| Bit | Field |
|---|---|
| 0 | SRAMADD0 |
| ... | |
| 7 | |
| 8–15 | |
| 16–19 | |
| 20 | SRAMADD20 |
| 21 | SRAMRW |
| 22 | SRAMCTL |
| 23 | |
| 24–31 | |

FIG. 51

| Bit | Field |
|---|---|
| 0 | SRAMDAT0 |
| ... | |
| 15 | SRAMDAT15 |
| 16–31 | |

FIG. 52

| Bit | Field |
|---|---|
| 0 | ORLINK0 |
| 1 | ORLINK1 |
| 2–31 | |

FIG. 53

| Bit | Field |
|---|---|
| 0 | SLPAR0 |
| 1 | SLPAR1 |
| 2 | SLPAR2 |
| 3 | SYNCERR0 |
| 4 | SYNCERR1 |
| 5 | SYNCERR2 |
| 6 | HPMDONE |
| 7 | SRAMPAR |
| 8 | SRAMOF |
| 9 | RBUFLOSS |
| 10 | LLERR |
| 11 | TXCLOSS |
| 12 | TFFPNTR |
| 13 | RFFPNTR |
| 14 | SSYNCERR |
| 15 | RCVCCOF |
| 16 | TMSGOOR |
| 17 | RMSGOOR |
| 18 | SHORTERR |
| 19 | LONGERR |
| 20 | CRCERR |
| 21 | SRAMDNGR |
| 22 | SCRUBHIT |
| 23 | SRAMACC |
| 24 | DATPARER |
| 25 | TARAB |
| 26 | RXTARAB |
| 27 | RXMSTAB |
| 28 | SYSERR |
| 29 | PAR_ERR |
| 30 | ILLACCES |
| 31 | SETCLR |

FIG. 54

| Bit | Field |
|---|---|
| 0 | EMR0 |
| ... | |
| 30 | EMR30 |
| 31 | RESERVED |

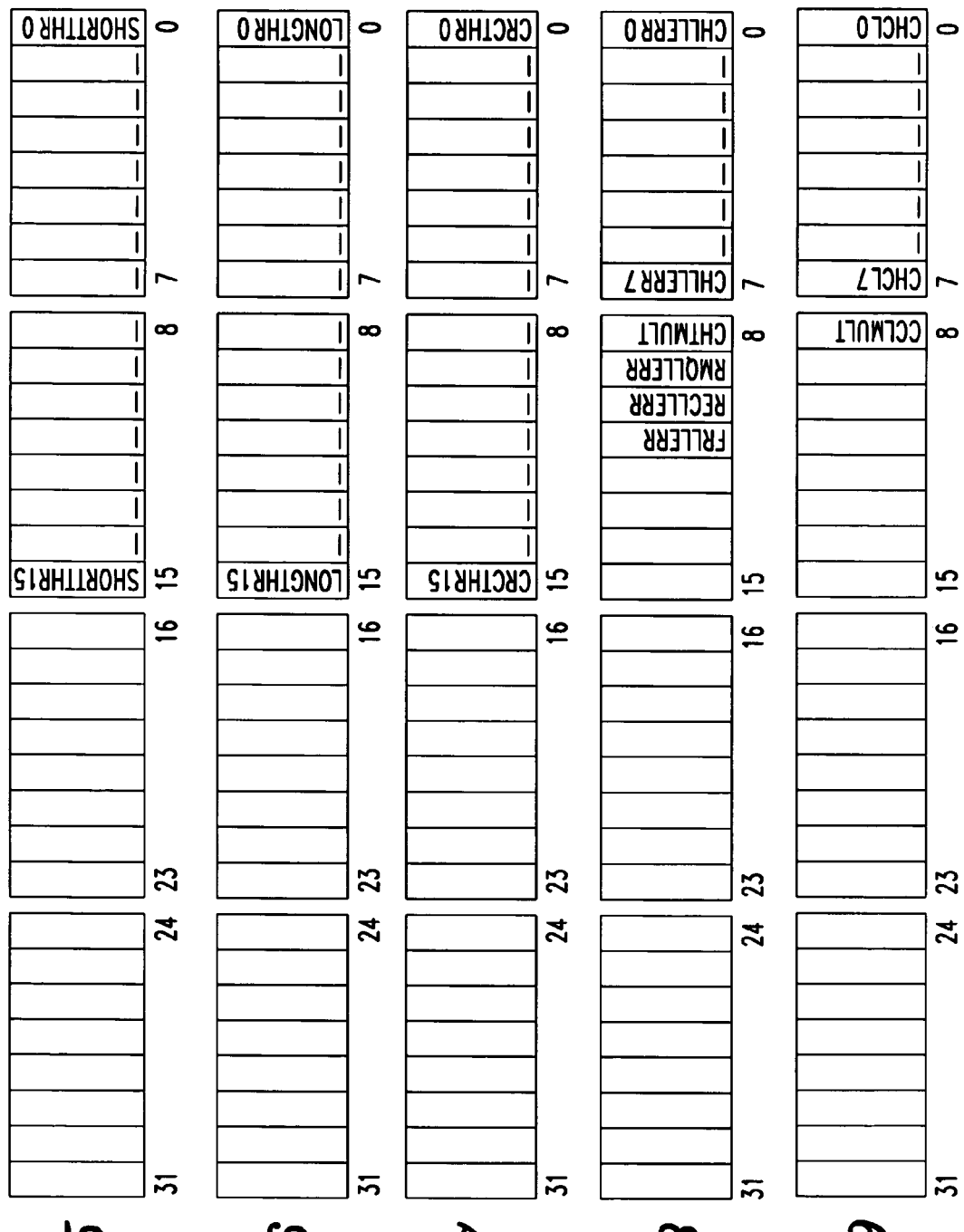

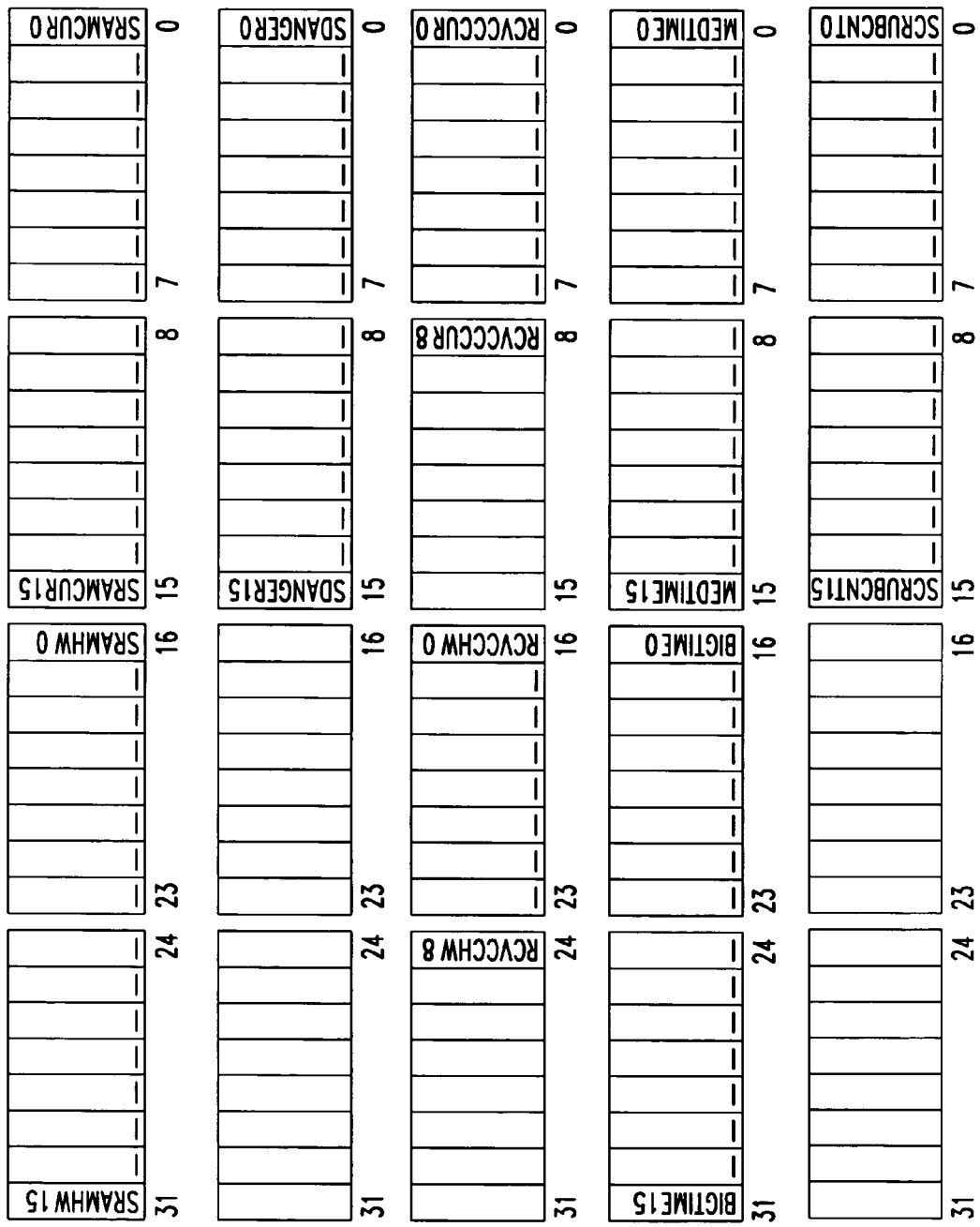

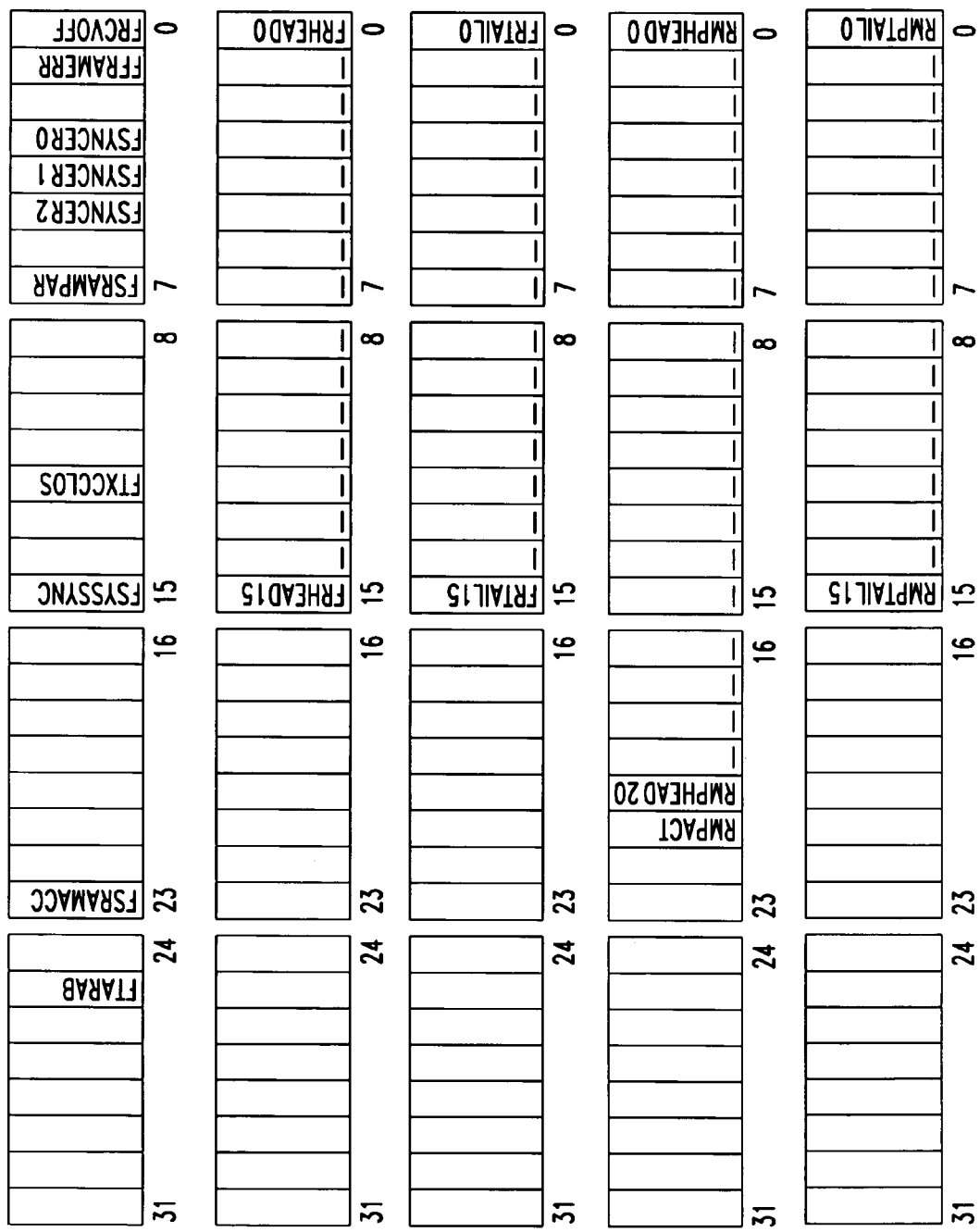

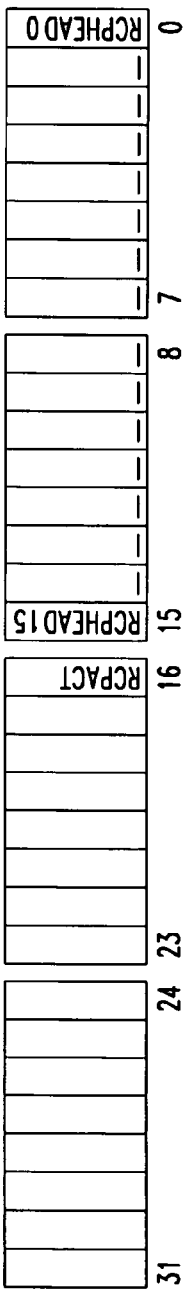
FIG. 80
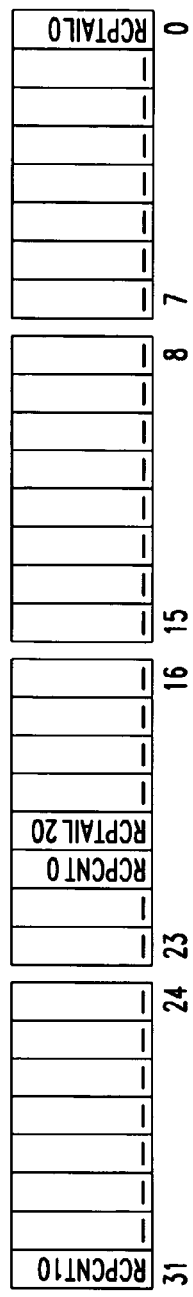
FIG. 81
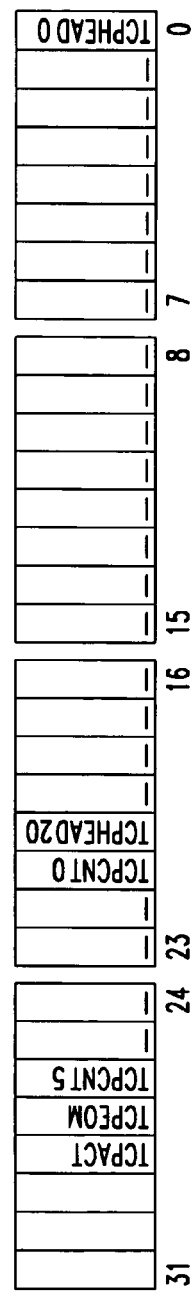
FIG. 82
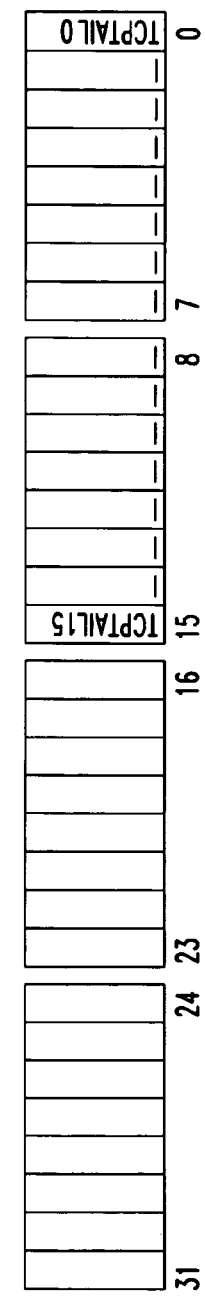
FIG. 83
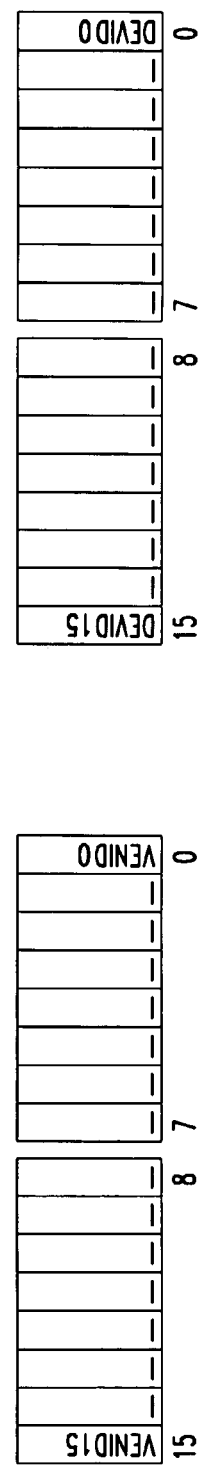
FIG. 84
FIG. 85

| FIG. 87 | | FIG. 89 | FIG. 91 | FIG. 93 |
|---|---|---|---|---|
| RESERVED | 0 | PRGMIF0 0 | BASCLS0 0 | HDRTYP0 0 |
| — | | — | — | — |
| — | | — | — | — |
| — | | — | — | — |
| RESERVED | | — | — | — |
| 66MHZ | | — | — | — |
| UDFSUP | | — | — | HDRTYP6 |
| FBB | 7 | PRGMIF7 7 | BASCLS7 7 | MULTIFNC 7 |
| DPERRDET | 8 | | | |
| DEVSEL0 | | | | |
| DEVSEL1 | | | | |
| SIGTARB | | | | |
| RCVTARB | | | | |
| RCVMSTAB | | | | |
| SSYSERR | | | | |
| DETPERR | 15 | | | |

| FIG. 86 | | FIG. 88 | FIG. 90 | FIG. 92 | FIG. 94 |
|---|---|---|---|---|---|
| IOSPACE | 0 | REVID 0 0 | SUBCLS0 0 | LATTIM0 0 | COMPCODE0 0 |
| MEMSPACE | | — | — | — | — |
| BUSMSTR | | — | — | — | — |
| SPECCYC | | — | — | — | — |
| MEMWREN | | — | — | — | COMPCODE3 |
| VGASNOOP | | — | — | — | RESERVED |
| PERRSP | | — | — | — | RESERVED |
| WTCYCTL | 7 | REVID7 7 | SUBCLS7 7 | LATTIM7 7 | BISTACT |
| SERREN | 8 | | | | BISTCAP 7 |
| FBBEN | | | | | |
| — | | | | | |
| — | | | | | |
| — | | | | | |
| — | | | | | |
| — | | | | | |
| RESERVED | 15 | | | | |

FIG. 95

| BASE 31 | ... | 24 |
| --- | --- | --- |
| | ... | 23 |
| | ... | 16 |
| | ... | 15 |
| | ... | 8 |
| BASE 4 | | 7 |
| PREFETCH | | |
| TYPE | | |
| TYPE | | |
| MEMSP | | 0 |

FIG. 96

| INTLINE7 | 7 |
| --- | --- |
| ... | |
| INTLINE0 | 0 |

FIG. 97

| INTPIN7 | 7 |
| --- | --- |
| ... | |
| INTPIN0 | 0 |

FIG. 98

| MINGRT7 | 7 |
| --- | --- |
| ... | |
| MINGRT0 | 0 |

FIG. 99

| MAXLAT7 | 7 |
| --- | --- |
| ... | |
| MAXLAT0 | 0 |

HIGH SPEED MULTI-PORT SERIAL-TO-PCI BUS INTERFACE

CROSS-REFERENCE TO RELATED APPLICATIONS

Not Applicable

STATEMENT REGARDING FEDERALLY SPONSORED RESEARCH OR DEVELOPMENT

This application is related to, and claims benefit of the filing date of, Provisional Application Ser. No. 60/132,306, entitled "High Speed Multi-Port Serial-To-PCI Bus Interface," filed on May 3, 1999.

BACKGROUND OF THE INVENTION

1. Field of the Invention

This invention relates to HDLC (High Level Data Link Control) formatters. More particularly, the invention concerns a high speed multi-port serial-to-PCI bus interface for an HDLC formatter that allows messages carried over a data link to be rapidly transferred into and out of a message processing core.

2. Description of the Prior Art

In HDLC processing for signaling applications, such as telephone network control messaging, messages to be processed arrive on a serial link and are transferred over a PCI bus via DMA channeling to a message processing area having an external RAM and a message processing core. In the past, the speed at which message processing could be performed has been limited by slow message throughput from the serial data stream into the messaging area, and visa-versa.

The problem is that PCI/DMA data exchange between the serial side of the HDLC formatter and the message processing core has required considerable handshaking to coordinate RAM read and write operations for messages moving in the Transmit (TX) and Receive (RCV) directions. For this reason, message processing support has conventionally been limited to a single serial link per HDLC formatter providing only a modest number (e.g., 32) of message processing channels (one per serial link timeslot).

Accordingly, there is a need in the art for an improved serial-to-PCI bus interface in an HDLC formatter used for message processing signaling applications. What is required is an improved multi-port serial-to-PCI bus interface that provides rapid PCI/DMA data exchange so as to allow the HDLC formatter to handle multiple serial links with multiple message-carrying timeslots for high bandwidth messaging.

SUMMARY OF THE INVENTION

A solution to the foregoing problem and an advance in the art is provided in a serial-to-PCI bus interface between an HDLC formatter and a message processing core. The interface includes a memory shared by the HDLC formatter and the message processing core. A handshaking arrangement is used to coordinate message storage and retrieval in the shared memory by the HDLC formatter and the message processing core with minimal utilization of processing resources of the message processing core. This handshaking coordination, together with the use of a message buffer accessed by the HDLC formatter to buffer channelized messages exchanged with the message processing core, facilitates message processing on multiple serial links (e.g., 3) over multiple timeslots (e.g., 256).

In preferred embodiments of the invention, the handshaking arrangement is implemented by exchanging message storage information between the HDLC formatter and the message processing core relative to messages the HDLC formatter and the message processing core have respectively stored and retrieved in the shared memory. More particularly, a shared storage location is established that contains pointers which provide information about locations in the shared memory where messages have been stored and retrieved by the HDLC formatter and the message processing core. The pointers include first and second pointers written by the HDLC formatter and respectively indicating where messages have been stored and retrieved in the shared memory by the HDLC formatter, and third and fourth pointers written by the message processing core and respectively indicating where messages have been stored and retrieved in the shared memory by the message processing core.

In the most preferred embodiments of the invention, the pointers are index pointers that point to locations in corresponding FIFOs, each FIFO containing pointers to message blocks in the shared memory. The FIFOs preferably include a RCV FIFO for RCV messages placed in the shared memory by the HDLC formatter and a TX FIFO for TX messages placed in the shared memory by the message processing core. The shared location containing the pointers may be implemented as part of the HDLC formatter. They are accessible to the message processing core via single-beat PCI bus accesses. The first pointer preferably points to a location in the RCV FIFO that contains a pointer to the last RCV message stored in said shared memory by the HDLC formatter. The second pointer preferably points to a location in the TX FIFO that contains a pointer to the last TX message retrieved from the shared memory by the HDLC formatter. The third pointer preferably points to a location in the RCV FIFO that contains a pointer to the last RCV message block available in the shared memory for use by the HDLC Formatter. The fourth pointer preferably points to a location in the TX FIFO that contains a pointer to the last TX message block stored in the shared memory by the message processing core.

BRIEF DESCRIPTION OF THE DRAWING

The foregoing and other features and advantages of the invention will be apparent from the following more particular description of a preferred embodiment of the invention, as illustrated in the accompanying Drawing, in which:

FIG. 3 is a generalized internal functional block diagram of the HDLC formatter of FIG. 1;

FIG. 12 is a timing diagram showing serial interface timing relationships for an alternative serial format implementation of the HDLC formatter of FIG. 1;

FIG. 35 is a bit field diagram of a Sync Offset Register in the HDLC formatter of FIG. 1;

FIG. 36 is a bit field diagram of a RCV Data-Sync Position Register in the HDLC formatter of FIG. 1;

FIG. 37 is a bit field diagram of a TX Data-Sync Position Register in the HDLC formatter of FIG. 1;

FIG. 38 is a bit field diagram of a TX FIFO Start Address Register in the HDLC formatter of FIG. 1;

FIG. 39 is a bit field diagram of a TX FIFO Size Register in the HDLC formatter of FIG. 1;

FIG. 50 is a bit field diagram of an SRAM Address And Control Register in the HDLC formatter of FIG. 1;

FIG. 51 is a bit field diagram of an SRAM Data Register in the HDLC formatter of FIG. 1;

FIG. 52 is a bit field diagram of a TS MUX Override Register in the HDLC formatter of FIG. 1;

FIG. 53 is a bit field diagram of an Error Source Register in the HDLC formatter of FIG. 1;

FIG. 54 is a bit field diagram of an ESR Mask Register in the HDLC formatter of FIG.

FIG. 55 is a bit field diagram of a Short Frame Threshold Register in the HDLC formatter of FIG. 1;

FIG. 56 is a bit field diagram of a Long Frame Threshold register in the HDLC formatter of FIG. 1;

FIG. 57 is a bit field diagram of a CRC Error Threshold Register in the HDLC formatter of FIG. 1;

FIG. 58 is a bit field diagram of a Channel Linked List Error Register in the HDLC formatter of FIG. 1;

FIG. 59 is a bit field diagram of a Channel Cache Loss Register in the HDLC formatter of FIG. 1;

FIG. 60 is a bit field diagram of an SRAM Usage Level Register in the HDLC formatter of FIG. 1;

FIG. 61 is a bit field diagram of an SRAM Danger Level Register in the HDLC formatter of FIG. 1;

FIG. 62 is a bit field diagram of a RCV Channel Cache Usage Register in the HDLC formatter of FIG. 1;

FIG. 63 is a bit field diagram of a Scrub Time Register in the HDLC formatter of FIG. 1;

FIG. 64 is a bit field diagram of a Scrub Count Register in the HDLC formatter of FIG. 1;

FIG. 70 is a bit field diagram of an Error Force Register in the HDLC formatter of FIG. 1;

FIG. 71 is a bit field diagram of a Free List Head Pointer Register in the HDLC formatter of FIG. 1;

FIG. 72 is a bit field diagram of a Free List Tail Pointer Register in the HDLC formatter of FIG. 1;

FIG. 73 is a bit field diagram of a RCV Message Feed Head Pointer Register in the HDLC formatter of FIG. 1;

FIG. 74 is a bit field diagram of a RCV Message Feed Tail Pointer Register in the HDLC formatter of FIG. 1;

FIG. 80 is a bit field diagram of a RCV Channel Head Pointer RAM Register in the HDLC formatter of FIG. 1;

FIG. 81 is a bit field diagram of a RCV Channel Tail Pointer RAM Register in the HDLC formatter of FIG. 1;

FIG. 82 is a bit field diagram of a TX Channel Head Pointer RAM Register in the HDLC formatter of FIG. 1;

FIG. 83 is a bit field diagram of a TX Channel Tail Pointer RAM Register in the HDLC formatter of FIG. 1;

FIG. 84 is a bit field diagram of a Vendor Identification Register in the HDLC formatter of FIG. 1;

FIG. 85 is a bit field diagram of a Device Identification Register in the HDLC formatter of FIG. 1;

FIG. 86 is a bit field diagram of a Command Register in the HDLC formatter of FIG. 1;

FIG. 87 is a bit field diagram of a Status Register in the HDLC formatter of FIG. 1;

FIG. 88 is a bit field diagram of a Revision ID Register in the HDLC formatter of FIG. 1;

FIG. 89 is a bit field diagram of a Program Interface Register in the HDLC formatter of FIG. 1;

FIG. 90 is a bit field diagram of a Sub-Class Code Register in the HDLC formatter of FIG. 1;

FIG. 91 is a bit field diagram of a Base-Class Code Register in the HDLC formatter of FIG. 1;

FIG. 92 is a bit field diagram of a Latency Timer Register in the HDLC formatter of FIG. 1;

FIG. 93 is a bit field diagram of a Header Type Register in the HDLC formatter of FIG. 1;

FIG. 94 is a bit field diagram of a BIST Register in the HDLC formatter of FIG. 1;

FIG. 95 is a bit field diagram of a Base Address Register in the HDLC formatter of FIG. 1;

FIG. 96 is a bit field diagram of an Interrupt Line Register in the HDLC formatter of FIG. 1;

FIG. 97 is a bit field diagram of an Interrupt Pin Register in the HDLC formatter of FIG. 1;

FIG. 98 is a bit field diagram of a Minimum Grant Register in the HDLC formatter of FIG. 1; and FIG. 99 is a bit field diagram of a Maximum Latency Register in the HDLC formatter of FIG. 1.

DETAILED DESCRIPTION OF THE PREFERRED EMBODIMENT

1. Introduction

Figure 1:
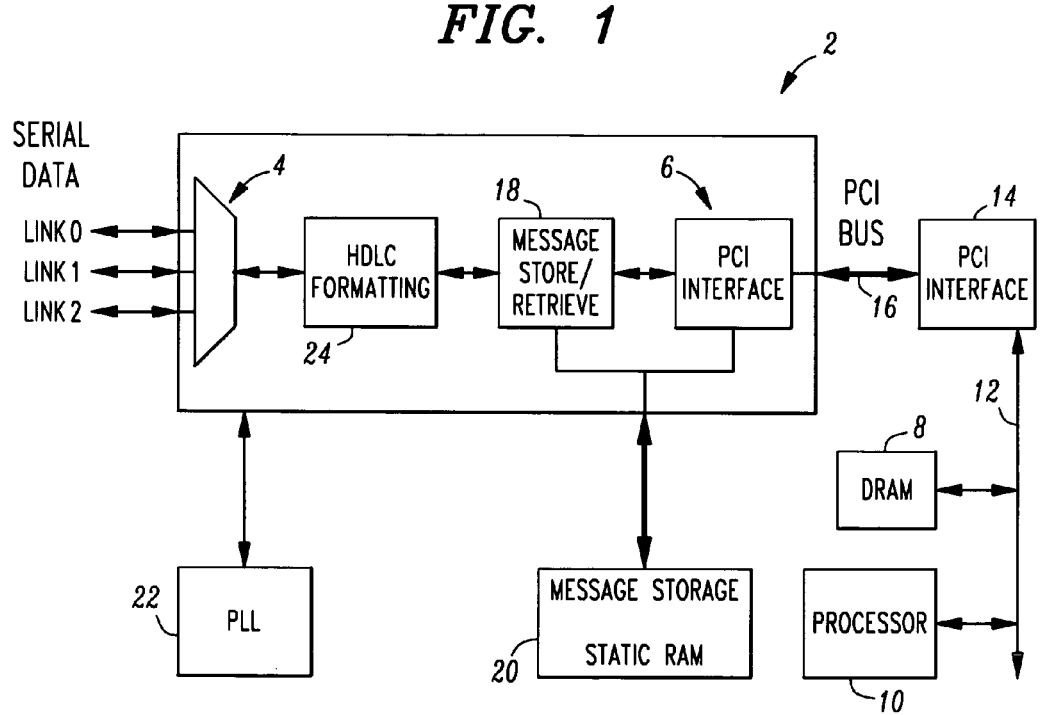
FIG. 1 is a functional block diagram of an HDLC formatter, a message processing core, and a serial-to-PCI interface therebetween in accordance with the invention.

Turning now to the figures, wherein like reference numerals represent like elements in all of the several views, FIG. 1 illustrates a simplified system diagram of a 256-channel, high level data link control (HDLC) formatter 2. The HDLC formatter 2 is preferably implemented as an application specific integrated circuit and may be used, by way of example, as a standard cell device for a switching system control module, such as the CM3 control module from Lucent Technologies Inc. The HDLC formatter 2 may also used for any of a variety of other data and signaling applications, including multiple D-channel termination, applications that need the flexibility to dynamically allocate bandwidth to individual channels, or applications that need high speed backplane packet transport and switching.

On one side of the HDLC formatter 2 is a serial data interface 4, and the other side has a PCI bus (parallel) interface 6 to the DRAM 8 of a message processing core host processor 10. The DRAM 8 and the host processor 10 communicate via a local processor bus 12. A PCI controller 14 provides a PCI interface between the local processor bus 12 and a PCI bus 16. The PCI bus 16 is also connected to the PCI interface 6. A Message Store/Retrieve interface 18 to a dedicated SRAM 20 is used as temporary storage of messages while they are assembled and disassembled. A PLL (phased lock loop) logic unit 22 provides serial synchronization.

On the serial side, the HDLC formatter 2 transmits and receives 256 timeslots of data on up to 3 different links. Each timeslot can be assigned to any of the 3 incoming links. These links are timeslot multiplexed onto a single 256 timeslot serial stream. Up to 4 bibbles of each timeslot can be individually assigned to 1 of 256 HDLC channels, and data from multiple bibbles or timeslots can be concatenated to form larger channels. Concatenated timeslots do not need to be contiguous.

HDLC processing is performed on each channel by an HDLC formatting unit 24. This includes zero-bit insertion and deletion, abort and idle detection/transmission, and CRC generation and checking. Data inversion is allowed. Bit-rate control allows a channel to handle subrate data by masking out bits in a timeslot.

In the receive direction, channel messages from the serial input are assembled in the external SRAM 20 and transmitted over the PCI bus 16 to the DRAM 8 using DMA. In the transmit direction, messages in the DRAM 8 are DMA-transferred to the SRAM 18 where they are disassembled and retrieved as needed for transmitting on the serial outputs. All control and status registers and internal RAMs are accessed by the host processor 10 over the PCI bus interface.

Figure 2C:
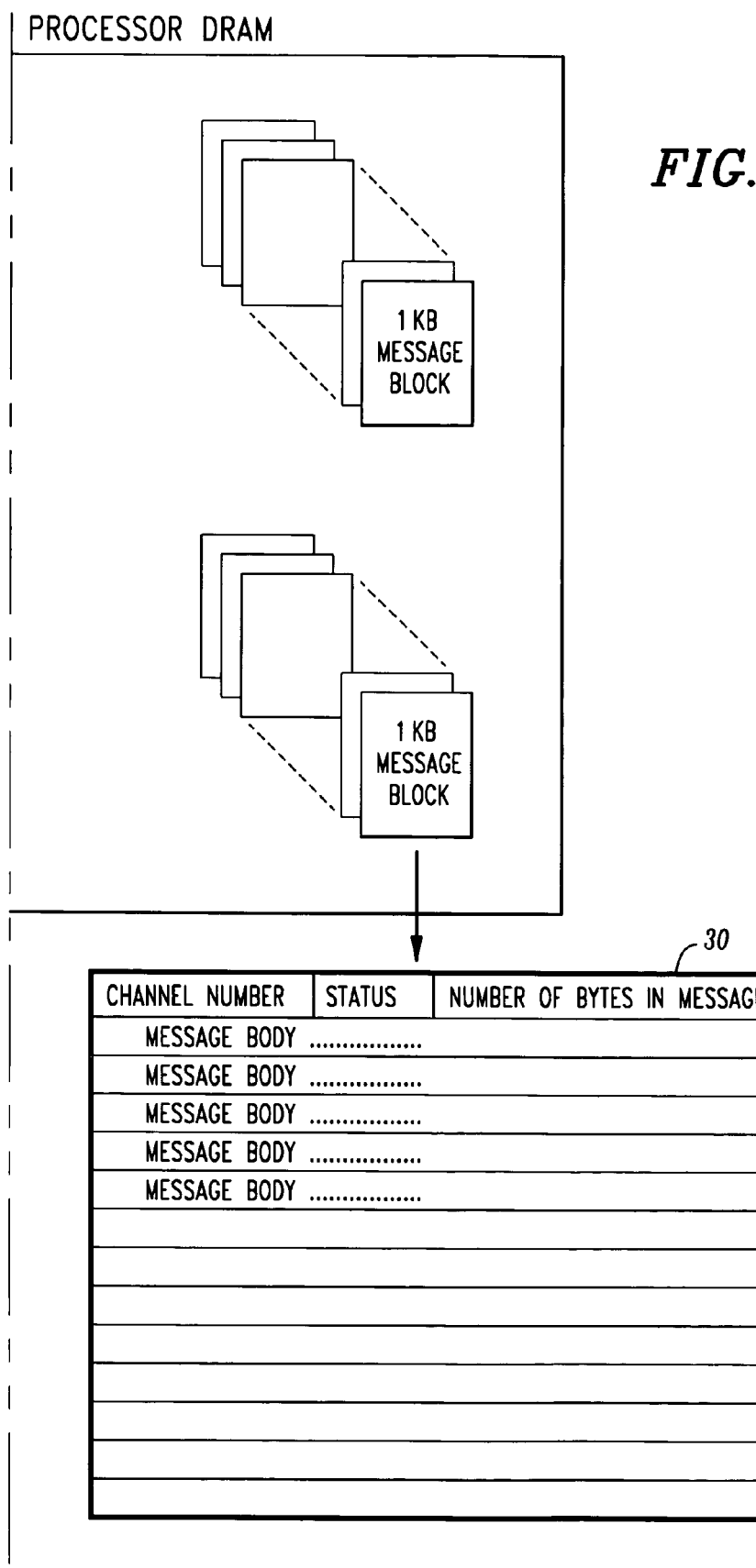
FIG. 2 is a functional block diagram showing plural HDLC formatters as in FIG. 1 communicating with a shared memory hosted by a message processing core.

Turning now to FIG. 2, it will be seen that multiple HDLC formatters 2, through 2, may be connected to the PCI bus 16. On the PCI side, each HDLC formatter 2 provides a bus-mastering, 32-byte burst capability for reading and writing message buffers 30 in the DRAM 8. Pointers 32 to these messages in the DRAM 8 will be stored in a receive (RCV) FIFO 34 and a transmit (TX) FIFO 36 which also reside in the DRAM 8, for each HDLC formatting unit 2. The handshaking required to keep the FIFO pointers updated is handled by the host processor 10 using pairs of RCV and TX index pointers (described in more detail below) that are used by the HDLC formatter 2 and the processor 10 to access the RCV and TX FIFOs 34 and 36. In PCI target mode, the HDLC formatter 2 allows the processor core access to the formatter's registers and internal RAM 38 (see FIG. 3) necessary for configuration of the timeslots and channels.

The interface 18 to the dedicated external SRAM 20 is used to store messages for both the receive and transmit directions. In the receive direction, message data from the serial interface 4 is assembled and stored into a complete message in the SRAM 20. Once completed, the stored message is transferred to a buffer in the DRAM 8. In the transmit direction, a complete message is retrieved from a DRAM buffer and stored in the SRAM 20. Once stored in the SRAM 20, the message is disassembled and transmitted over the serial links. The disassembly of the message involves placing the SRAM data blocks onto a free list as they are emptied and transmitted (described in more detail below). The purpose of the SRAM 20 is to eliminate any real-time latency issues with the PCI bus 16 that could result in losing receive serial data or stalling transmit serial data. The PLL synchronization circuitry 22 is provided to support a board level phase lock loop.

Figure 4B:
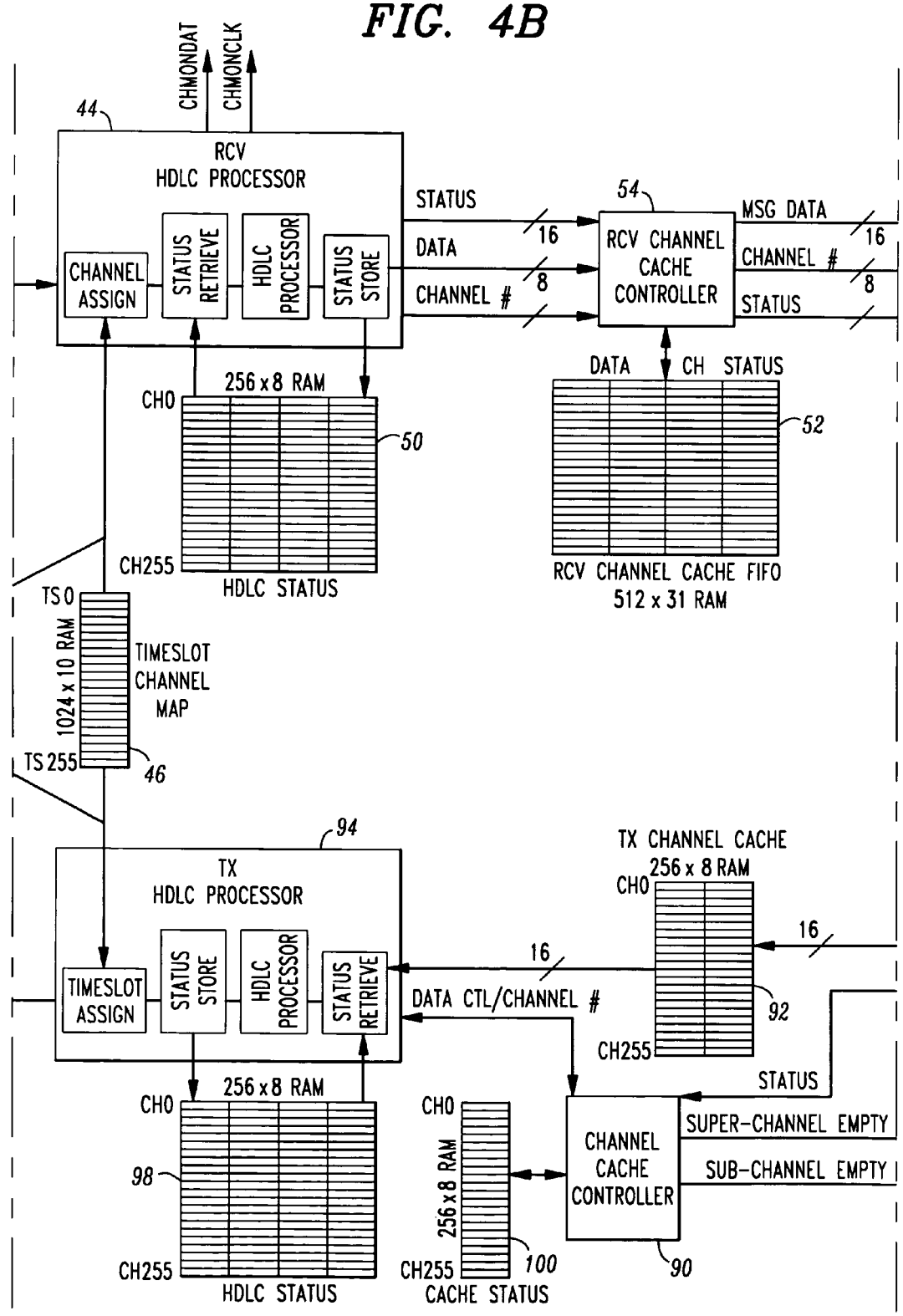
FIG. 4 is a detailed internal functional block diagram of a first portion of the HDLC formatter of FIG. 1.
Figure 4C:
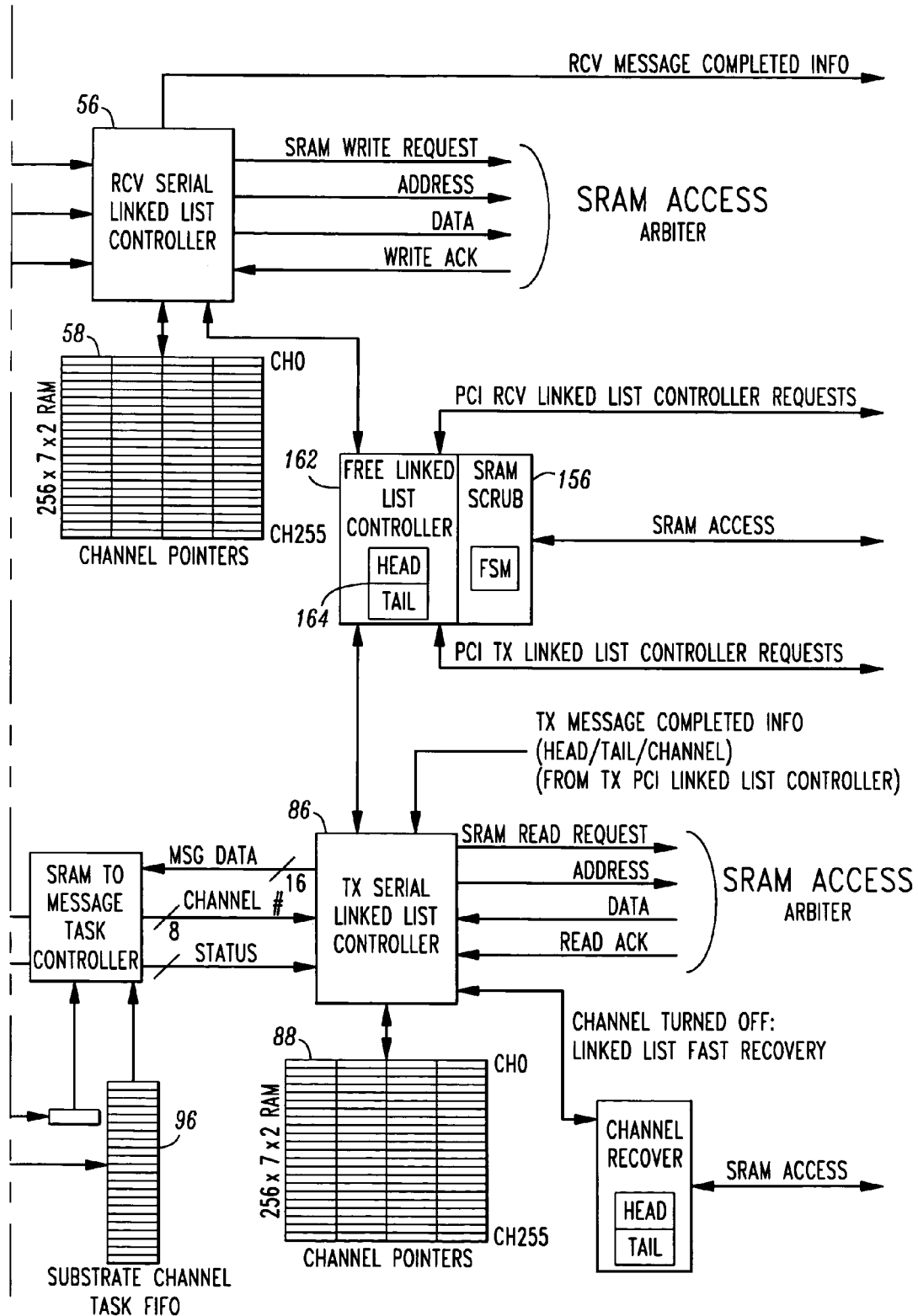
Figure 5A:
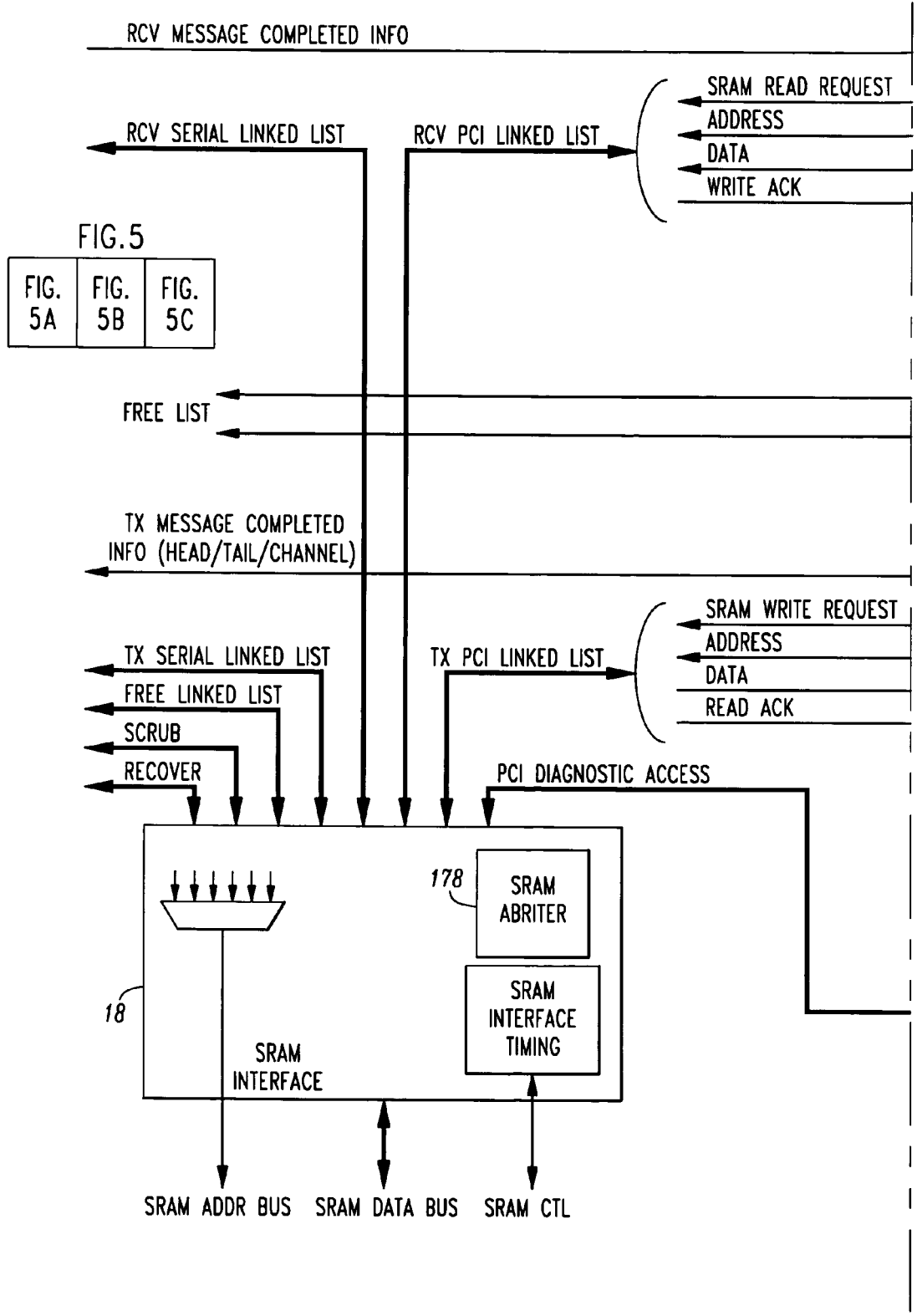
FIG. 5 is a detailed internal functional block diagram of a second portion of the HDLC formatter of FIG. 1.
Figure 5B:
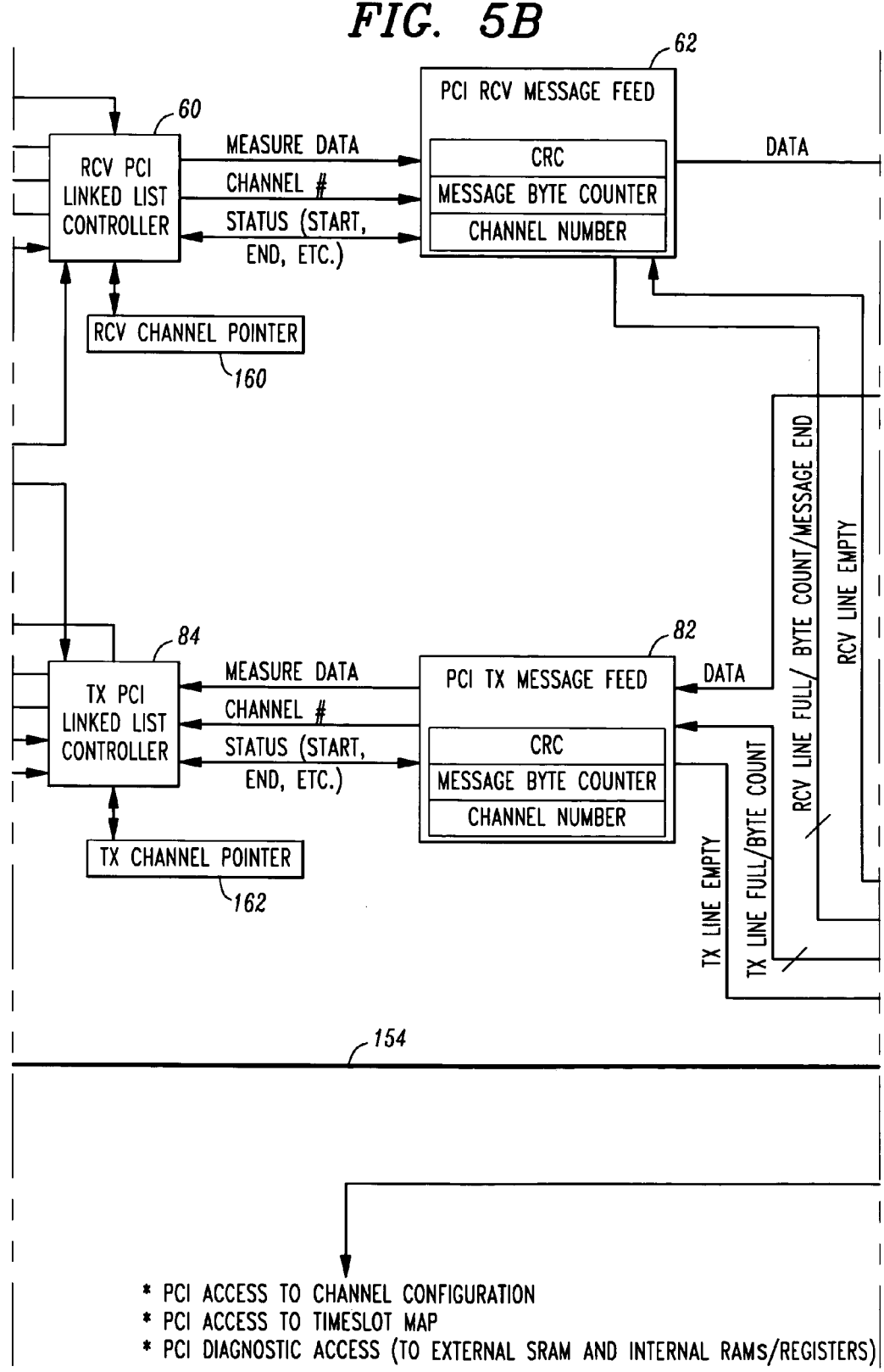
Figure 5C:
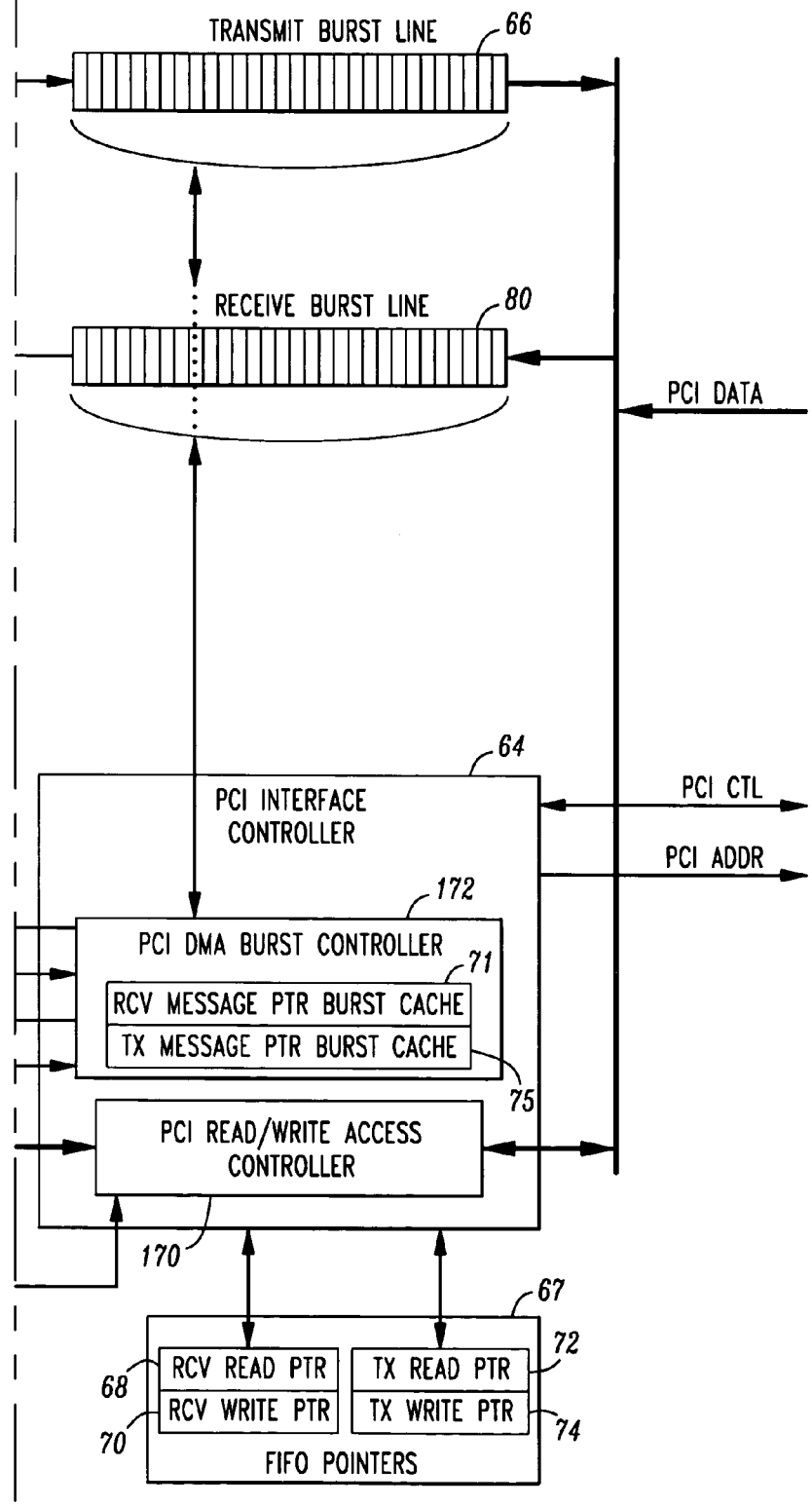

Turning now to FIGS. 3, 4 and 5, but with continuing reference to FIGS. 1 and 2 as necessary, the message receive and transmit processes will be described.

1.1 Message Receive Process Overview

Messages can be received on up to 3 separate serial links that terminate at the receive side 40 of the serial interface 4, labeled RCV Serial Interface in FIG. 3 and RCV Serial Front End in FIG. 4. For example, the HDLC formatter $2_1$ of FIG. 2 is shown with 2 links while the HDLC formatter $2_n$ is shown with 3 links. The links are each composed of 256 timeslots, each of which contains 8 bits of data and 8 bits of signaling/parity information. The data from the 3 links is multiplexed onto a single 256 timeslot signal. This multiplexing is controlled by the Timeslot Mux RAM (256×8) and can select data from one of the 3 links on a timeslot basis. The resulting single 256 timeslot signal is then fed into the receive side 44 (RCV HDLC processor) of the HDLC formatting unit 24 for HDLC processing and timeslot-to-channel conversion.

The RCV HDLC processor 44 identifies which channel each timeslot and bibble is assigned to by reading the Timeslot to Channel Map RAM (1024×10) 46. The channel number is then used to read configuration information from the Channel Configuration RAM (256×13) 48. The Timeslot Mux RAM 42, Timeslot Channel Map RAM 46, and Channel Configuration RAM 48 are all written by the host processor 10 through the PCI interface 6. Once the channel number and configuration information have been retrieved for a bibble of data, the RCV HDLC processor 44 accesses the running status from the RCV HDLC Status RAM 50. HDLC processing is then performed on the bibble including flag detection, bit deletion, and abort detection. The RCV HDLC processor 44 also builds up a 16 bit word (for each channel) before passing the data on to the RCV Channel Cache 52. Advantageously, CRC checking is not performed until the messages are transferred to the DRAM 8.

Once 16 bits have been saved for a channel, the word is passed to the RCV Channel Cache 52, via its controller 54, along with status information and a channel number. The RCV Channel Cache 52 acts as a buffer for data between the RCV HDLC Processor 44 and a RCV Linked List Controller 56. When the RCV Linked List Controller 56 is available, data is popped off of the RCV Channel Cache 52. This cache does not operate like a microprocessor cache, but instead provides temporary storage for message data.

The RCV Serial Linked List Controller 56 is one of 4 linked list controllers that access the local external SRAM 20. The job of the RCV Serial Linked List Controller 56 is to take channel data out of the RCV Channel Cache 52, and store it as part of a message in a linked list structure in the SRAM 20. Up to 256 independent messages on 256 channels can be constructed a piece at a time. To keep track of each message's head and tail pointers, an internal channel pointer RAM is needed. After receiving data, channel number, and status information from the RCV Channel Cache 52, the RCV Serial Linked List Controller 56 reads the RCV Channel Pointer RAM 58 for message pointer information. Based on this information, the Controller 56 writes the message data into the linked list buffer in the SRAM 20. Once a message has been completed in the SRAM 20, the channel pointers and channel number are handed off to a RCV PCI Linked List Controller 60.

The linked list structure in the SRAM 20 consists of 64 byte blocks throughout the entire memory spectrum. The first word (16 bits) of each block holds a pointer to the next block in the list. The second word contains descriptor information. In this descriptor is the channel number and free list identification, byte count (for the last block of the message only), scrub information, and a bit that identifies the last block of a message. When a message has been completely assembled in the SRAM 20 (including the CRC word), an extra byte is added to the end of the message with HDLC status information. This information is placed in the DRAM message buffer header when the message is transferred to the DRAM 8.

When the RCV PCI Linked List Controller 60 gets completed message information from the RCV Serial Linked List Controller 56, one of two actions are taken. If no messages are currently ready to be transferred from the HDLC formatter 2 to the DRAM 8, the RCV PCI Linked List Controller 60 immediately begins transferring this message. If a message is already currently queued up for transfer, the new message is linked on to the end of the current message. Any additional messages that become available are linked onto the same linked list. The RCV PCI Linked List Controller 60 retrieves these messages from the SRAM 20, one at a time, and sends the data 16 bits at a time to the RCV Message Feed 62.

The RCV Message Feed 62 operates as an interface between the RCV PCI Linked List Controller 60 and the PCI Interface Controller 64. When the PCI transmit burst line 66 is available, the RCV Message Feed 62 will begin loading it with data from the RCV PCI Linked List Controller 60. The RCV Message Feed 62 will request data for the current message from the RCV PCI Linked List Controller 60. When the data is available, it hands it off to the PCI Interface Controller 64. Because a message byte count is required for the message descriptor in the DRAM 8, a counter must keep track of the number of bytes handed off to the PCI Interface Controller 64. Furthermore, when a new message is started, the RCV Message Feed 62 will transfer the second 32 bytes of the message first, and save the first 32 bytes for last. This will allow the RCV Message Feed 62 to calculate the byte count for the message descriptor. CRC is also calculated across the entire message as it is transferred through the RCV Message Feed 62.

The PCI Interface Controller 64 takes data from the RCV Message Feed 62 and loads it into the transmit burst line of the PCI Interface Controller. Free DRAM message buffer pointers 32 are retrieved by the PCI Interface Controller 64 from the DRAM RCV Pointer FIFO 36. This is done using a formatter/processor handshaking operation implemented with a FIFO index pointer store 67. The index pointer store 67 includes two registers, one for RCV message handshaking and the other for TX message handshaking. The RCV register has two index pointer fields storing index pointers that point to index locations in the RCV FIFO 36 containing needed message buffer pointer information. A first index pointer 68 (labeled "RCV read ptr" in FIG. 5C and "RCV processor pointer" in FIG. 2B) is set by the processor 10 when it allocates block pointers for RCV messages in the DRAM 8. A second index pointer 70 (labeled "RCV write ptr" in FIG. 5C and "RCV formatter pointer" in FIG. 2B) is set by the HDLC formatter 2 when it writes RCV messages to the DRAM 8.

To find available message buffers 30 in the DRAM 8 for writing new RCV messages, the PCI Interface Controller 64 consults the index pointer 68 set by the processor 10. This index pointer field shows a location in the RCV FIFO 36 where a pointer to the last available message buffer 30 is stored. Using the index pointer 68, the HDLC formatter 2 knows where to begin looking stop looking in the RCV FIFO 36 for available message buffers 30. The PCI Interface Controller 64 then bursts in as many available message buffer pointers as there are in the RCV FIFO 36. Each message buffer 30 preferably holds one complete message. Thus, one pointer will be required for one RCV message to be stored in the DRAM 8. A RCV message pointer burst cache 71 holds these pointers. Assuming a single message buffer pointer has been obtained for a single RCV message to be stored, the PCI Interface Controller 64 bursts the data to the appropriate buffer addresses until the entire message is in the buffer. It then sets the index pointer 70 with the index location in the RCV FIFO 36 that contains the pointer to the newly written buffer. The processor 10 can then access the index pointer 70 to locate the buffer with the new message in it.

1.2 Message Transmit Process Overview

Figure 46:
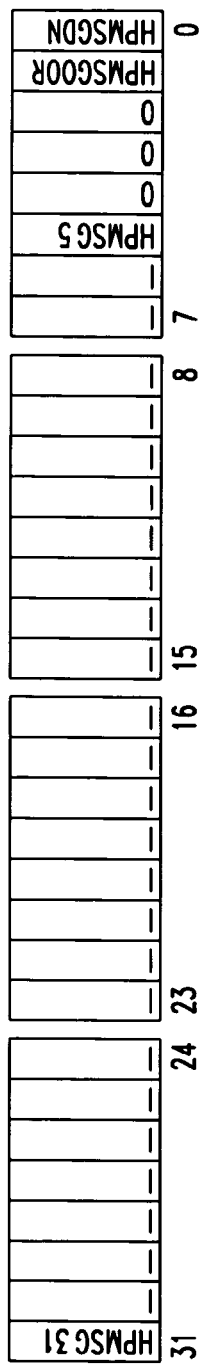
FIG. 46 is a bit field diagram of a High Priority Transmit Message Register in the HDLC formatter of FIG. 1.

The PCI Interface Controller 64 starts by first checking for a high priority message pointer which can be stored in an internal register (see FIG. 46). If there is no high priority message requiring transfer, the PCI Interface Controller 64 implements an HDLC/processor handshaking operation similar to the one used for RCV messages. This is done using the FIFO index pointer store 67. As indicated above, the index pointer store 67 contains a second register for TX message handshaking. This TX register includes two index pointer fields storing index pointers that point to index locations in the TX FIFO 34 containing needed message buffer pointer information. A first index pointer 72 (labeled "TX read ptr" in FIG. 5C and TX formatter pointer in FIG. 2B) is set by the HDLC formatter 2 when it reads TX messages from the DRAM 8. A second index pointer 74 (labeled "TX write ptr" in FIG. 5C and TX processor pointer in FIG. 2B) is set by the processor 10 when it writes TX messages to the DRAM 8.

To write a TX message to the DRAM 8, the processor 10 consults the index pointer 72 to determine the index location in the TX FIFO 34 containing a pointer to the last message buffer 30 handed to the HDLC formatter 2. The processor then writes the TX messages to the DRAM 8 and sets the index pointer 74 to point to the index location in the TX FIFO 34 containing a pointer to the last message buffer 30 written to by the processor 10.

To read a TX message from the DRAM 8, the HDLC formatter 2 consults the index pointer 74 to determine if the TX FIFO 34 has any message buffer pointers containing new messages to be transmitted. If new messages are ready to be transmitted, the PCI Interface Controller 60 will burst the new message pointers into a TX message pointer burst cache 75. For each message pointer retrieved, the PCI Interface Controller 60 will begin transferring the message data from the corresponding buffer. This data is then taken from PCI interface receive burst line buffers 80 and handed off to a TX Message Feed 82.

The TX Message Feed 82 will identify the channel number and byte count from the message descriptor, and begin sending message data to a TX PCI Linked List Controller 84. Status information will be sent along with the data and channel number to signal the beginning and end of a message. As the data is transferred, CRC is calculated and added to the end of the message.

The TX PCI Linked List Controller 84 will take the data from the TX Message Feed 82, and build up a linked list structure for the message. Because only one message is handled at a time, the TX PCI Linked List Controller 84 will only need to keep track of a single message head and tail pointer. Once the message is completely transferred to SRAM, the linked list pointers and channel number are handed off to a TX Serial Linked List Controller 86.

When the TX Serial Linked List Controller 86 gets completed message information from the TX PCI Linked List Controller 84, one of two actions will be taken. If no messages for that channel are currently queued up for transmitting, then the TX Serial Channel Pointers 88 are updated with the new message pointers. If a message is already currently queued up for serial transmission, the new message is linked on to the end of the current message. Any additional messages that become available for that channel will be linked onto the same linked list. The TX Serial Linked List Controller 86 will retrieve these messages, one at a time, and send the data to a TX Channel Cache Controller 90 for storage in a TX Channel Cache 92.

The TX Channel Cache Controller 90 operates as an interface between the TX Serial Linked List Controller 86 and a TX HDLC Processor 94. It maintains a Channel Cache 92 that is organized by channel and acts as a prefetch for the channel data. When the TX HDLC processor 94 needs a word of data for a particular channel, the data is provided immediately out of the Channel Cache 92. If the channel shares the timeslot with another channel, a request for new channel data is placed on a low priority FIFO 96. If the channel that has been emptied is a normal (non-shared) channel, a request for a new word is immediately issued from the TX Channel Cache Controller 90 to the TX Serial Linked List Controller 86. The TX Serial Linked List Controller 86 must return new data within 32 system clock (SYSCLK) cycles to ensure that the new data is ready for the next timeslot. Shared channels do not need this quick turnaround time, and are therefore serviced at a lower priority.

The TX HDLC processor 94 identifies which channel each timeslot and bibble is assigned to by reading the Timeslot-to-Channel Map RAM 46. The channel number is then used to read configuration information from the Channel Configuration RAM 48. Once a channel number and configuration data have been retrieved for the bibble of data, the TX HDLC processor 94 accesses the running status from the TX HDLC Status RAM 98. Included in the status data is a buffer holding up to 16 bits of message data previously retrieved from the TX Channel Cache 92. TX HDLC processing is then performed on the bibble including flag insertion and bit stuffing. If the TX HDLC status does not have enough message data bits available, a new word is retrieved from the TX Channel Cache 92. The TX HDLC processor 94 will then use as many bits as necessary and store the leftover bits in the Cache Status RAM 100.

Messages are transmitted on up to 3 serial links. These links are each composed of 256 timeslots, each of which contains 8 bits of data and 8 bits of signaling/parity information. The same data from the TX HDLC Processor 94 is transmitted on all 3 links.

1.3 Miscellaneous Procedures

The following special conditions are supported through access of the Channel Configuration RAM 48:

Support stop TX for a channel on the fly. When a stop transmission command is received, the HDLC formatter 2 will immediately stop transmission at the serial link, and will discard any remaining messages for that channel.

Support start TX for a channel on the fly. When a start transmission command is received, the HDLC formatter 2 will start transmitting on the beginning of the next (or first) message.

Support stop RCV for a channel on the fly. When a stop receive command is received, the HDLC formatter 2 will immediately stop receiving messages and truncate any partially received message. Completed messages in SRAM will be DMA-transferred to the DRAM 8 in the normal manner.

Support start RCV for a channel on the fly. When a start receive command is received, the HDLC formatter 2 will start receiving the next full message.

Any combination of starting and stopping the RCV and TX is supported.

2. Features List

The following list describes the high-level features that are supported in the HDLC formatter 2:

Support for three 256-timeslot serial interfaces.

Per timeslot multiplexing will select data from one of the three receive serial interfaces.

Phase lock loop support logic for synchronization.

Skew compensation for synchronizing serial data to the primary clock.

Support for both 32 MHz/16 bit timeslot and 16 MHz/8 bit timeslot serial formats.

Support for up to 256 HDLC channels.

Support for serial data inversion.

Programmable channel rates from 8 Kbps to 16 Mbps.

Support for D-channel packed timeslots.

32 bit, 33 MHz target and initiator PCI Interface.

Bus-master transfer of complete messages to external memory over the PCI interface.

Hardware support for transmit and receive message structures.

Interface for up to 4 Mbytes of external SRAM for temporary message storage.

Programmable byte and bit ordering for the message format.

Parity detections and generation on the external SRAM data bus.

IEEE JTAG boundary scan support.

Built-In Self Test (BIST).

3. Data Formats 3.1 Message Format

Figure 6:
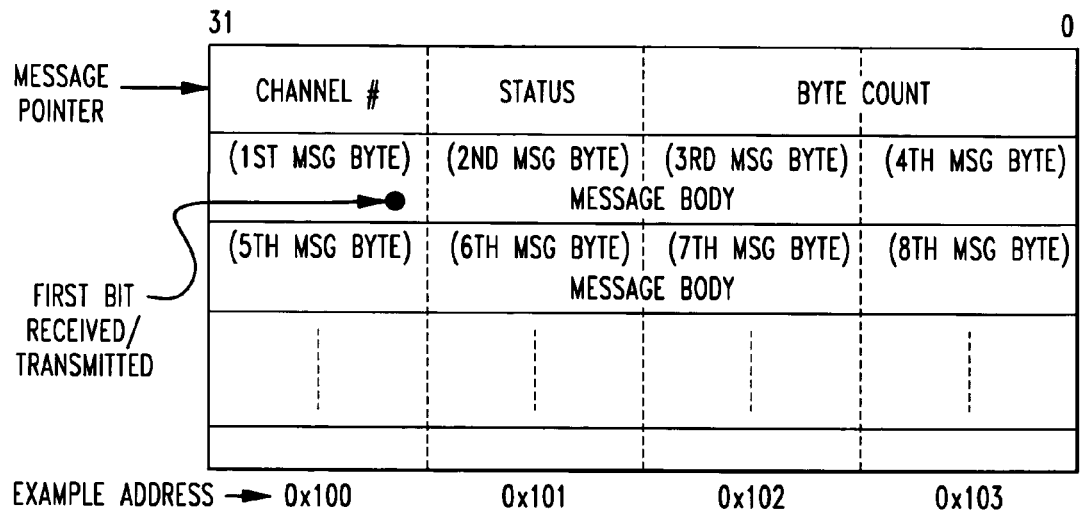
FIG. 6 illustrates a message format for messages stored in a memory shared by the HDLC formatter and the message processing core of FIG. 1.
Figure 7:
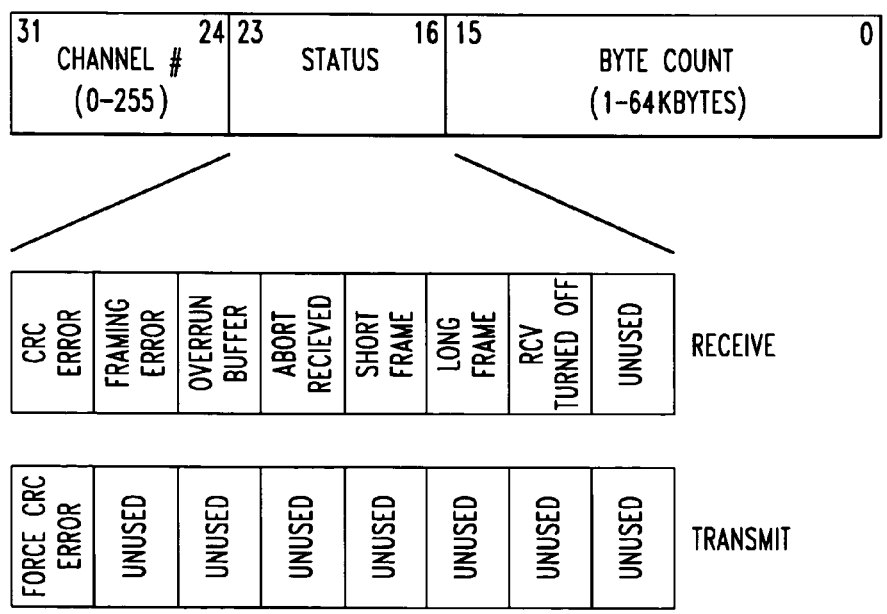
FIG. 7 illustrates a message header format for the message format shown in FIG. 6.

Receive and transmit messages are stored in the DRAM 8 using similar formats shown in FIGS. 6 and 7. The first 4 bytes (longword) of each buffer consists of a header with channel number, status and byte count information. As described above, RCV messages are written by the HDLC formatter 2 through bus master DMA bursts. As further described above, TX messages are written by the host processor and read by the HDLC formatter 2 device, also through bus master DMA bursts. Buffer sizes in the DRAM 8 are programmable from 32 bytes to 64 K bytes in increments of 32 bytes. The buffer size affects all TX and RCV messages and preferably should not be changed during nominal operation. The format of these buffers is shown in FIG. 6.

Programmability is offered to alter the message buffer format. A bit in a Master Configuration Register (see register descriptions below) provides little endian format such that the first byte received and transmitted is placed in bits 7–0 (byte 0). Another bit in the Master Configuration Register reverses the bit order within a byte such that the first bit received and transmitted is placed in the most significant bit position. The byte and bit ordering affects only the message data, not the message header or any internal registers of the HDLC formatter 2.

As described above, the two FIFO structures 34 and 36 maintained in the DRAM 8 provide pointers to the message buffers 30. Pointers to buffers that are empty and available for RCV messages from the HDLC formatter 2 are placed onto the RCV FIFO by the processor 10. The processor 10 then writes the RCV read ptr 68 to indicate to the HDLC formatter 2 how many message buffer pointers are available. As indicated, the HDLC formatter 2 pops these message pointers off of the RCV FIFO 36 as needed. Once the HDLC formatter 2 has completed the DMA of a message into a buffer 30, it updates its own RCV writer ptr 70 indicating to the processor 10 that the buffer holds a completed message.

For TX messages, the processor 10 places a pointer to a transmit message buffer 30 onto the TX FIFO 34. The processor 10 then updates its TX writer ptr 74 pointer to indicate to the HDLC formatter 2 that the message is ready for transmitting. When the HDLC formatter 2 has completely DMA-transferred the message into its own local SRAM 20, it will update its TX read ptr 72 to tell the processor 10 that the message has been retrieved (the processor can now free the buffer).

Figure 8:
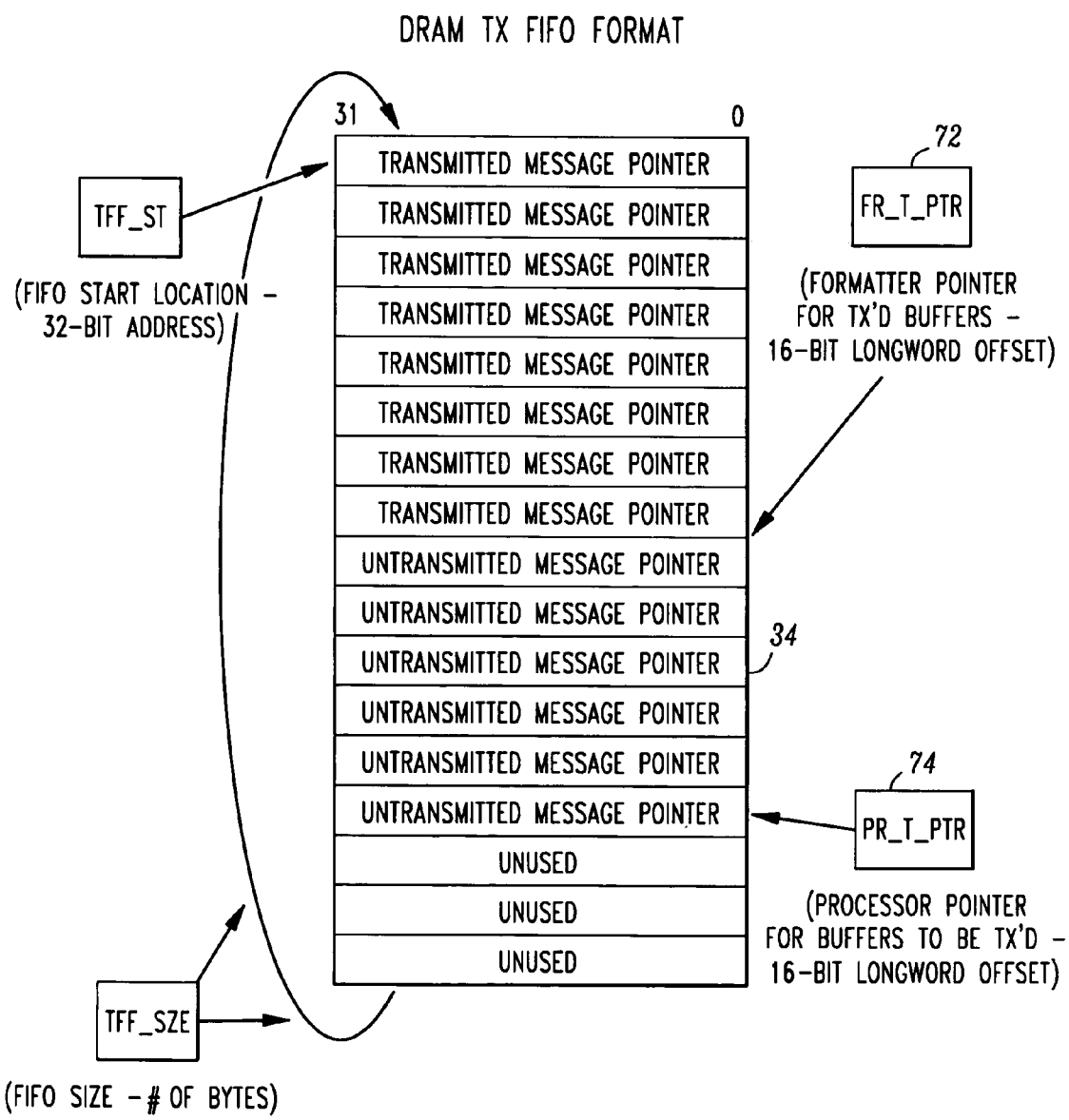
FIG. 8 illustrates a TX FIFO implemented in accordance with the invention.
Figure 9:
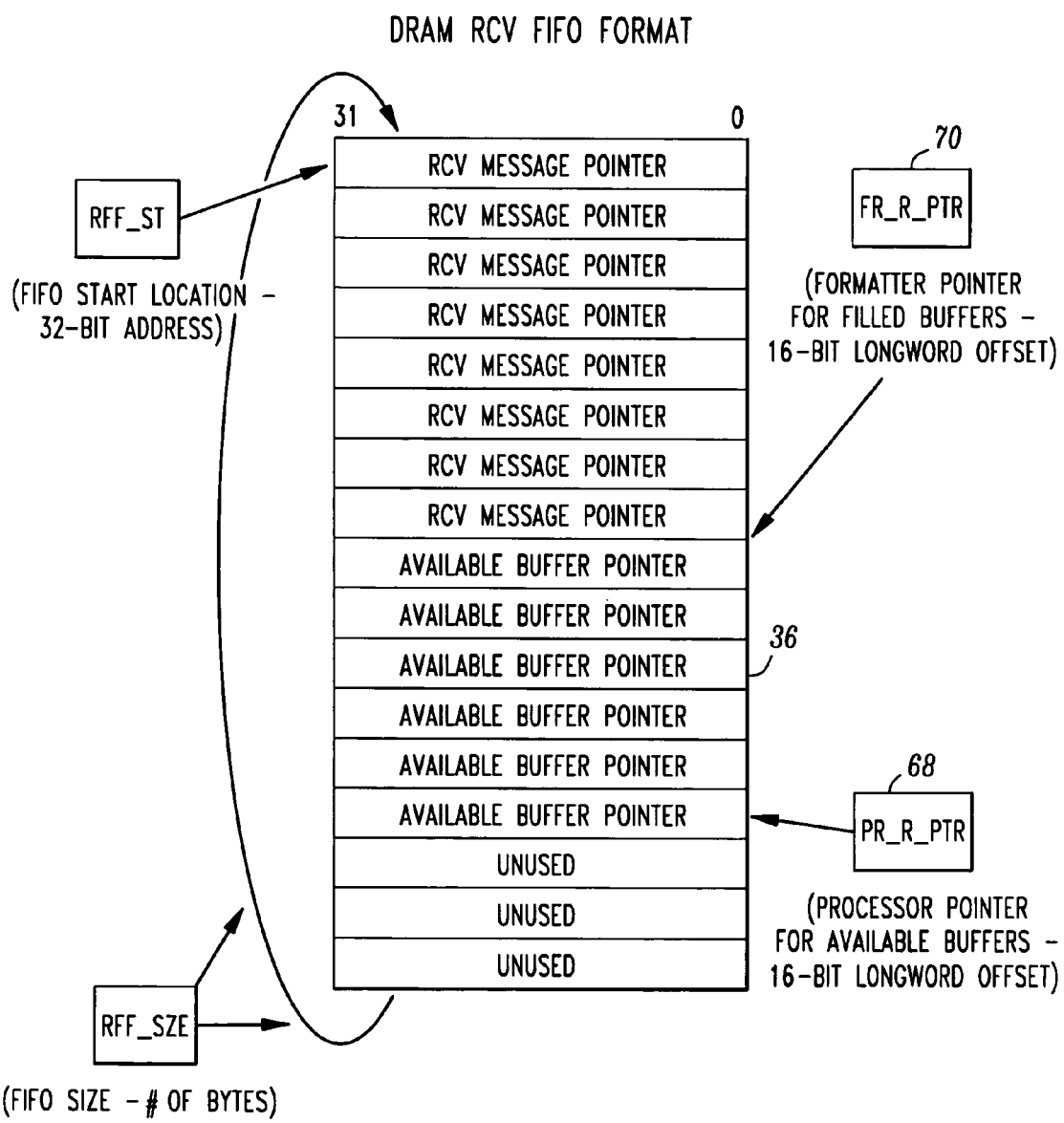
FIG. 9 illustrates a RCV FIFO implemented in accordance with the invention.

All FIFO index pointers (pointing to locations in the FIFO) stored in the FIFO index pointer store 67 are exchanged at fixed time intervals by the processor 10. FIGS. 8 and 9 show the FIFO formats and the associated index pointer fields in the RCV and TX index pointers in the index pointers 67. In FIG. 8, the index pointer 72 is labeled as a FoRmatter Tx PoinTeR "FR_T_PTR" and the index pointer 74 is labeled as a PRocessor Tx PoinTeR "PR_T_PTR," to indicate which component is responsible for maintaining the index pointer. Similarly, in FIG. 9, the index pointer 68 is labeled as a PRocessor Rcv PoinTeR "PR_R_PTR" and the index pointer 70 is labeled as a FoRmatter Rcv PoinTeR "FR_R_PTR."

The FIFO index pointers are 16 bit values that are longword offsets to the FIFO start addresses. This allows FIFO sizes up to 64K entries. The message buffer pointers (in the FIFOS) are 32-bit longwords that are direct addresses to the message buffers 30.

The following features are supported:

All message buffers start on 32-byte boundaries.

Message buffer size is programmable in increments of 32 bytes from 32 bytes to 64K bytes.

The buffers size applies to all channels, and is not dynamically configurable.

PCI DMA transfers are fixed at 32 bytes. Padding is added if necessary.

Only 1 message occupies a buffer.

Buffers are not linked if the message is larger than the buffer size. The message will be truncated, and the Overrun Buffer bit will be set.

FIFO index pointers stored in the HDLC formatter 2 are read and written by the processor 10 at fixed intervals (to reduce PCI bus traffic).

FIFO index pointers are 16 bits and are longword offsets to the FIFO start addresses. The address associated with the index pointer is [FIFO start address+(index pointer*4)].

The HDLC formatter 2 will set an ESR bit if it has received messages but no RCV message pointers are available in the RCV FIFO.

The HDLC formatter 2 will set ESR bits if the processor FIFO index pointers are outside of the FIFO address ranges. If the TX processor index pointer (PR_T_PTR 74) is out of range, the HDLC formatter 2 will stop the TX DMA operation until the processor writes a valid pointer. If the RCV processor pointer (PR_R_PTR 68) is out of range, the HDLC formatter 2 will stop the RCV DMA operation until the processor 10 writes a valid pointer.

Message buffer pointers are 32-bit addresses (not offsets).

Message buffer pointers are 32 byte aligned.

The message buffer base address and message buffer address limit are programmable to prevent the HDLC formatter 2 from accessing protected addresses. The entire maximum buffer specified in the Message Buffer Size Register (see register descriptions below) must fit in the allowable range. This applies to both the writing of receive messages and the reading of transmit messages.

The HDLC formatter 2 will set an ESR bit if the message buffer pointer is outside of the message buffer address range for any message. If this occurs for RCV messages, the RCV message buffer pointer is discarded and the next message buffer pointer in the RCV FIFO 36 will be used. If this occurs for TX messages, the TX message buffer pointer is discarded and the next message buffer pointer in the TX FIFO 34 will be used.

The TX FIFO 34 is empty when the formatter's TX FIFO index pointer FR_T_PTR 72 equals the processor's TX FIFO index pointer PR_T_PTR 74, and the RCV FIFO 36 is empty when the formatter's RCV FIFO index pointer FR_R_PTR 70 equals the processor's RCV FIFO index pointer PR_R_PTR 68.

3.2 Serial Format

3.2.1 Frame Format

Figure 10:
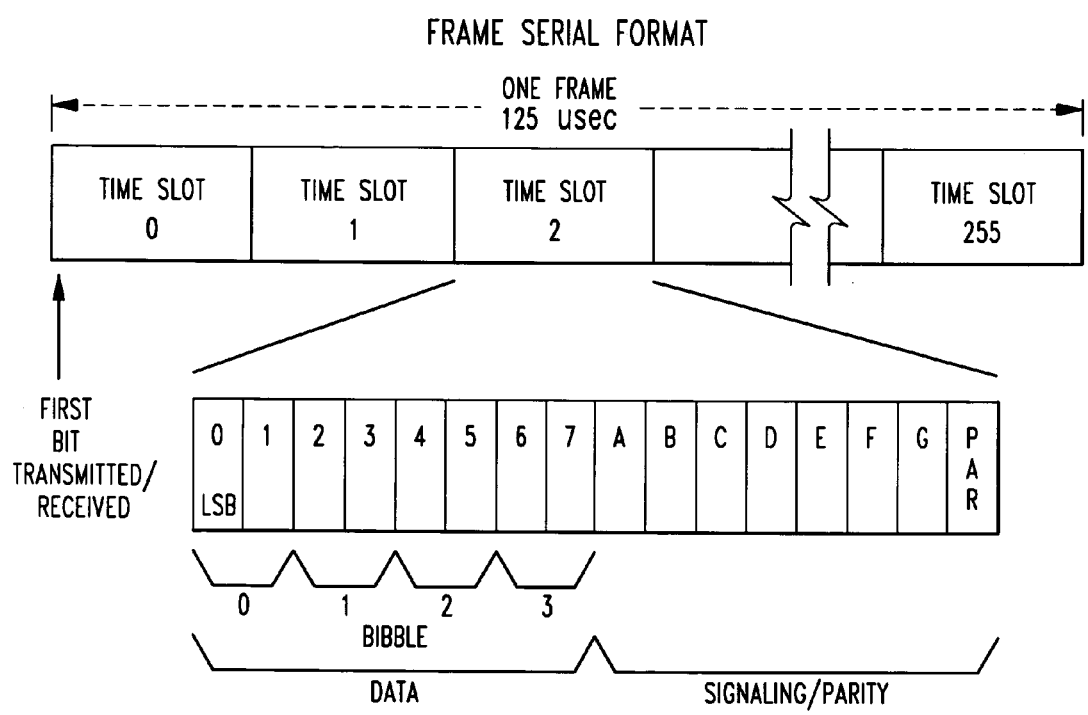
FIG. 10 illustrates a serial frame format for an input serial stream to the HDLC formatter of FIG. 1 containing message data.

One frame consists of 256 timeslots every 125 μsec. Each timeslot consists of 8 bits of data, 7 bits of signaling and one parity bit. This results in a 32.768 MHz clock rate. Bit 0 of timeslot 0 is the first bit sent in the frame. This is the least significant bit. Note that the order of the data bits may be reversed via the RCVREVERSE and TXREVERSE bits (see RAM descriptions below) in the Timeslot Mux RAM 42, however, for the embodiment described herein, the bit and bibble definitions correspond to the format shown in FIG. 10. Further description of the serial interface format is provided below.

3.2.2 Programming

Three registers define the timing relationships on the serial links. They are the RCV Data-Sync Position Register, the TX Data-Sync Position Register and the Sync Offset Register (see register descriptions below). The RCV Data-Sync Position Register defines the bit and timeslot that occurs at the time of the sync pulse on all three incoming links. Similarly, the TX Data-Sync Position Register defines the bit and timeslot that occurs at the time of the sync pulse on all three outgoing links. The Sync Offset Register defines the offset from the adjusted receive link sync pulse to the transmit sync pulse. The Sync Offset Register is programmed based on serial link clock periods. In all applications, these three registers must be programmed.

Figure 11B:
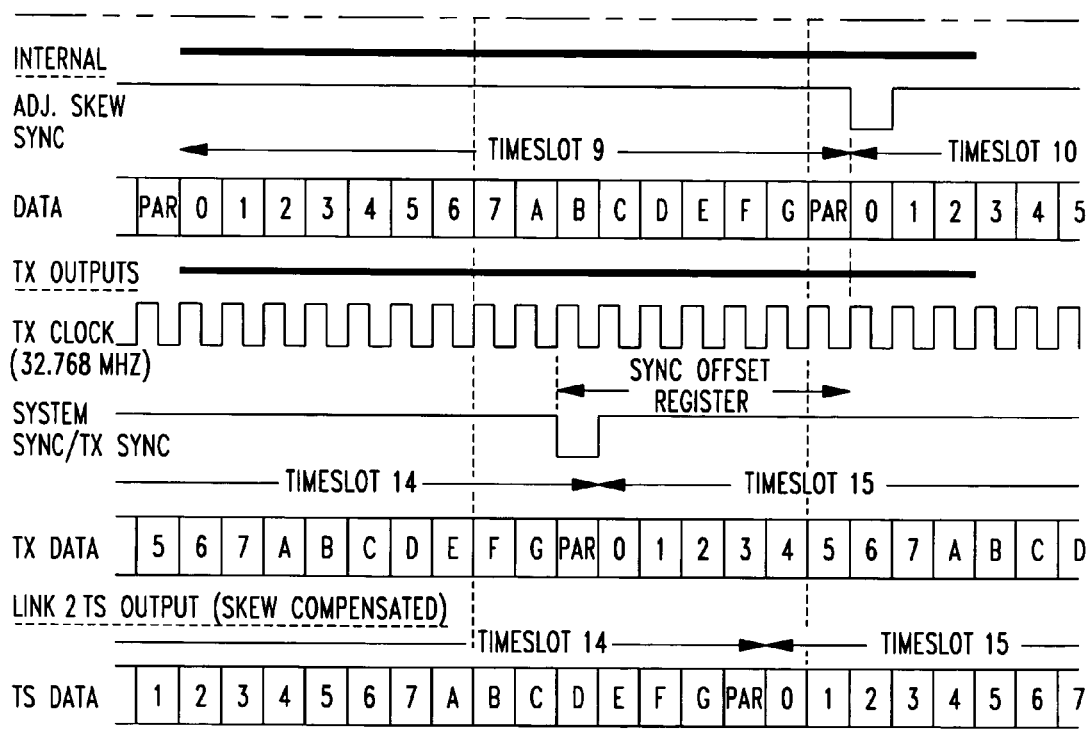
FIG. 11 is a timing diagram showing serial interface timing relationships used in the HDLC formatter of FIG. 1.

In the diagram of FIG. 11, the RCV Data-Sync Position Register is assumed to be programmed to timeslot 10, bit 0, and the TX Data-Sync Position Register is assumed to be programmed to timeslot 14, bit 15. The first three signals shown are the clock, sync and data inputs of serial link 2. In this diagram, link 2 ("locked") is selected for deriving the phase lock loop support signals via the Sync Control Register. The next six signals are the link 1 and link 0 inputs, respectively. As shown, the sync inputs for the two non-locked links must be within the maximum skew compensation value. The next section shows two internal signals labeled "Adjusted Skew Sync" and "Data." These represent the sync and data signals following the skew compensators 110 and skew mux 112 (see FIGS. 3 and 4). The serial link outputs are listed next. For the TX outputs, which are synchronized to the system clock, the Sync Offset Register is programmed to position the system sync pulse relative to the adjusted sync signal based on 32.768 MHz periods. For the TS outputs, which are synchronized to the corresponding receive link clock and which go through the skew compensators 110, the Sync Offset Register must be programmed to take into account the internal delays. Typically, only the TX or TS serial outputs will be used based upon the particular application, however, both outputs of each link will always be driven during operation.

3.2.3 Control Module Format

If the HDLC formatter 2 is implemented in a switch control module, it is preferred that the non-skew compensated transmit data outputs be used.

3.2.4 Message Handler Conversion

For Message Handler applications, a 16.384 MHz interface is provided, as shown in FIG. 12. This interface accepts and generates a separate parity lead. It converts this 8-bit per timeslot format to the 32.768 MHz format described in the sections above. The same parameters must be programmed. Note that the bit numbers listed in the figure are not PCM bit numbers. To select this interface, the MOD_SEL pin must be driven to a logic '0'.

3.3 Synchronization

Figure 13:
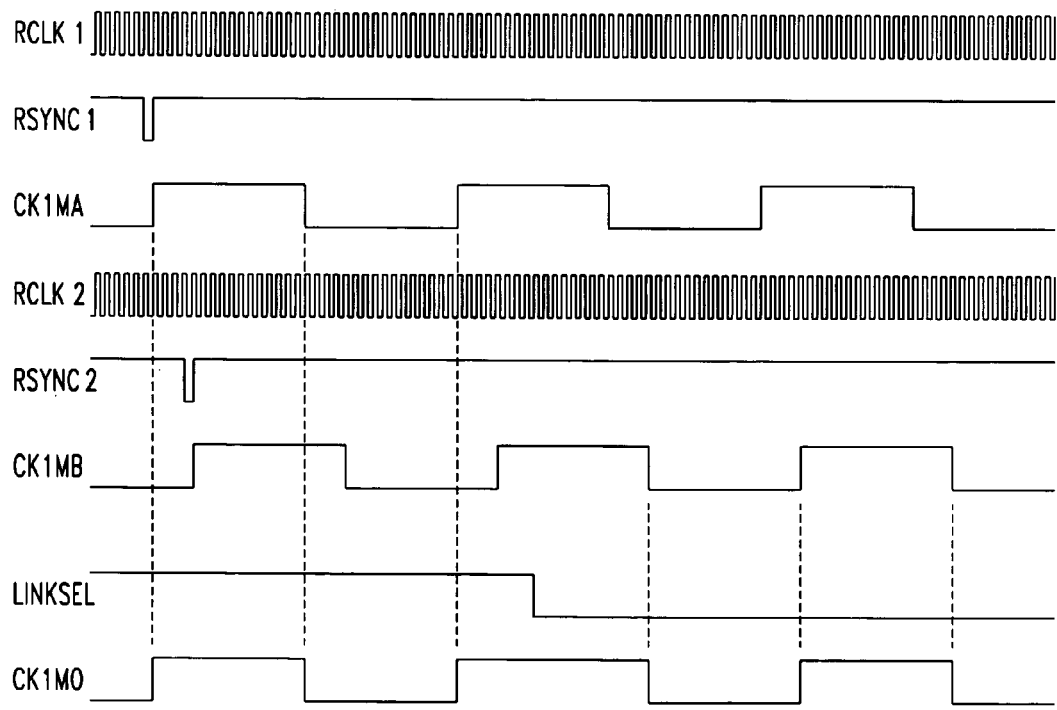
FIG. 13 is a timing diagram showing logic and phase lock loop synchronization for the serial interface of the HDLC formatter of FIG. 1.

Turning now to FIG. 13, logic and phase lock loop support signals are provided in the HDLC formatter 2 to allow the circuit pack to synchronize to the clock and sync from one of two serial links. Due to the various applications the HDLC formatter 2 can support, some of this logic is isolated from the rest of the device and accessible through I/O pins. Each application has a unique wiring scheme to provide the necessary synchronization. In all cases, the circuit pack will be both clock synchronized and frame synchronized to the selected link. Reset (RSTN) should not affect any logic associated with synchronization, including the sync muxes, skew compensators, synchronization clock dividers, and the Sync Control Register. To satisfy all of the applications, the following requirements must be met:

Ability to synchronize to one of two links on a single HDLC formatter 2.

Ability to synchronize to one of two links on two separate HDLC formatter 2 devices.

Allow up to 250 nsec of skew between the synchronization link and all other links.

Provide a lower frequency (1 MHz) synchronization clock to the circuit pack PLL.

Ability to switch synchronization from one link to another without loss of sync or slipped clocks.

Provide a 125 usec system sync pulse that is clocked from the PLL output clock.

The key to this synchronization is deriving a lower frequency clock from the link clock, with the rising edge of this slower clock synchronized to the link sync pulse. The frequency of this clock must be low enough to allow multiplexing two of these clocks derived from two links without creating glitches or missing an edge. If the skew between links is <250 nsec, a 1 MHz clock would accomplish this. This multiplexed clock (CK1MO) is then fed to the PLL unit 22 as the reference clock. In return, the PLL unit 22 provides a 65.536 MHz system clock and a 1 MHz locked clock (CK1MI).

Figure 14:
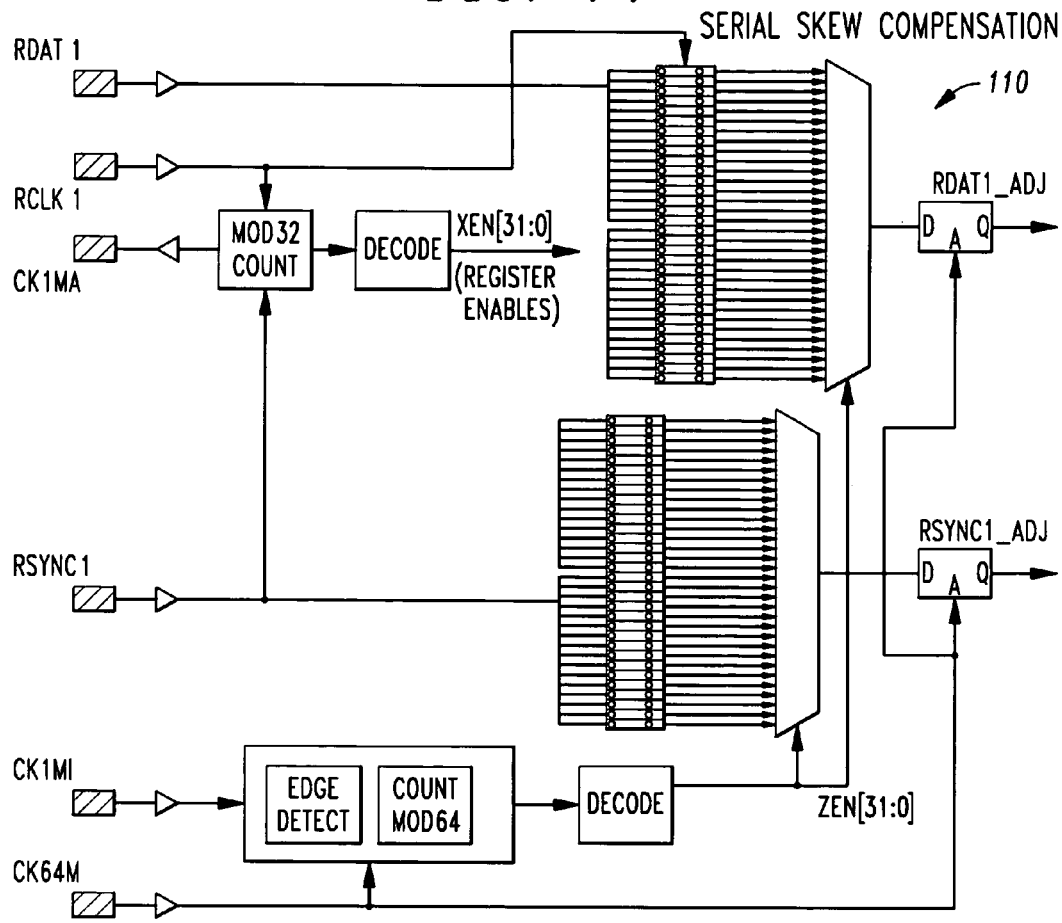
FIG. 14 is a functional block diagram showing serial skew compensation for one serial link to the HDLC formatter of FIG. 1.

The CK1MI clock from the PLL unit 22 is used in the serial input skew compensators 110 to allow the clean transition for link data and syncs from the link clock to the system clock. FIG. 14 shows a receive skew compensator 110 for one link.

Figure 15:
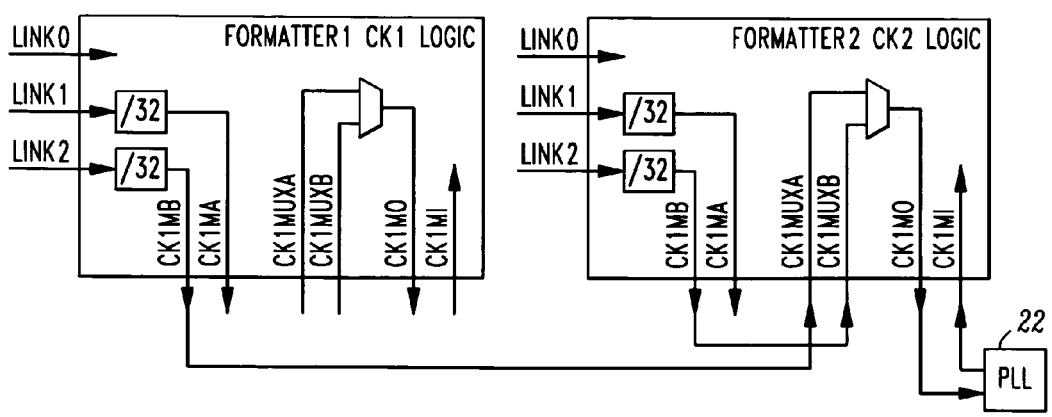
FIG. 15 is a functional block diagram showing synchronization between two links to two of the HDLC formatters of FIG. 1 in a switch control module implementation.

Once the sync pulse from the selected link has been synchronized to the system clock, this 125 usec pulse is used for the system sync across the entire HDLC formatter circuit pack. For more than one HDLC formatter 2, another multiplexer 112 is required to select the 125 usec skew compensated sync pulse from one of two links. The diagram of FIG. 15 shows a setup for synchronizing between two links on two separate HDLC formatters implemented in a switch control module.

Figure 16:
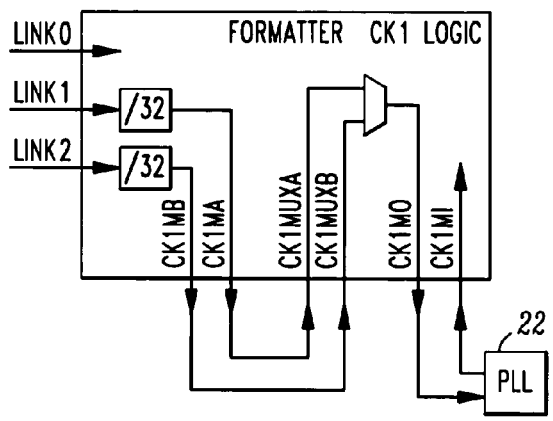
FIG. 16 is a functional block diagram showing synchronization between two links to a single HDLC formatter of FIG. 1 in a single HDLC formatter implementation.

The diagram of FIG. 16 shows the single HDLC formatter setup for synchronizing between two links on a single HDLC formatter 2.

Error detection consists of checking each skew compensated sync pulse on all 3 links. Any missing or out of place sync pulse is reported in an Error Source Register. A loss of clock will result in a sync error even though loss of clock is not specifically checked.

Skew compensation is not needed for the Message Handler application. The CK1MO signal for the PLL unit 22 is generated in the Message Handler Serial Conversion block. Since only one link is used, no CKI mux logic is needed.

Each of the foregoing configurations requires only a wiring setup. In addition, the MOD_SEL input pin (see pin descriptions below) will select serial data from either the differential 32 Mbps serial inputs or the Message Handler compatible 16 Mbps serial input. To configure PLL support in the HDLC formatter 2 for an application, only the Side Select bit (see register descriptions below) in the Sync Control Register needs to be written. All PLL support signals are unaffected by reset (RSTN) or BIST.

4. Subnetwork Descriptions 4.1 Serial Interface 4.1.1 Overview

The serial interface consists of three major sections: receiver, transmitter and format conversion. As described, the receiver accommodates three incoming serial links, each consisting of data, sync and clock. Similarly, the transmitter provides three output links, each consisting of data, sync, clock and skew compensated data. The outputs are always available, i.e. they are not blocked. The link inputs and outputs support 256 timeslots of 16 bits each resulting in 32.768 MHz clocking. The data, sync and clock inputs and outputs are differential signals.

In addition to the link inputs and outputs, three specialized interfaces are also provided. Single-ended taps of the clock for link 2 provide data and sync signals, as well as, single-ended outputs of the transmit clock, data & sync. The third interface receives two single-ended serial data bit streams and reclocks/drives them out as differential signals.

The format conversion interface function provides a 16.384 MHz interface with data in, data out, sync, clock, parity in and parity out, specifically for the Message Handler application. This interface translates the 16.384 MHz format to the 32.768 MHz format required by the receiver and transmitter functions. The inputs and outputs to this interface are single-ended signals. To select the interface, the MOD_SEL pin (see pin descriptions below) must be driven to a logic '0'.

4.1.2 Receiver

The Serial Receiver Interface consists of the following functional blocks.

Skew compensator (elastic store).
Serial input controller.
Timeslot Mux RAM.
Loopback.
Serial to parallel conversion.

The incoming data is first fed through the skew compensators 110, providing a maximum of 250 nsec of possible skew compensation between the three links. If fixed parity is selected in the Master Configuration Register (see register descriptions below), it will be checked on each link before it goes to the multiplexor 112. Parity is described in detail below. The multiplexor 112 allows selection of one of the three serial links on a timeslot basis, or selection of the loopback path (described in more detail below) on a bibble basis. This selection is done via the Timeslot Mux RAM 42 by individually programming the particular link or loop path selection for each timeslot.

In addition to the three links, override selection is also available. This choice selects use of the link programmed into the TS Mux Override Register (see register descriptions below). Note that selecting a bibble for loopback will override any link selection for that bibble.

Figure 17:
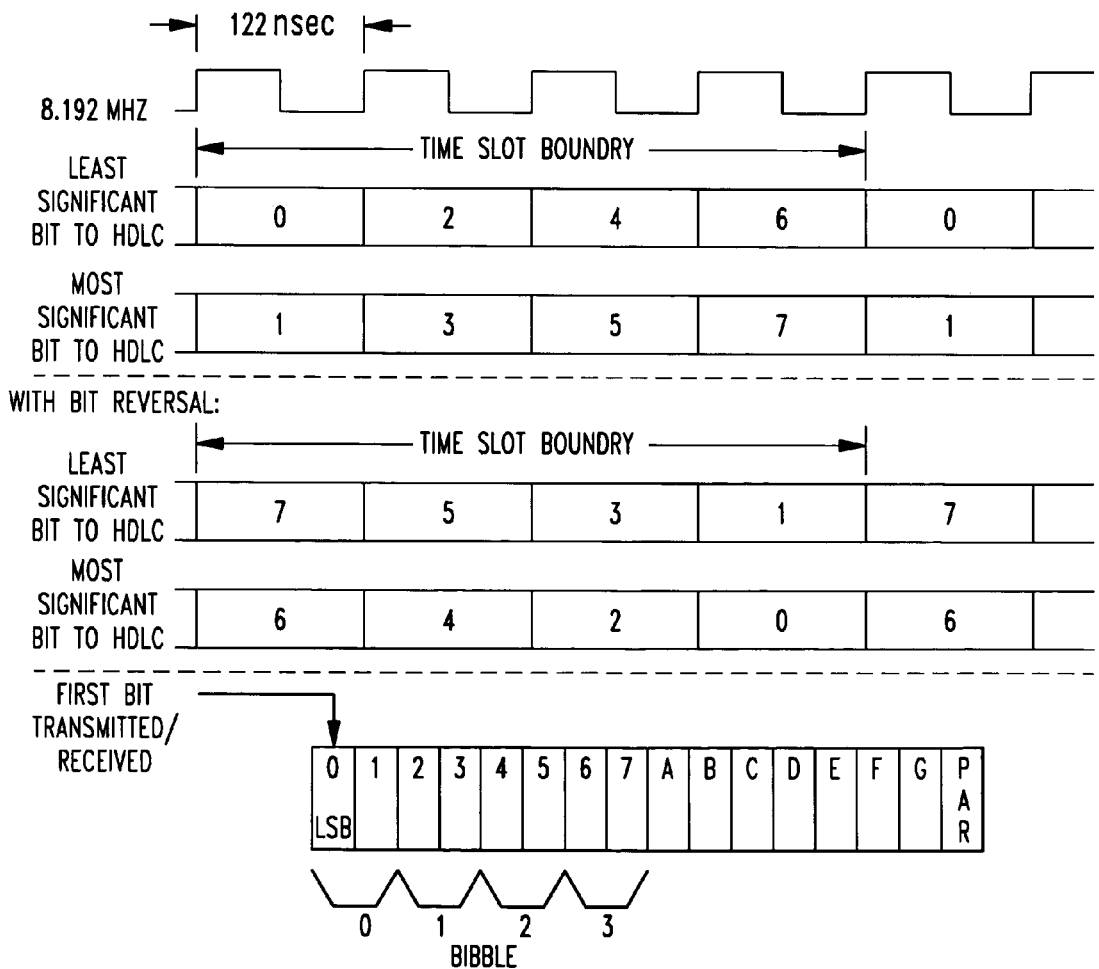
FIG. 17 is a timing diagram showing timing relationships for timeslot/data received on a serial link to the HDLC formatter of FIG. 1.

As shown in FIG. 4, following timeslot selection, the 8 bits of timeslot data are fed to a Serial Buffer Input Controller 114 and converted to parallel form as an 8-bit word. Each 8-bit word is further fed to a TS-bibble/Rate-adjust circuit 116 and then passed to the RCV HDLC processor 44 two bits at a time. The data bits are presented to the HDLC processor 44 at a rate of 8.192 MHz. The first least significant bit sent to the HDLC processor 44 is the first serial bit received, as shown in FIG. 17. This order can be reversed via the Timeslot Mux RAM 42 on a timeslot basis for the transmit and/or receive direction. In that case, the eighth serial bit received is the first least significant bit sent to the HDLC processor 44, as shown in FIG. 17. Signaling bits A through G are only used for fixed parity checking and walking parity detection. The Timing and Control circuit 118 generates framing information for the RCV Serial Front End 40 and the TX Serial Front End 102.

The Timeslot Mux RAM 42 is configured as 256×8 bits, corresponding to one location per timeslot. Both the RCV Serial Interface 40 and the TX Serial Interface 102 access this RAM. It contains the link selection, loopback selection and bit order reversal selection for each timeslot.

4.1.3 Transmitter

The TX Serial Interface 102 consists of the following functional blocks.

A parallel to serial conversion and control unit 120.

Walking parity insertion mux 122.

Loopback Support.

A skew compensator 124.

E bit generation.

Two bit parallel data is received at a Bibble-to-TS/Rate adjust circuit 126 from the TX HDLC processor 94 at an 8.192 MHz rate. This data is converted into a 16 bit format, consisting of the 8 bits of data, 7 bits of signaling, and one parity bit. Normally, the first least significant bit received from the HDLC processor 94 will be the first bit transmitted. However, if bit reversal is selected, the first least significant bit received will be the eighth bit transmitted. This is similar to the receive operation described above. The parity may be selected to be odd, even or walking, as described below. The parity is generated over all 16 bits. Signaling bits A through D, F and G are transmitted as all zeros or all ones as defined by the SIGBITS bit (see register descriptions below) in the Master Configuration Register. Signaling bit E is controlled by the EBITEN and EBITSNS bits (see bits) in the Master Configuration Register. If EBITEN is a '0', the E bit is driven per the SIGBITS selection. If EBITEN is a '1', the E bit will be driven active for any timeslot which contains at least one bibble which is assigned to a channel per the Timeslot Channel Map RAM 46. The EBITSNS bit, in this case, defines the active state for the E bit. The serial data is also made available to the RCV Serial Interface 40 for loopback, which is described below. The same serial information is transmitted on all three links. Each link has two data outputs, one of which goes through the skew compensator 124.

4.1.4 Format Conversion

The format conversion interface function consists of the following functional blocks.

Translate and skew.

Clock generation.

This interface accepts 16.384 MHz serial data with a separate parity lead and converts it to a 32.768 MHz format. In addition to the data and parity inputs, there is a 16.384 MHz clock, and an 8.192 KHz sync pulse. The outputs for this interface are a transmit data signal and a parity signal.

4.1.5 Parity

Parity is selected in the Master Configuration Register and applies to all links. Fixed or walking parity may be selected for the three incoming links, however, only fixed parity should be selected for the format conversion interface. If fixed parity is chosen, odd or even must be individually selected for the transmit and the receive directions, and it is checked across the 16 bits of data and signaling on each link before it goes to the multiplexor 112. Each link has a corresponding error bit in the Error Source Register (see register descriptions below). The Master Configuration Register also allows selection of whether to check every timeslot or every eighth timeslot, i.e. timeslots 0, 8, 16, 24, ..., 240 and 248. If every eighth timeslot is selected, any parity errors occurring between checked timeslots will not be latched into the Error Source Register.

For walking parity, the incoming parity of each selected timeslot is detected on the output of the multiplexor 112, and then stored in a walking parity buffer 128. On transmission, this buffer is read and the corresponding parity will be inserted for each timeslot. Parity errors are blocked if walking parity is selected. If walking parity is selected and the format conversion interface is used, received parity will not be checked and the transmitted parity will be based on the value of the TPARSENS bit (see register descriptions below) in the Master Configuration Register.

4.1.6 Loopback Link selection is done on a timeslot basis; however, loopback is selectable on a bibble basis to allow loopback of a single channel. Since odd/even parity checking is done before the multiplexor 112, loopback will not affect this type of parity checking/generation. However, if walking parity is selected and loopback of a bibble in a timeslot is also selected, the outgoing parity could be wrong, since walking parity is detected after the multiplexor 112. If bibbles are selected for loopback, these bibbles are still transmitted on all three links. In addition, the entire transmit link can be selected for loopback via the Diagnostic Register (see register descriptions below).

4.1.7 Diagnostics Support

To aid diagnostic support for the serial interface, several capabilities have been added. The serial transmit data may be looped back to the receive side on a per bibble basis, as described above. In addition, the entire serial transmit link can be looped back to the receive side via one bit in the Diagnostic Register. If fixed parity is selected, receive parity errors can be forced by selecting the "known wrong" RCV parity in the Master Configuration Register. However, because this receive parity selection applies to all three links, all three links will take parity errors. Individual receive parity errors cannot be forced. Similarly, by selecting the "known wrong" TX parity, bad parity can be transmitted. Enabling the SYNCERR[2:0] bits in the Error Force Register (see register descriptions below) forces a sync error on the selected link. This action forces an error by blocking the incoming link sync signal from the sync error detectors.

4.2 HDLC Processor

HDLC processing in the HDLC formatter 2 is done at two different points in the data stream. The majority of it is done just behind the RCV Serial Interface 40 to convert between timeslots and messages. The exception to this is that CRC check/generation is done when messages are passed between the SRAM 20 and the PCI interface 6. Both areas operate at a 65 MHz clock rate.

The HDLC processor 44 delineates messages within a serial data stream with an 8-bit flag pattern of 01111110. In order to send arbitrary data patterns, a 0 is inserted in the message bit stream after every five consecutive U's. This is known as zero stuffing. No header information is recognized by the hardware, so the message stream consists only of a multiple-byte information field followed by a 2-byte CRC.

4.2.1 CRC

A CRC is used to verify message integrity over the serial links and is part of the HDLC protocol. The HDLC formatter 2 uses the 16-bit CRC defined by the CCITT and characterized by the polynomial $x^{16}+x^{12}+x^{5}+1$. It is calculated on a byte-wide basis.

In the receive direction, the CRC is checked as the message, including the received CRC, is transferred from the SRAM 20 to the Transmit Burst Line 66 of the PCI Interface 6. The two CRC bytes are not put in the Burst Line. A bad CRC indication is written in the status field of that message's header in the DRAM 8.

For transmitting, a CRC is calculated while the message is transferred from the Receive Burst Line 80 in the PCI Interface 6 to the SRAM 20. The CRC is then appended to the message in the SRAM 20. A control bit in the DRAM message header is used to force a bad CRC to be transmitted for that message. This is accomplished by inverting the CRC as it is stored into the SRAM 20.

4.2.2 Timeslot Channel Assignment and the Timeslot Channel Map RAM

Figure 18:
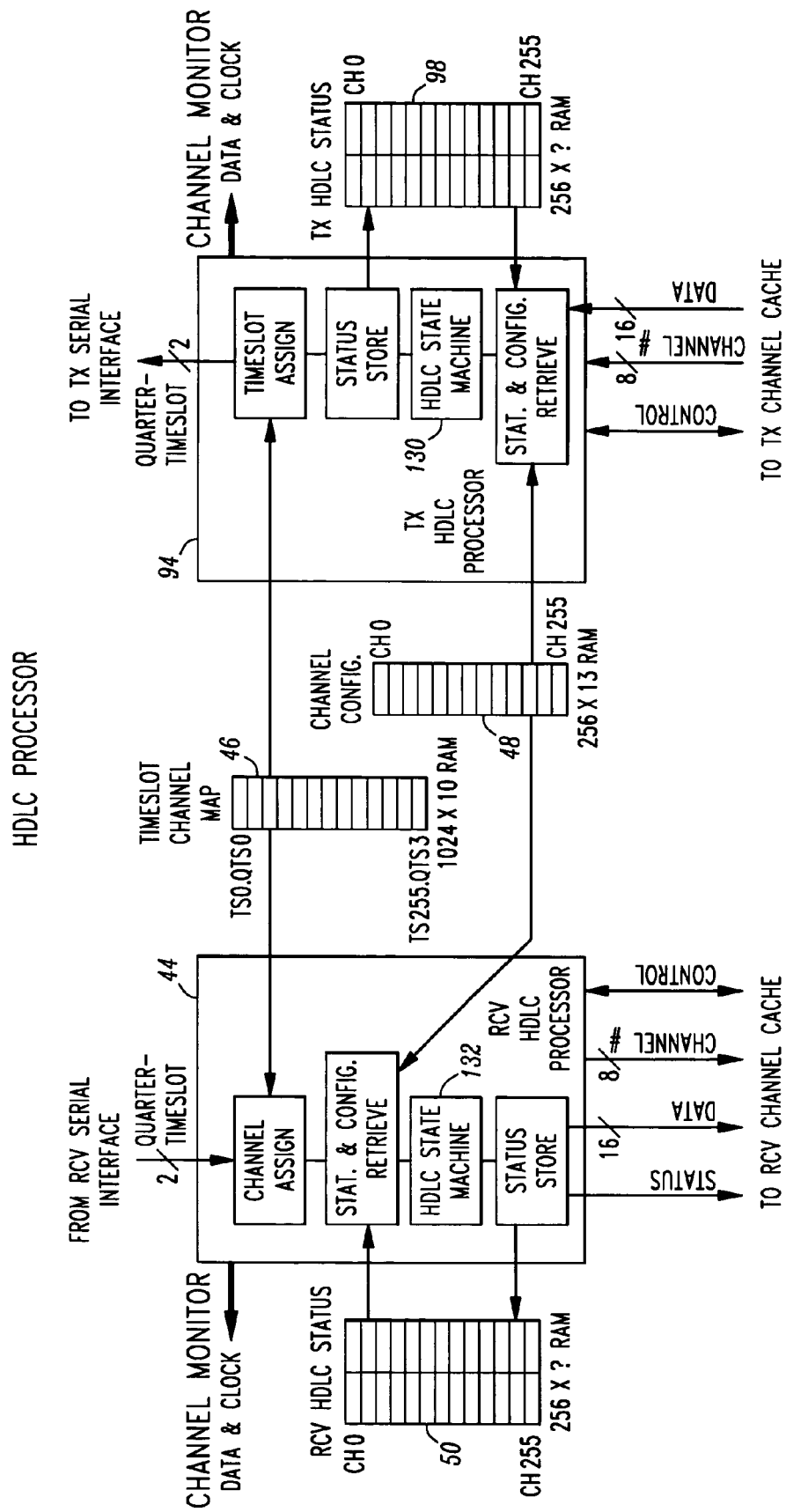
FIG. 18 is a functional block diagram of RCV and TX HDLC processors in the HDLC formatter of FIG. 1.

Turning now to FIG. 18, timeslot data is associated with channels via the Timeslot Channel Map 46 on a per-bibble basis. The timeslot number and bibble number are used by the HDLC Processor 44 to index into this 1024-word RAM. Each RAM location contains a bit indicating whether the quarter-timeslot is active (assigned to a channel), an 8-bit channel number, and a half-rate bit to indicate that only the least significant bit of the bibble should be used. Bit definitions are documented in the RAM portion of the register descriptions set forth below. This format allows channels to be formed with rates ranging from 8 Kb/s to 16 Mb/s in 8 Kb/s increments. While timeslots can be concatenated randomly to form channels greater that 64 Kb/s, the use of quarter-timeslots needs to be somewhat restricted. A channel that spans multiple timeslots requires any unused quarter-timeslots within those timeslots to be left unassigned. In order to assign quarter-timeslots within a single timeslot to different channels, each of those channels must only use that single timeslot. Software is responsible for making sure this is adhered to. This allows the transmit channel cache to operate efficiently, while still accommodating D-channel packing. If software does not adhere to these rules, message data loss can occur which will be indicated by the TXC-CLOSS bit in the ESR register (see register descriptions below).

The Timeslot Channel Map RAM 46 is read by both the RCV and TX HDLC Processors every 8 clocks. To avoid contention between the two, alternate clock cycles are allotted for access by each. PCI read/write access is granted at a lower priority during any clock cycle. Upon reset, the RAM 46 self-initializes to have all timeslots unassigned.

4.2.3 Channel Configuration RAM

Control information that applies to an entire channel is written in the 256-word Channel Configuration RAM 48, which is addressed by the channel number. Each RAM location contains bits to turn on the channel in each direction, a bit to invert the data stream, a 6-bit number to indicate how many flags should minimally be sent between messages, a bit to denote the channel as high bandwidth to ensure proper Transmit Channel Cache operation, a bit to indicate that the channel should be looped in the SRAM 20, and 2 bits reserved for future use. Bit definitions are documented in the RAM portion of the register descriptions set forth below. The Channel Configuration RAM 48 is read by both the RCV and TX HDLC Processors every 8 clocks. To avoid contention between the two, alternate clock cycles are allotted for access by each. PCI read/write access is granted at a lower priority during any clock cycle. Upon reset, the RAM 48 self-initializes to turn off reception and transmission for all possible channels.

4.2.4 HDLC Shared State Machines and the HDLC Status RAMs

Still referring to FIG. 18, the HDLC processing of the messages is done by state machines 130 and 132 that are shared by all of the 256 possible channels in a time-multiplexing fashion. The work is done two bits at a time, one bit at a time in the case of a half-rate quarter timeslot, and the current state information of each channel is stored in the HDLC Status RAMS. The Serial Interfaces 40 and 102 send to or receive from the HDLC Processors 44 and 94 a quarter-timeslot every 8 clocks. The shared state machines 130/132 then have 8 clocks to retrieve the current channel's state information, process the two bits of the quarter timeslot, and store the channel's new state information back into the respective HDLC Status RAMs 50 and 98. Up to 16 bits of data are stored with each channel's state information. This allows each HDLC Processor's interface to the Channel Caches 52 and 92 to be a 16-bit data word transfer with simple handshaking controlled by the HDLC Processor. This 16-bit data word has the bit sent or received first in time as the least significant bit, bit 0, and the bit sent or received last as bit 15.

The RCV HDLC Processor 44 and the TX HDLC Processor 94 each have their own 256-word HDLC Status RAM 50 and 98, respectively, that are addressed by channel number. Because each RAM 50 and 98 is dedicated to the shared state machines 130/132, no access arbitration is needed. Upon reset, the RAMs 50 and 98 self-initialize to the idle state.

4.2.5 Receive and Transmit Channel Monitoring

Both the RCV and TX HDLC Processors 44 and 94 generate a serial data output with clock for a particular channel, if this feature is enabled. This allows a single channel to be monitored with an external protocol analyzer. The enable and the channel number are in the Diagnostic Register (see register descriptions below). The Timeslot Channel Map 46 information is used to generate the output clock that is active only when there is active data for that channel. The data that is monitored is in it's noninverted state for those channels that have the INVERT bit set in the Channel Configuration RAM 48 (see RAM descriptions below). The data outputs (RCV_CHOUT and TX_CHOUT) change at a 16 MHz rate, and the clocks (RCV_CHCLK and TX_CHCLK) are gated 16 MHz clocks.

4.2.6 Message Reception

The RCV HDLC Processor 44 gets new quarter-timeslot data every eight clocks from the RCV Serial Interface 40. It also gets the timeslot number and bibble number. The Timeslot Channel Map RAM 46 is accessed to determine which channel the data belongs to, if any, and if it is a half-rate quarter-timeslot. If the quarter-timeslot has not been assigned, no further action is taken. Otherwise, the channel number is used to access the Channel Configuration RAM 48 and the Receive HDLC Status RAM 50. If the channel is not active, as indicated by a bit in the Channel Configuration RAM 48, and it did not go inactive while receiving a message, nothing is done. Otherwise, the data may be inverted and the state machine status is loaded. If the current state is the flag mode, ones (1's) are counted to look for a data pattern to enter the data mode. When in the data mode, data bits are collected and counted and ones are counted for zero-deletion, flag detection, and abort detection. When 16 data bits have been collected, they are passed off to the Receive Channel Cache 52. Status and the remaining data bits are passed to the Receive Channel Cache 52 when either a flag or an abort is detected or the channel was turned off. If the force-receiver-turned-off bit is set in the Error Force Register (see register descriptions below), the actual RCVON bit in the Channel Configuration RAM 48 (see RAM descriptions below) will be ignored once the data mode is reached. A bit alignment check is also done when the ending flag is detected. If the force-framing-error bit is set in the Error Force Register, the bit count is altered so that this check will fail. Other information that is passed to the Receive Channel Cache 52 is the loop-at-SRAM indicator and possible FISU indicator(s). After processing, the new current state of the state machine 132 is stored back into the Receive HDLC Status RAM 50.

4.2.7 Message Transmission

The TX HDLC Processor 94 gets the timeslot and bibble numbers for the next data needed by the TX Serial Interface 102. This information is used to access the Timeslot Channel Map RAM 46 to determine the channel number, if any, and the rate. If no channel is enabled for this quarter-timeslot, ones (1's) are sent to the Serial Interface 102 and no further action is needed. Otherwise, the channel number is used to access the Channel Configuration RAM 48 and the Transmit HDLC Status RAM 98 and request the next 16 bits of data from the Transmit Channel Cache 92 in case they are needed. The request to the Channel Cache 92 includes whether this is a high bandwidth channel, channel on/off status, and possible FISU information, as indicated by the bit(s) in the Channel Configuration RAM 48 (see RAM descriptions below). Whether or not the channel is active or not, as indicated by a bit in the Channel Configuration RAM 48, the status of the state machine 130 is loaded. The state machine 130 can be in one of three modes, flag insertion, waiting for something to transmit, or transmit. If the channel is not active, the state machine 130 continues to send flags if it is not in the transmit mode, or it sends an abort and then leaves the transmit mode. Data continues to be requested for inactive channels, and it is acknowledged as if the channel was active in order not to overload the Channel Cache 92. When the channel is active and the state machine 130 is in the transmit mode, data bits sent are counted in order to acknowledge when data from the Channel Cache 92 is taken and ones (1's) are counted to insert zeros (0's) properly. At the end of the message, as indicated by the Channel Cache 92, the flag insertion mode is entered to put out the number of flags that are indicated in the Channel Configuration RAM 48. When the correct number of flags have been sent, the state machine 130 goes to the waiting-to-transmit mode and continues to send flags while checking for more messages from the Transmit Channel Cache 92. Before data bits are sent to the TX Serial Interface, 102 they may need to be inverted. If it is a half-rate quarter-timeslot, as indicated by a bit in the Timeslot Channel Map 46, the state machine 130 sends only one data bit and forces the second bit to a one (1). After processing, the new current state of the state machine 130 is stored back into the Transmit HDLC Status RAM 98.

4.3 Receive Channel Cache

In the receive direction, channel data from the RCV HDLC Processor 44 must be temporarily stored until the RCV Linked List Controller 56 is available. The RCV Channel Cache RAM 52 is configured as a large FIFO controlled by the RCV Channel Cache Controller 54. As data is transferred from the RCV HDLC Processor 44, the RCV Channel Cache Controller 54 puts the data into the RAM based FIFO along with the channel number and status information. This status information includes start of message, end of message, valid byte count, and HDLC information (abort received, receiver turned off, framing error). As the RCV Linked List Controller 56 becomes available, the RCV Channel Cache Controller 54 pops the data off the FIFO 52. To account for the burst characteristic of the RCV HDLC Processor 44 and the latency in accessing the SRAM 20, the FIFO 52 is 512 entries deep.

4.4 Transmit Channel Cache 4.4.1 Overview

The Transmit Channel Cache 92 operates as a channel data prefetch for the TX HDLC Processor 94. For the transmit direction, channel message data needs to be available when the TX HDLC Processor 94 requests it. Because the TX Serial Linked List Controller 86 requires many clock cycles to retrieve data from a linked list in the SRAM 20, the TX Channel Cache 92 will prefetch the data from the TX Linked List Controller 86 before it is needed by the HDLC Processor 94.

Figure 19:
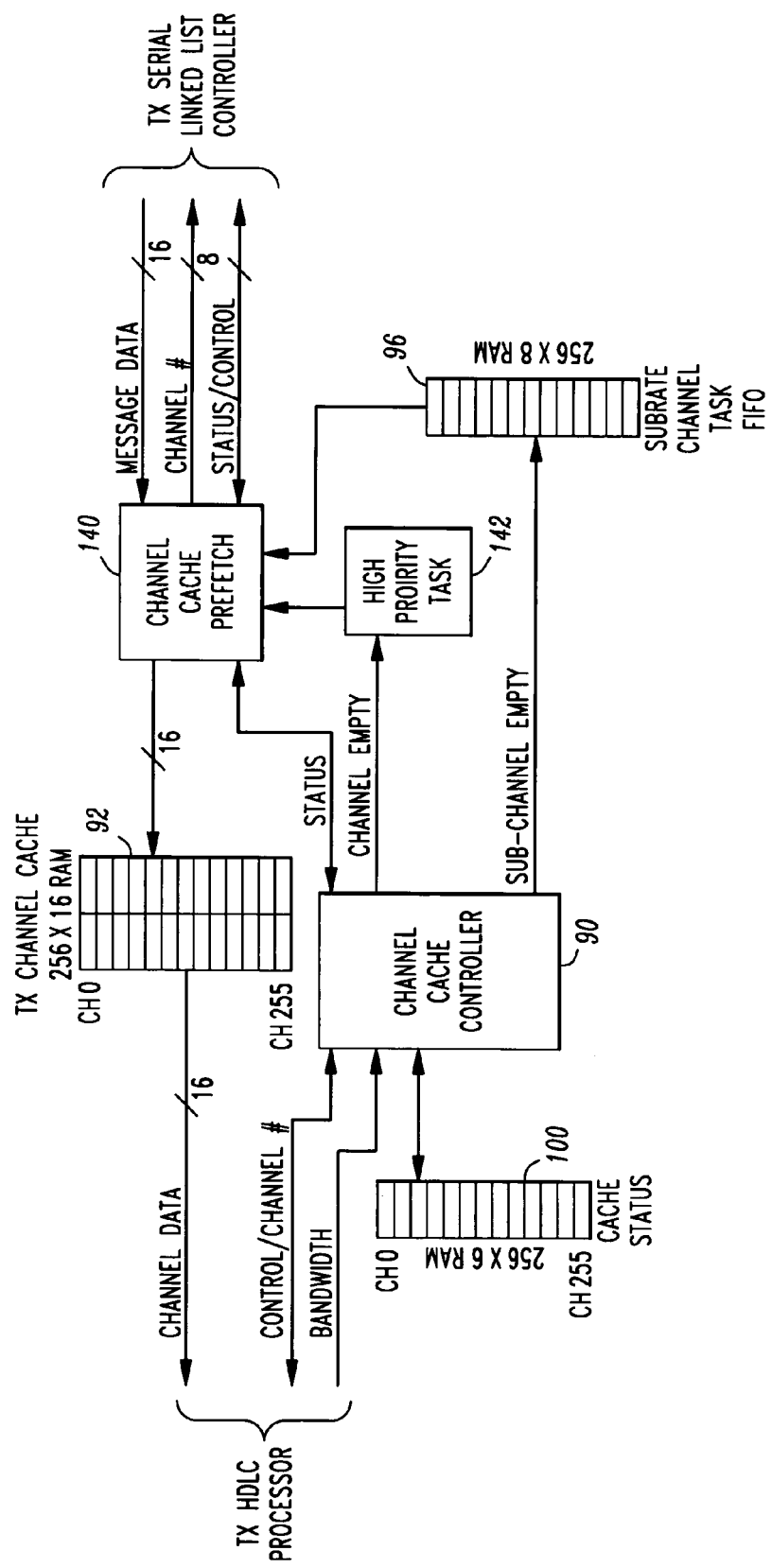
FIG. 19 is a functional block diagram of transmit channel cache components in the HDLC formatter of FIG. 1.

The TX Channel Cache 92 also does not know which channel will be requested next, so it should have data prefetched for all channels. This can be a problem for D-channel packed timeslots, because a request from the TX HDLC processor 94 can occur every 8 clock cycles. For timeslots that hold only 1 channel, a request will occur at most every 32 clock cycles, allowing the TX Channel Cache 92 time to refill the cache location. To handle these two different situations, two request queues are used, as shown in FIG. 19.

The key to using two different request queues is the identification of channels that are packed into timeslots with other channels. Software must include this information in the Channel Configuration RAM 48 for each channel. The TX HDLC Processor 94 then passes this information to the TX Channel Cache 92 when requesting data. This places one limitation on the mapping of timeslots to channels: any channel that shares a timeslot with another channel cannot be concatenated with data in any other timeslot. This limitation will prevent a low bandwidth channel from requesting data more often than needed.

4.4.2 Operation

In "standby" mode, the TX Channel Cache 92 has a 16-bit word stored for each channel that is active. When the TX HDLC Processor 94 requests a new word for a specific channel, that data is immediately read from the TX Channel Cache 92 and provided to the TX HDLC Processor 94 along with status information. This status information includes start-of-message, end-of-message, and valid byte count. At this time, the TX HDLC Processor 94 does not know whether it will actually need this data, so the TX Channel Cache 92 will not prefetch new data. If the TX HDLC Processor 94 determines that the new data is needed, it will latch this data and send a signal back to the TX Channel Cache 92 along with a "Bandwidth" signal to inform the TX Channel Cache 92 that new data should be prefetched. The TX Channel Cache 92 then looks at the Bandwidth signal to determine how to handle the prefetching of the next word for the channel.

If the Bandwidth signal is set to a one (1), indicating a packed channel, the channel number is placed onto the Subrate Channel Task FIFO 96. If no high priority channel requests are pending, a Channel Cache Prefetch unit 140 pops off the top entry in the Subrate Channel Task FIFO 96, and sends a request for the next message word to the TX Serial Linked List Controller 86. Upon receiving the data from this Linked List Controller, the data is placed in the TX Channel Cache 92 and the Cache Status RAM 100 is updated with the appropriate information.

If the Bandwidth signal is set to a zero (0), indicating a non-packed channel, the channel number is placed in the high-priority request queue 142 for immediate servicing. The Channel Cache Prefetch 140 immediately takes this channel and requests new data from the TX Serial Linked List Controller 86. The total turnaround time for transferring data from the SRAM 20 to the TX Channel Cache 92 must be less than 32 clock cycles (1 timeslot). Once the TX Serial Linked List Controller 86 has provided the next word of message data, this data is placed in the TX Channel Cache RAM 92 and the Cache Status RAM 100 is updated.

The TX Channel Cache 92 must support the following:
Prefetch data for a non-packed channel in less than 32 clock cycles.

Provide a low bandwidth FIFO for buffering packed channel requests. These requests must be serviced in less than one frame (125 usec).

Inform the TX HDLC Processor 94 when data supplied is the beginning of a message.

Inform the TX HDLC Processor 94 when data is the end of a message.

If data is the end of a message, inform the TX HDLC processor 94 if 1 or 2 bytes are valid.

Set event bits in the Error Source Register if data is not available in time for the TX HDLC Processor.

4.5 SRAM Interface Controller

Figure 20:
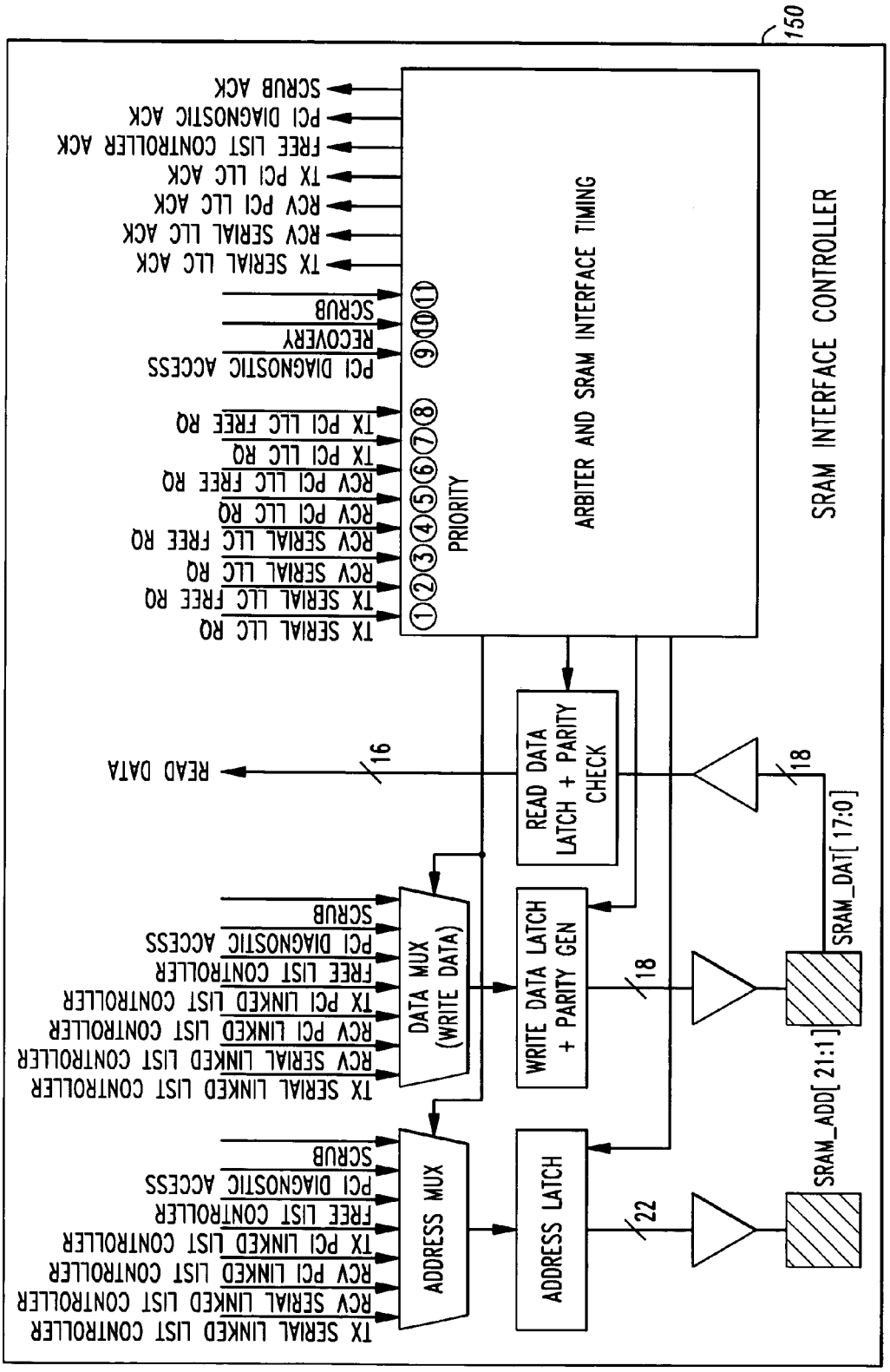
FIG. 20 is a functional block diagram of an SRAM interface controller in the HDLC formatter of FIG. 1.

As shown in FIGS. 5 and 20, the SRAM Interface 18 includes a controller 150 that provides arbitration from seven separate blocks to the SRAM 20. As can be seen in FIGS. 4 and 5, these blocks include the four linked list controllers 56, 60, 84 and 86, a Free List Controller 152, PCI diagnostic access 154 (through indirect address/data registers), and the Scrub function 156.

Figure 21:
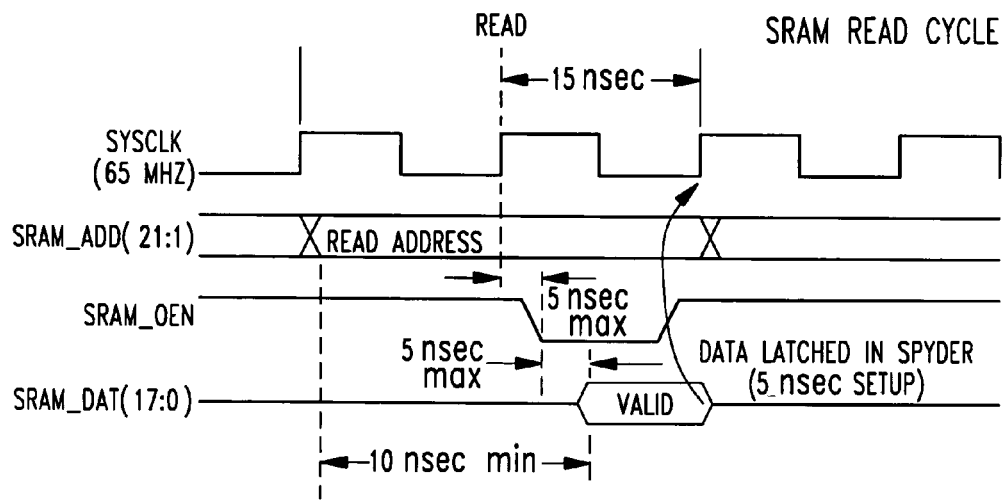
FIG. 21 is a timing diagram showing a read cycle for an SRAM accessed by the HDLC formatter of FIG. 1.
Figure 22:
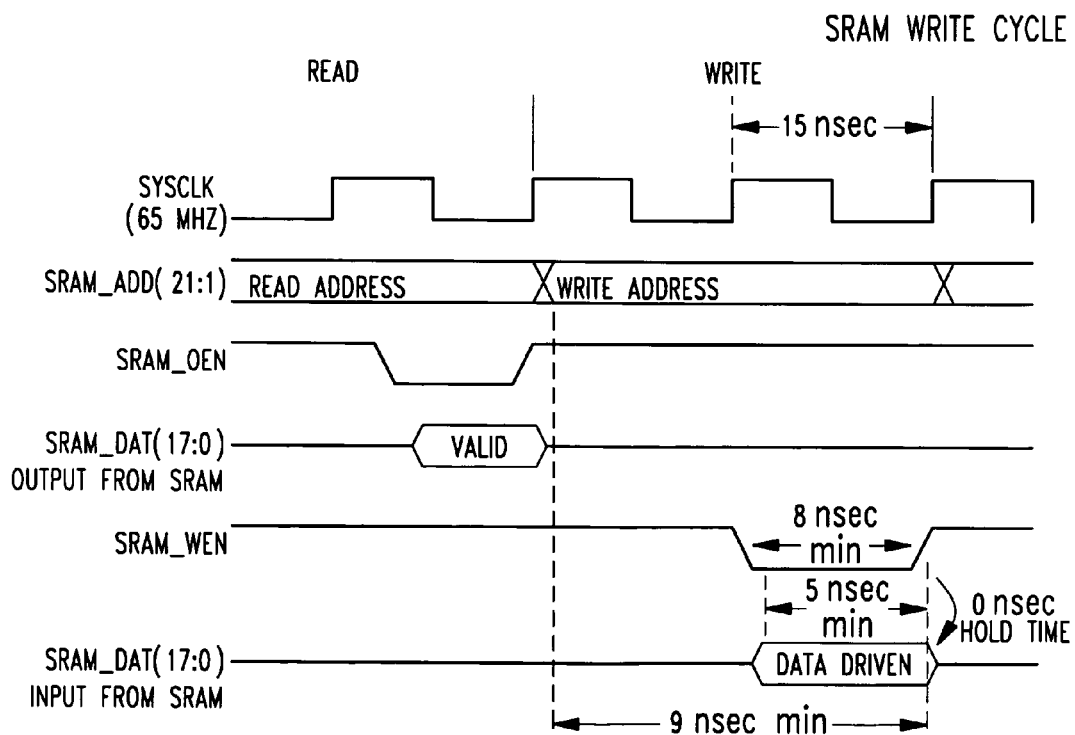
FIG. 22 is a timing diagram showing a write cycle for an SRAM accessed by the HDLC formatter of FIG. 1.

The SRAM 20 is a standard asynchronous fast static RAM. The interface 18 to this SRAM will work with SRAMs from a variety of vendors. The data bus width is 18 bits with parity support. The least significant bit of the address is hardwired to 0 because the HDLC formatter 2 will generally always perform 16 bit accesses. Any SRAM byte enable bus lines will also be hardwired to the active state. The SRAM chip-select bus line will always be enabled. FIG. 21 shows a timing diagram for a read cycle. The SYSCLK is shown for implementation information only and is not part of the SRAM interface. FIG. 22 shows the timing diagram for a write cycle. A full SYSCLK clock cycle (15 nsec) of non-overlap is provided on the data bus between a read cycle and a write cycle.

4.5.1 Arbitration Priority

The arbitration priority algorithm is based on the real time needs of the various blocks. The Free List Controller 152 must have equivalent priority of the block that it is servicing, so 4 separate requests are provided. As described relative to the TX Channel Cache 92, the TX Serial Linked List Controller 86 must have top priority due to the need for data within 32 clock cycles, with corresponding free list accesses having second priority. The RCV Serial Linked List Controller 56 is given next priority. Although the RCV Channel Cache FIFO 52 is used to prevent loss of data, it is necessary to make sure the FIFO does not overflow. Next in arbitration priority is the RCV PCI Linked List Controller 60, because the only way to lose data is to have the entire SRAM 20 filled up. The TX PCI Linked List Controller 84 has no real time needs as the HDLC formatter 2 can take its time DMA-transferring the message from the DRAM 8 to the SRAM 20. The lowest priorities are assigned to the PCI diagnostic access, Recovery, and Scrub functions.

4.6 Linked List

As indicated, the HDLC formatter 2 has five separate linked list controllers:
1. The RCV Serial Linked List Controller 56.
2. The RCV PCI Linked List Controller 60.
3. The TX Serial Linked List Controller 86.
4. TX PCI Linked List Controller 84.
5. The Free Linked List Controller 152.

Two of the controllers, the RCV Serial Linked List Controller 56 and TX PCI Linked List Controller 84, handle the assembly of linked list messages. The other two controllers, the RCV PCI Linked List Controller 60 and the TX Serial Linked List Controller 86, retrieve data from the linked lists and disassemble the lists.

The SRAM 20 is configured into 64-byte blocks. Each block contains 2 bytes of pointer information and 2 bytes of descriptor information. If the block is the last block of a message, the last byte (indicated by the byte count) contains HDLC status information for received messages only. In the receive direction, this information must be placed in the DRAM message header. If the block is not the last block of a message, words 2 through 31 contains message data.

Figure 23:
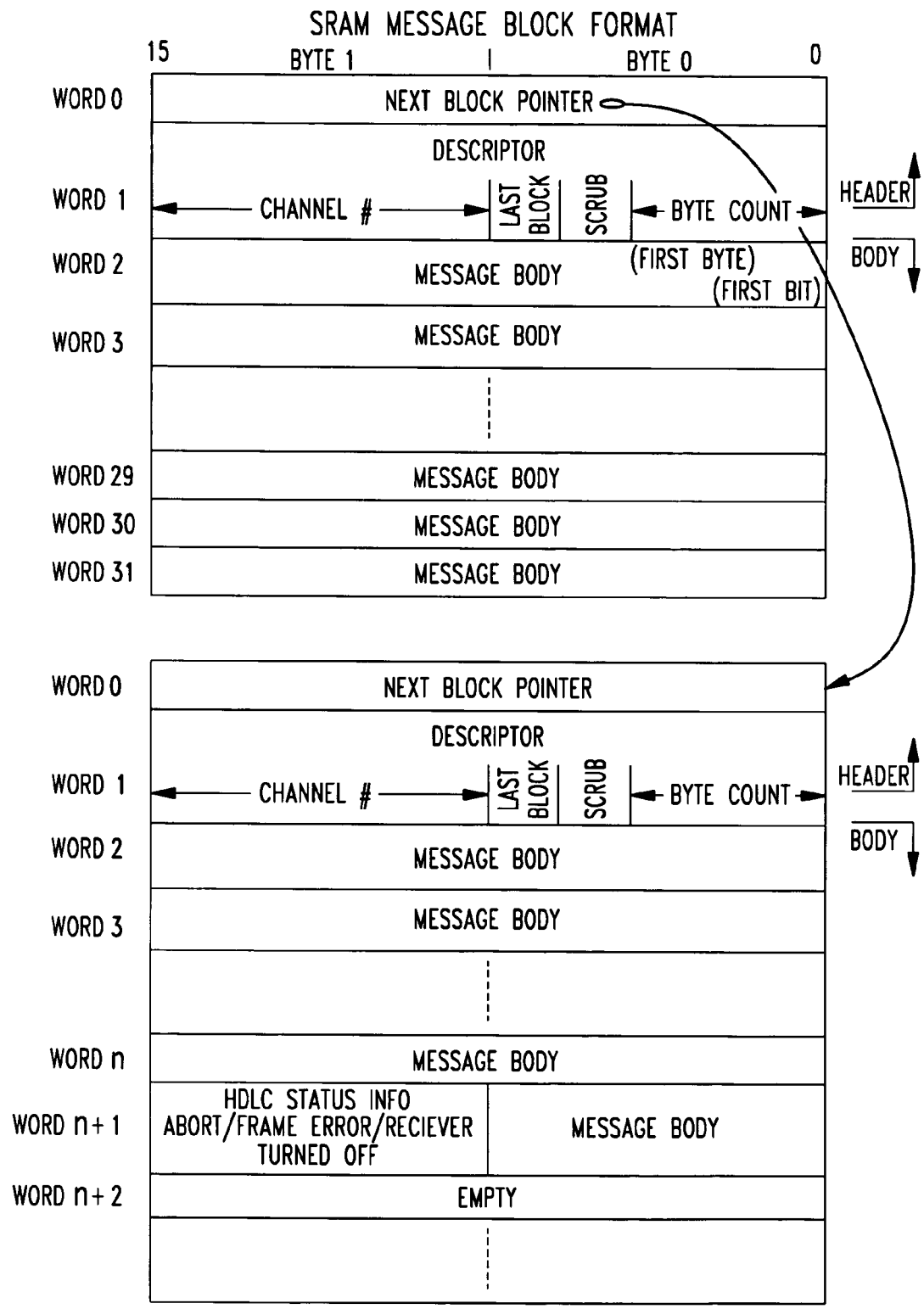
FIG. 23 is a functional block diagram showing the structure of a pair of linked message blocks stored in an SRAM accessed by the HDLC formatter of FIG. 1.

Up to 4 Mbytes of memory for the SRAM 20 is supported. On initialization, the HDLC formatter 2 auto-detects the size of the SRAM 20 and stores the size value in the SRAM Size Register (see register descriptions below). As shown in FIG. 23, the data size of the SRAM 20 is 16 bits to simplify the pointer accesses and to ensure a high enough bandwidth to/from the SRAM. No partial word accesses are supported.

The block descriptor has various information needed for retrieving messages and for protection, such as the channel number. The channel number serves two purposes. In the receive direction, the RCV PCI Linked List Controller 60 needs channel number information for writing the message header in DRAM 8. In both directions, this channel number provides protection between the different channels in the event of a link error. For example, if a controller wants data for channel "x," and the next block's descriptor indicates it "belongs" to channel "y," the block will be left alone, rather than destroying the channel "y" message.

Along with this inter-channel protection, it is also necessary to protect the free block list. Because there are no bits left, a byte count descriptor value of 63 is used to indicate a free list block (the byte count for messages should never be greater than 60). This, too, will be checked before taking any action on the block.

If a channel linked list error occurs, the CHLLERR bit is set in the ESR Register and the channel number is reported in the Channel Linked List Error Register (see register descriptions below). If a free linked list error occurs, the FRLLERR bit is set in the ESR Register.

The Last Block bit indicates that this is the last block in a message, and the byte count should be checked to determine how many bytes are valid. In the receive direction, this also indicates that the last byte of the message contains HDLC status information. This HDLC byte is not used in the transmit direction.

4.6.1 Receive Serial Linked List Controller (Assembly)

Figure 24:
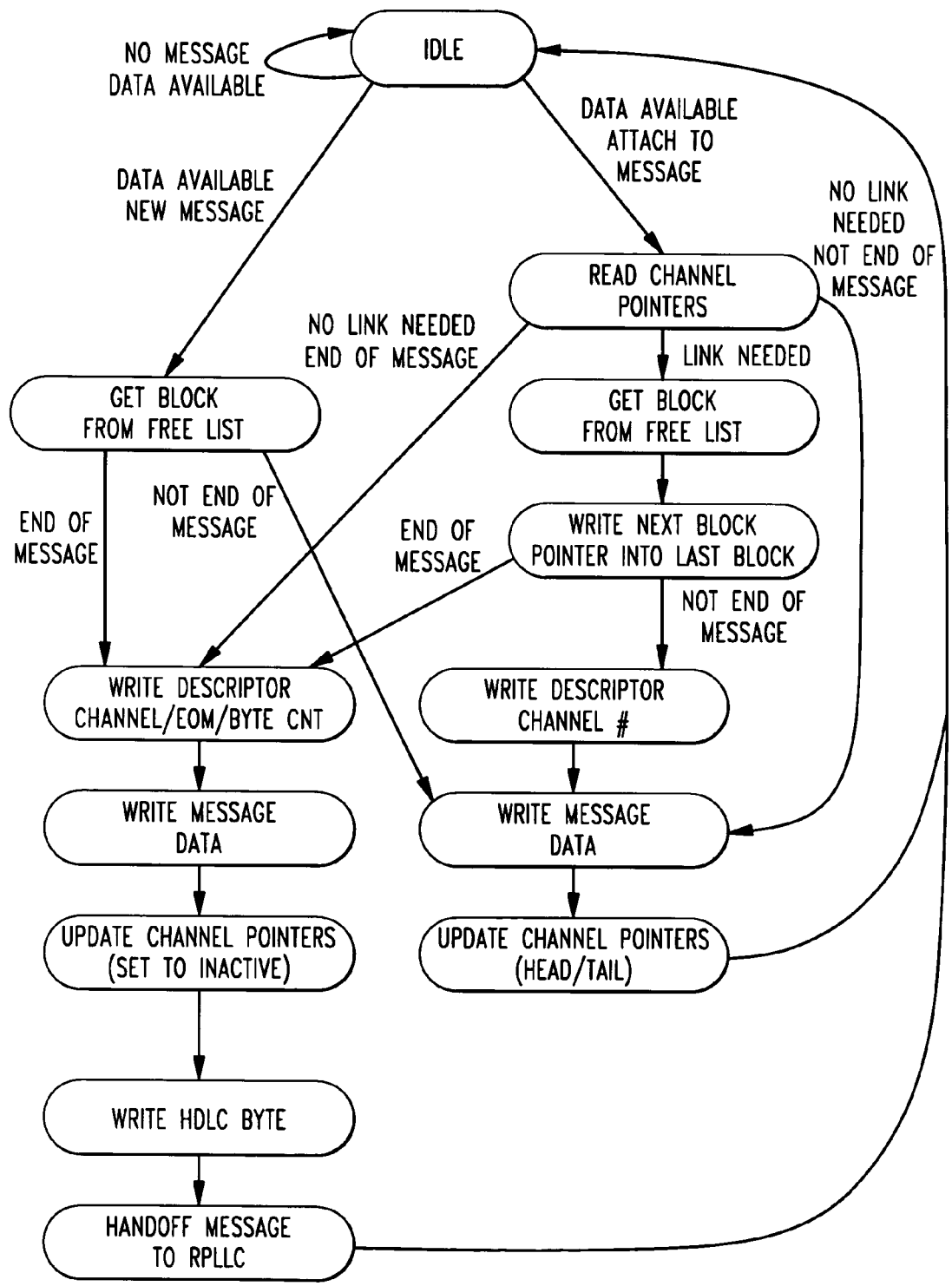
FIG. 24 is a state diagram for a RCV Serial Linked List Controller in the HDLC formatter of FIG. 1.

FIG. 24 shows a high level state diagram of the RCV Serial Linked List Controller 56. From idle, message data is presented to the RCV Serial Linked List Controller 56 by the RCV Channel Cache Controller 54. Along with message data, channel number and status information are sent. The channel number designates which linked list the data should be attached to. The status provides various information:

Message data is the beginning of a message.

Message data is the end of a message.

8 bits or 16 bits are valid.

HDLC status information (Framing error, abort received, receiver turned off).

Depending on the status information (beginning/end of message), the Receive Serial Linked List Controller 56 will take one of three actions: start a linked list, attach data to a linked list, and finish a linked list. Attaching data to a linked list can require either a single write to the current block, or it can require retrieving a new block from the free list, attaching it to the message linked list, and writing the message data along with header information.

An internal RCV Channel Pointer RAM 58 provides storage for each channel's head and tail pointers. The head pointer points to the first block of a message, while the tail pointer points to the address location of the last byte written to the last block. When a message is finished, the lower bits of the tail pointer provide the byte count. Once the header information and HDLC status information is written, the channel head and tail pointers are handed off to the Receive PCI Linked List Controller 60. A block counter is also stored in the RCV Channel Pointer RAM 58. This counter will ensure that the message is not larger than the maximum message size stated in the Message Buffer Size Register (see register descriptions below). This counter will prevent a single very large message from using all of the SRAM blocks. If the message grows past this maximum size, the message will be truncated by the RCV Serial Linked List Controller 56, handed off to the Receive PCI Linked List Controller 60, and any following data will be discarded until a new message begins. The Receive HDLC processor 44 will not be aware of this action. The message handed off to the Receive PCI Linked List Controller 60 will be slightly larger than the maximum message size to ensure that the message will be flagged as too large when the Receive Message Feed 62 calculates the message byte count.

4.6.2 Receive PCI Linked List Controller (Disassembly)

Figure 25:
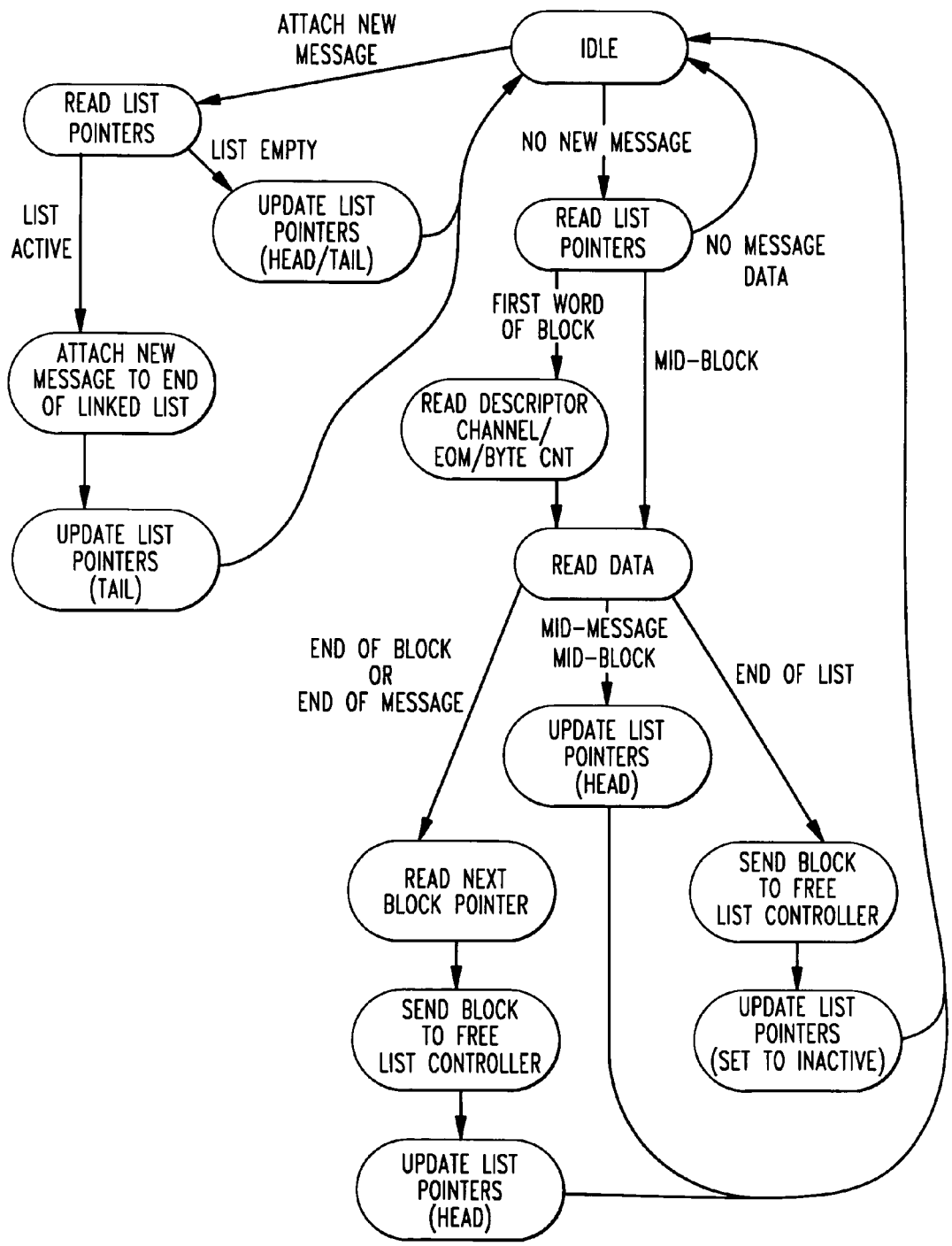
FIG. 25 is a state diagram for a RCV PCI Linked List Controller in the HDLC formatter of FIG. 1.

FIG. 25 shows a high level state diagram of the RCV PCI Linked List Controller 60. From idle, the Receive PCI Linked List Controller 60 begins by getting message handoff information from the RCV Serial Linked List Controller 56. This information consists of the message head pointer and the message tail pointer. These pointers are saved at 160 (see FIG. 5) by the RCV PCI Linked List Controller 60 as the single pseudo-channel head and tail pointers. Since the PCI side only handles one message at a time, all messages—regardless of the channel they came from—are linked onto a single linked list. Once the message has been handed off, the RCV PCI Linked List Controller 60 begins reading the message data from the SRAM 20 and sending it to the PCI RCV Message Feed 62 along with the channel number (extracted from the block descriptor) and status information.

If another message is handed off from the RCV Serial Linked List Controller 56 while a message is currently in the process of disassembly (during the transfer to the RCV Message Feed 62), the new message is attached to the end of the current linked list. This is accomplished by pointing the last block of the current linked list to the new message header, and updating the current linked list tail with the new message tail. This linking of new messages will occur as many times as needed, creating a single large linked list of linked list messages.

As long as messages are queued up to be DMA-transferred to the DRAM 8, the RCV PCI Linked List Controller 60 continues to provide data to the PCI RCV Message Feed 62. Along with message data, the RVC PCI Linked List Controller 60 provides the following status information:

Message data is the beginning of a message.
Message data is the end of a message.
8 bits or 16 bits are valid.
Data is the HDLC status information (framing error, abort received, receiver turned off).

Because the HDLC status information and the final message byte count are needed for the DRAM message header, the PCI RCV Message Feed 62 must DMA the message data out of order. This is handled entirely by the PCI RVC Message Feed 62, and is described in the next subsection.

As the message data is read from the SRAM 20, 64 byte blocks become available to be placed on the free linked list. This is accomplished by handing off the block address pointer to the Free List Controller 152.

In the event that a channel is turned off by software, the HDLC formatter 2 will assist software in determining which messages transferred to the DRAM 8 are old (stored in the SRAM 20 before the channel was turned off) and which are new (stored in the SRAM 20 after the channel was turned back on). The Receive Message Queue Size Register (see register descriptions below) will contain a count of the number of messages (across all channels) that are stored in the RCV PCI Linked List Controller's current linked list. This count can be added to the HDLC formatter's RCV write ptr 70 at the time the channel is turned off to give software the precise point in the RCV FIFO 36 separating old and new messages. One last old message could be placed after this point, but it would have the Receiver Turned Off bit set in the descriptor status field (see register descriptions below).

4.6.3 Transmit PCI Linked List Controller (Assembly)

Figure 26:
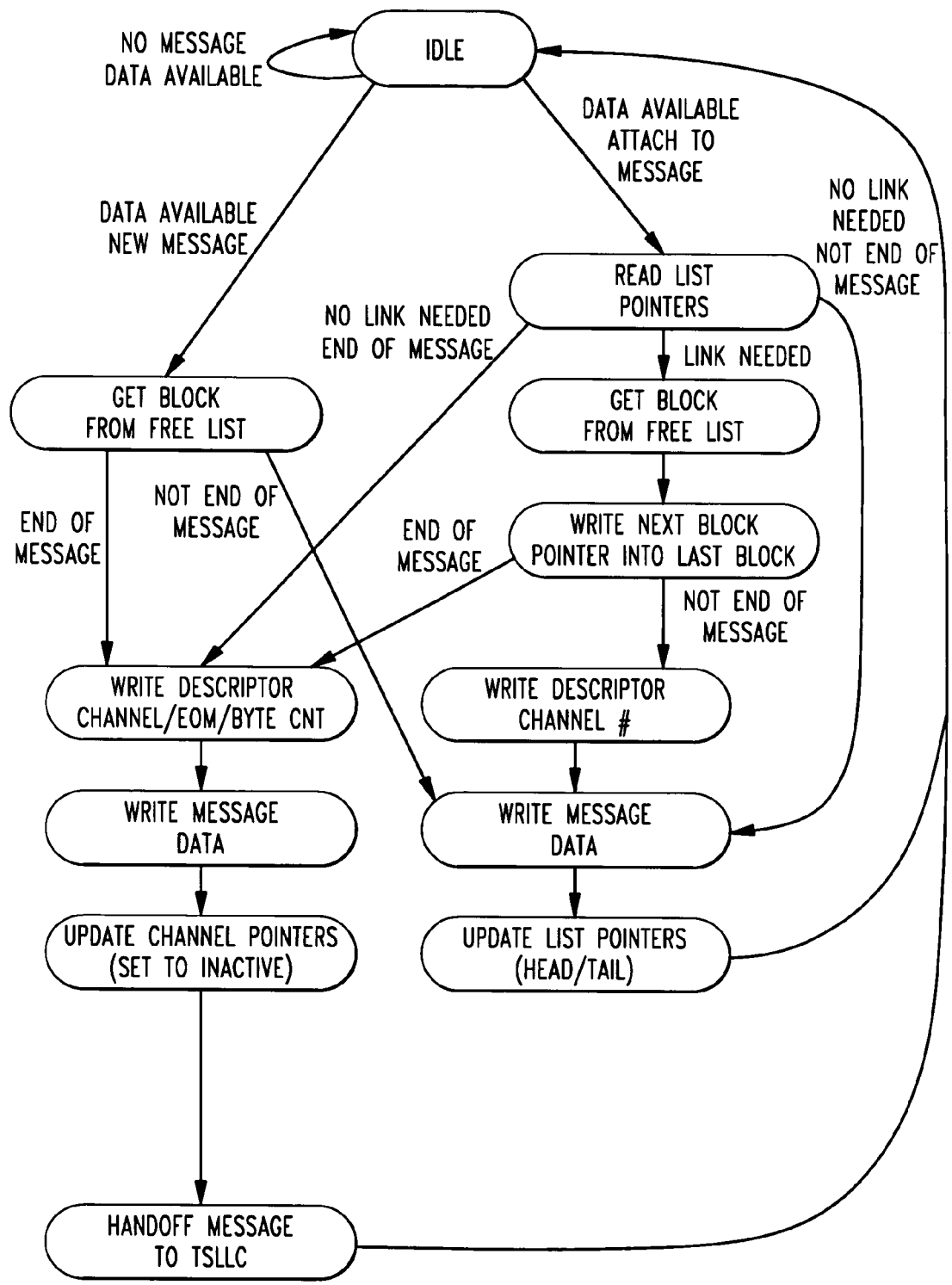
FIG. 26 is a state diagram for a TX PCI Linked List Controller in the HDLC formatter of FIG. 1.

The TX PCI Linked List Controller 84 is similar to the Receive Serial Linked List Controller 86. This controller assembles a linked list in the SRAM 20 from data provided by the Transmit PCI Message Feed 82. The TX PCI Linked List Controller 86, however, operates on only one message at a time whereas the RCV Serial Linked List Controller 56 operates on up to 256 messages (for 256 channels). This allow the HDLC formatter 2 to eliminate the internal channel pointer RAM 58 and instead use only a single set of list pointers 162 (head and tail), as shown in FIG. 5. FIG. 26 shows a high level state diagram of the TX PCI Linked List Controller 84. From idle, message data is presented to the controller by the TX PCI Message Feed 82. Along with this message data, channel number and status information is sent. The channel number is used in the linked list header, and is handed off with the list pointers to the Transmit Serial Linked List Controller 86 when the message has been completed in SRAM.

Another difference between the TX PCI Linked List Controller 84 and the RCV Serial Linked List Controller 56 is the absence of HDLC status information. This data is not needed in the transmit direction. Therefore, when a message is completed, the HDLC status info byte is NOT written.

4.6.4 Transmit Serial Linked List Controller (Disassembly)

Figure 27:
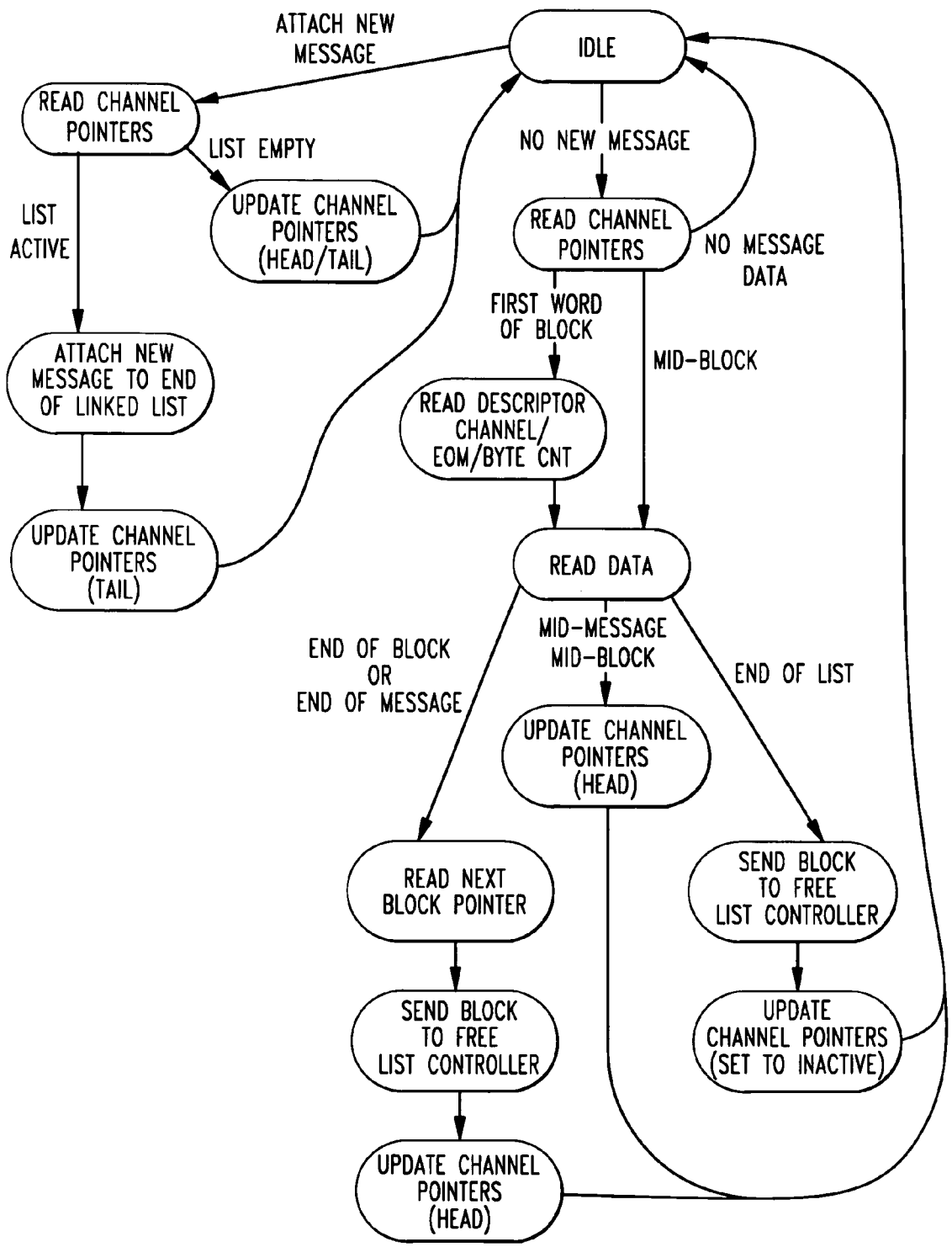
FIG. 27 is a state diagram for a TX Serial Linked List Controller in the HDLC formatter of FIG. 1.

The TX Serial Linked List Controller 86 is similar to the RCV PCI Linked List Controller except that the TX Serial Linked List Controller must handle messages for 256 channels. FIG. 27 shows a high level state diagram of the TX Serial Linked List Controller 86. From idle, the TX Serial Linked List Controller 86 begins by getting message handoff information from the TX PCI Linked List Controller 84.

This information consists of the message head pointer, tail pointer, and channel number. If there are no outstanding messages for the channel, these pointers are saved by the TX Serial Linked List Controller 86 as the channel head and tail pointers. If another message is handed off from the TX PCI Linked List Controller 84 while a message is currently in the process of disassembly (for the same channel), the new message is attached to the end of the current linked list. This is accomplished by pointing the last block of the channel's linked list to the new message header, and updating the channel's linked list tail with the new message tail. This linking of new messages occurs as many times as needed, creating a single large linked list of linked list messages for each channel.

The Transmit Channel Cache Controller 90 requests data from the TX Serial Linked List Controller 86 when needed. This request is accompanied by the corresponding channel number. The TX Serial Linked List Controller 86 then retrieves the data and provides it along with the following status information:

No message data is available for the channel.
Message data is the beginning of a message.
Message data is the end of a message.
8 bits or 16 bits are valid.

As noted above, the message's CRC is embedded in the message body. Once the end of a message has been reached, the TX HDLC Processor 94 inserts the proper number of flags between messages.

As the message data is read from the SRAM 20, 64 byte blocks become available to be placed on the free linked list. This is accomplished by handing off the block address pointer to the Free Linked List Controller 152.

If the Transmit HDLC processor 94 informs the TX Serial Linked List Controller 86 that the channel has been turned off, the TX Serial Linked List Controller 86 will immediately hand off the channel's head and tail pointer to the recovery function of the Free Linked List Controller 152, and reset the channel to inactive. This will effectively flush the old messages out of the SRAM 20.

4.6.5 Free Linked List Controller

As can be seen in FIGS. 3 and 4, the shared Free Linked List Controller 152 handles a pointer free list 164 as well as arbitration between requests from the RCV Serial Linked List Controller 56, the RCV PCI Linked List Controller 60, the TX PCI Linked List Controller 84, and the TX Serial Linked List Controller 86. After coming out of reset, the HDLC formatter 2 initializes by creating a free linked list of 64 byte blocks throughout the entire SRAM 20. Requests for blocks come from the RCV Serial Linked List Controller 56 and the TX PCI Linked List Controller 84 (linked list assemblers) and blocks are returned from the RCV PCI Linked List Controller 60 and the TX Serial Linked List Controller 86 (linked list disassemblers).

The operation of the Free Linked List Controller 152 is straight-forward. Upon receiving a request for a block, the Free Linked List Controller 152 reads the next block pointer at the top of the pointer free list 164. This pointer becomes the new free list head pointer, and the old free list head pointer is handed off in response to the request.

When a block is returned to the free list, a block pointer is provided to the Free Linked List Controller. This pointer is written to the next block pointer of the last block in the free list, and the free list tail pointer is updated with this pointer. The controller must also set the byte count in the block descriptor to 63 to indicate that this block is now on the free list (for protection from RCV/TX channels).

A recovery function is also supported to allow the bulk returning of messages to the free list. This is required when a transmit channel is turned off. The RCV Serial Linked List Controller 56 will provide the head and tail pointer of the linked list to be recovered. The recovery function will store these pointers and immediately begin placing the blocks on the free list. If another linked list is supplied for recovery, it will immediately be attached to the linked list currently being recovered. Cross-channel protection is also provided for the recovery mechanism. When a channel's linked list is added to the recovery list, the first block will get a value of 62 encoded in the byte count field (the count should never be greater than 60 for normal messages). If the 62 count value is identified as blocks are pulled off the recovery list, the channel number associated with the block will be stored. Until another 62 count is read, only blocks with the same channel number will be sent to the free list. If a wrong channel number is read, the entire recovery block will be abandoned and the pointers reset. This will prevent a bad link from allowing the recovery mechanism to run rampant throughout the SRAM 20. Any abandoned blocks will eventually be recovered by the scrub routine.

4.6.6 Scrub

A scrub routine is implemented to protect against the possible loss of SRAM blocks. The concern is that a block may become disassociated from any linked list—either a channel list or the free list—and can never be used again. This should not normally happen, but it is desirable to provide protection anyway. One possible source of lost blocks would be transmit messages for channels without any assigned timeslots. Even if a block only gets lost on rare occasions, over time a large number of the SRAM blocks could become unusable.

Each block has a bit in the descriptor to aid in the scrub routine. The routine is as follows:

Every T=bigtime, start routine.
Set a control bit indicating that all blocks written/redirected should contain a scrub=1.
Store the SRAM current usage value in a temporary register to determine the size of the free linked list.
Cycle the free list by popping blocks off the head and placing on the tail of the list. Set the scrub bit for each block.
Wait for the amount of time specified in mediumtime. This interval allows all blocks off the free list to be returned.
Read all block descriptors; if scrub is set to 0, return the block to the free list, set an ESR bit, and write the block's channel and address information to the Scrub Information Register (see register descriptions below).
Routine is finished. For the next routine, repeat with the scrub control bit inverted.

If an error is encountered in popping blocks off the free list, there is only the tail pointer as a known free block. The free head pointer is set to the tail pointer, the descriptor for this block is rewritten to identify it as free, and this single block is used as the entire free list until blocks are returned from either the RCV PCI Linked List Controller 60, the TX Serial Linked List Controller 86, or the SCRUB functions. This error condition will be reported as an ESR event.

This routine assumes that all blocks allocated for messages will be returned to the free list in T<mediumtime. Only blocks that have been off the free list and unaccessed for T>mediumtime will be scrubbed.

4.7 PCI RCV Message Feed

The PCI RCV Message Feed 62 handles the transfer of message data from the RCV PCI Linked List Controller 60 to the PCI Interface Controller 64. The RCV PCI Linked List Controller 60 provides the channel number and status information (beginning of message, end of message). Along with the handoff, the PCI RCV Message Feed 62 converts the data to the DRAM message format. The message format in the DRAM 8 requires HDLC status information and a byte count at the beginning (header) of the buffer. However, the HDLC error summary information is located in the HDLC status byte at the end of the message in the SRAM 20. Furthermore, the short frame, long frame, and CRC errors must be calculated by the PCI RCV Message Feed 62 as the data is retrieved from the RCV PCI Linked List Controller 60 and handed off to the PCI Interface Controller 64. To accomplish this, the message is transferred out of order. The HDLC formatter 2 starts by DMA bursting bytes 29 through 60 (32 bytes), while skipping the first 28 bytes (the first 28 bytes are saved in a temporary register). After the rest of the message has been sent to the DRAM 8, the RC PCI Message Feed 62 now has all of the HDLC status information and the message byte count. The PCI Interface Controller 64 then DMA-bursts the 4-byte header and the first 28 bytes of the message. This allows the HDLC formatter 2 to always do a 32-byte burst to the DRAM 8 rather than doing a single access to write the header.

The DRAM message buffer format has bits to identify a short frame, long frame, and CRC error on each message. Of concern is that garbage on one or more channels due to a babbling link could use all of the RCV message buffer pointers. To help prevent this, three programmable error threshold registers are implemented to monitor these three errors. Each time a short frame, long frame, or CRC error occurs, a corresponding error counter is incremented. Every 10 msec, these counters are cleared. If any counter reaches the value of the corresponding threshold, an ESR bit is set in an Error Source Register. These errors will not halt any operations.

The PCI RCV Message Feed 62 must do the following:
Inform the PCI Interface Controller when a new message is ready for DMA transfer to the DRAM 8.
Save the channel number for the DRAM message header.
Save the first 28 bytes of the message for the final DMA to the DRAM 8.
Transfer the remaining message bytes to the PCI Interface Controller 64. Pad the end of the message as needed to fill the 32-byte burst line.
Inform the PCI Interface Controller 64 when the next to last burst is ready (last bytes of the message).
Save the HDLC status byte at the end of the message.
Count the number of bytes in the message. Check for short frame and long frame detected.
Check the CRC word at the end of the message.
Increment the short/long/CRC error threshold registers if necessary.
Transfer the DRAM message header information (channel number, HDLC status information, byte count) along with the saved first 28 bytes of the message.

Whereas the PCI RCV Message Feed 62 handles the counting of bytes, short/long frame detection, and CRC check, the PCI Interface Controller 62 must handle the message buffer address pointers. Two status bits from the PCI RCV Message Feed 62 provide the PCI Interface Controller with the necessary handshaking. The first is a start-of-message signal instructing the PCI Interface Controller 62 to retrieve a new message buffer address and setup the RCV FIFO 36 to burst the second 32 bytes in the buffer (start address+32). The second signal is a "next to last" signal instructing the PCI Interface Controller to prepare the Transmit Burst Line FIFO 66 for bursting from the original message buffer start address (the first 32 bytes). The PCI RCV Message Feed 62 also does all formatting and translation of data into 32-bit long words. The 16-bit words from the SRAM 20 and RCV PCI Linked List Controller 60 are concatenated into 32-bit long words and byte translation or bit reversal are performed if enabled. This byte and bit ordering is only applied to message data, not the message header. Any padding necessary to fill the 32-byte burst line is also be done by the PCI RCV Message Feed 62. The PCI Interface Controller 64 should be able to place the data directly into the Transmit Burst Line FIFO 66.

The combination of the receive and transmit messages can use up to the entire SRAM 20, minus 2K bytes. These 2 K bytes of SRAM memory are reserved for use by the High Priority Transmit Message Register described below. If the SRAM 20 is fully used (minus the 2K), an error is set in the HESR register (see register descriptions below).

4.8 PCI TX Message Feed

The PCI TX Message Feed 82 handles the transfer of message data from the PCI Interface Controller 64 to the TX PCI Linked List Controller 84. The PCI TX Message Feed 82 provides the channel number and status information (beginning of message, end of message). Along with the handoff, the PCI TX Message Feed 82 calculates the CRC over the entire message and store this data at the end of the message. Although 32-byte bursts are always performed from the DRAM 8, only valid message data is handed off to the TX PCI Linked List Controller 84.

The PCI TX Message Feed 82 must do the following:
Get status information from the PCI Interface Controller 64 indicating a new message is available in the PCI Receive Burst Line 80.
Retrieve data from the PCI Interface Controller 64.
Save the channel number from the message header.
Save and decrement the byte count as data is read from the PCI Interface Controller 64.
Based on the byte count, inform the PCI Interface Controller 64 when the last burst of the message has been retrieved.
Calculate CRC over the data as it is retrieved from the PCI Interface Controller 64.
Transfer message data to the TX PCI Linked List Controller 84.
Provide the channel number to the TX PCI Linked List Controller 84.
Provide status information to the TX PCI Linked List Controller 84 (beginning of message, end of message).
Transfer the final CRC to the TX PCI Linked List Controller 84 at the end of the message.

While the TX PCI Message Feed 82 handles the counting of bytes and CRC generation, the PCI Interface Controller 64 must handle the message buffer address pointers. For performance reasons, the PCI Interface Controller 64 must prefetch the next burst line of the message (or a new message) before the PCI TX Message Feed 82 is ready for the data. Two status bits must be exchanged between the PCI TX Message Feed 82 and the PCI Interface Controller 64 to handle the necessary handshaking. The first is a start of message signal from the PCI Interface Controller 64 informing the PCI TX Message Feed 82 that the Receive Burst Line FIFO 80 contains the beginning of a new message. The second signal is an end of message signal from the PCI TX Message Feed 82 informing the PCI Interface Controller 64 that the current burst FIFO data is the last of the message. Once the Receive Burst Line FIFO 80 has been emptied by the PCI TX Message Feed 82, the PCI Interface Controller 64 must then start retrieving a new message. The PCI TX Message Feed 82 also does all formatting and translation of data from the 32-bit long words into the 16-bit words needed for the TX PCI Linked List Controller. The 32-bit words from the PCI Interface Controller 64 are byte translated or bit reversed if enabled, and split into 16-bit words. This byte and bit ordering is only applied to message data, not the message header. Any padding that was added after the end of the message is read by the PCI TX Message Feed and discarded.

A "throttle" function is implemented in the PCI TX Message Feed 82 to protect against a couple of failure modes. If too many TX messages are transferred to the SRAM 20, all of the SRAM 20 could be used up, leaving no blocks for the RCV messages. An SRAM Danger Register can be programmed which is compared to the SRAM usage register (see register descriptions below). If the SRAM usage surpasses the value in the Danger Register, all TX DMA transfers are halted and a bit is set in the ESR register. Once the SRAM usage drops below the danger threshold, transfers resume. No messages will be lost.

Prudence dictates that the SRAM Danger Register be initially set to 50% of the number of blocks in SRAM. If set too low, the TX messages will be delayed even though plenty of SRAM blocks are still available. If set too high, there may not be enough reserve SRAM blocks to handle the receive messages. Software must assess the tradeoff (TX performance vs. RCV message loss) to determine the proper value for the Danger Register.

A High Priority Transmit Message Register is provided as a bypass to the TX FIFO 34 (see register descriptions below). If this register is written with a message buffer address, the next message to be DMA-transferred to the SRAM 20 will be that message. Once the message has been transferred, a bit is set in the High Priority Transmit Message Register and in the ESR.

Another failure mode occurs if TX messages are transferred to the SRAM 20, and no timeslots are assigned to the channel specified. These messages stay in the SRAM 20 until the scrub releases them. This could take a tong time, and it is necessary to avoid the situation where multiple messages for an unassigned channel are using all of the SRAM 20, resulting in all of the channels being trashed. A throttle mechanism in the HDLC formatter 2 halts the transfer of TX messages until the faulty messages are scrubbed. The processor 10 will realize that TX messages are not being transferred, and the scrub will set an ESR bit as well as identify the channel number last scrubbed. No messages should be lost, although the TX throughput will drop dramatically.

4.9 PCI Interface

Figure 28:
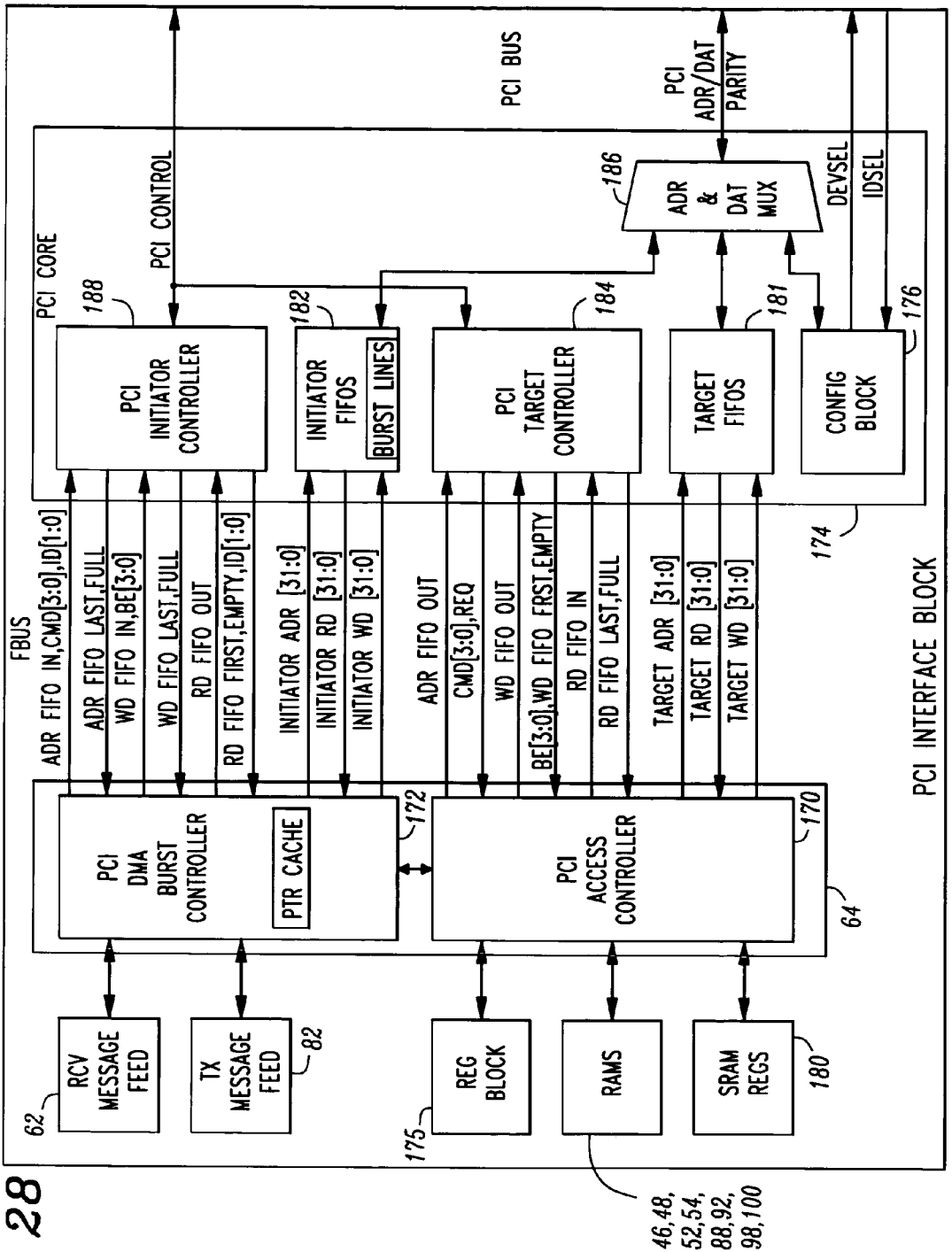
FIG. 28 is a functional block diagram showing a PCI interface block in the HDLC formatter of FIG. 1.

Turning now to FIG. 28, the PCI Interface Block (collectively the PCI Interface 6 and the PCI Interface Controller 64) is shown as including a PCI Access Controller 170 for providing target access, a PCI DMA Burst Controller 172 for providing initiator access, and a PCI Core 174 to terminate the PCI bus 16.

4.9.1 PCI Access Controller

The PCI Access Controller 170 works in conjunction with the PCI Core 174 to provide processor initiated access of all internal HDLC formatter 2 registers, PCI Configuration space, external SRAM 20, and internal RAMs used operationally; namely the Timeslot Mux RAM 42, Timeslot Channel Map RAM 46, and the Channel Configuration RAM 48, as well as other RAMs accessed for diagnostics. The PCI Access Controller 170 does not terminate the PCI protocol. Instead, it terminates a FIFO bus protocol to allow read and write access of FIFOs internal to the PCI Core 174, which in turn terminates the PCI protocol. The PCI bus 16 is a PCI Local Bus Specification Revision 2.1-compliant 32 bit multiplexed address and data bus which supports PdI configuration space and memory space accesses including bursting. For the HDLC formatter 2, IO cycles are not supported. A cycle consists of one address transfer phase, followed by one or more data transfer phases. During the address phase, the operation type is encoded onto 4 command/byte enable bits. During the data phase(s), the command/byte enable bits are asserted to indicate active byte lanes (BE0 corresponds to D7:D0, the LSB). A single parity bit provides even parity over the 32 bit address/data bus plus the 4 bit command/byte enable bus during each address and data phase.

All HDLC formatter 2 accesses are required to be 32 bit accesses, except for PCI configuration space. For PCI memory space read accesses, the low two address bits are assumed to be 0. Data is returned according to the byte enables that are asserted. For PCI memory space write accesses, the low two address bits are assumed to be 0. Data in all 32 bits is written regardless of which byte enables are asserted. For either a read or write access, if the low two address bits are not both 0 or if all four byte enables are not asserted, an ESR bit is set indicating an illegal access. An illegal access is also indicated in the ESR if an attempt is made to write a read-only register, if an attempt is made to write a key protected register without the key set, or if an unequipped register or RAM address is accessed.

When accessing internal RAMs or the external SRAM 20 as 32 bit quantities, unused bits will be returned as zeros (0's).

The PCI Access Controller 170 has a data path interface to the PCI Core 174 consisting of a target bus comprised of 32 bits of address, 32 bits of read data, and 32 bits of write data. The control path interface to the PCI Core 174 consists of target bus control and status and Configuration Space bus control and status. The PCI Access Controller 170 interfaces the Target FIFO buses of the PCI Core 174 to register and RAM blocks.

All of the SRAM 20 can be accessed via a keyhole mechanism using the SRAM Address and Control Register and SRAM Data Register (see register descriptions below). Internal PCI-accessible RAMs and registers reside in the PCI bus memory region. Only a subset of the PCI Configuration Space is actually implemented in the HDLC formatter 2; however configuration accesses to any reserved or unimplemented locations in the Configuration Space complete normally without generating errors, and on read accesses, return all zeros (0's).

All address parity errors detected by the HDLC formatter 2 are recorded in the PCI Status Register (see register descriptions below). If the access is to the HDLC formatter 2, the access is target-aborted. Data parity errors detected by the HDLC formatter 2 on write accesses to it are recorded, the access is blocked (data is thrown away), and the cycle is terminated normally. However, if parity error handling is disabled via the PCI Command Register (see register descriptions below), the accesses are not blocked for either address or data parity errors and the target abort does not occur.

Any address or data parity error detected by the HDLC formatter 2 is recorded in the PCI Status Register (a single bit for both errors), even if parity handling is disabled via the PCI Command Register. Any address parity error detected by the HDLC formatter 2 causes the HDLC formatter 2 to assert PCISERR and to set a bit indicating such in the PCI Status Register, provided that both PCISERR assertion and parity handling are enabled via the PCI Command Register. Any data parity error that occurs when the HDLC formatter 2 is the initiator, which causes the HDLC formatter 2 (read) or another PCI client to assert PCIPERR (write), is recorded in the PCI Status Register as long as parity handling is enabled via the PCI Command Register.

Whenever any of the three bits pertaining to parity errors are set in the PCI Status Register via the error stimulus (Detected Parity Error, Signaled System Error, or Data Parity Error), a corresponding bit is also set in the HDLC formatter 2 ESR, which if unmasked will cause an interrupt. However, writing and clearing the ESR bits only effects the HDLC formatter 2 ESR and does not effect the bits in the PCI Status register. Bits in the PCI Status register must be explicitly cleared with a write to this register.

4.9.1.1 Register Block Access

The HDLC formatter 2 registers are contained in a Register Block 175 which is accessed through the System Registers & Internal RAM Access Interface 38 (see FIG. 29) by the PCI Access Controller 170 via a 32 bit data-in bus, a 32 bit data-out bus, and address and control. This does not include the PCI Configuration Space Registers located in the Configuration Block 176 (see FIG. 28). As a target, the PCI Access Controller 170 decodes down to the address space of the Register Block 38 and generates a select to this block, along with a read/write indication. Note that the Configuration Block 176 in the PCI Core performs enough decoding, via Base Address Register 0 (see register descriptions below), to determine if the current decode is for the 16 Kbyte PCI Bus Memory space of the HDLC formatter 2. The PCI Access Controller 170 receives an acknowledge (and the appropriate data if performing a read access) from the Register Block 175. The select is then de-asserted to indicate the end of the cycle.

4.9.1.2 Configuration Space Access

PCI Configuration Space Registers, other than user-defined configuration registers, are contained within the PCI Core itself, and specifically the Configuration Block 176. The HDLC formatter 2 does not implement any user-defined configuration registers. Byte enables for configuration space accesses are not ignored; accesses can be byte-, word-, and long word-based. The address offsets to the PCI Configuration Space are defined as little endian. For example, the Vendor ID register at offset 0 (see register descriptions below) is accessed as a word on the least significant byte lanes, enabled with Byte Enables 0 and 1. When using the HDLC formatter 2 in a big endian system, the offset should be converted so that the byte enables are generated in big endian format e.g. the Vendor ID register (see register descriptions below) should be accessed as a word at offset 0x2 to allow Byte Enables 0 and 1 to be generated.

4.9.1.3 External SRAM Access

The PCI Access Controller 170 interfaces to the SRAM Arbiter 178 (see FIG. 5) in the SRAM Interface Block 18 for diagnostic access of the SRAM 20. All of the SRAM 20 can be accessed via a keyhole mechanism using the SRAM Address and Control Register and SRAM Data Register (see register descriptions below) located in the SRAM register block 180 (see FIG. 28). To access the SRAM 20, any write data is first written to the SRAM Data Register; then the address of the desired SRAM location and the access type are written to the SRAM Address and Control Register and a control bit is set signaling that the access may now be performed. As stated, these two SRAM registers reside in their own SRAM register block 180, and it is this register block that actually runs the cycle to the SRAM 20. During the time that the SRAM cycle is being run, the PCI bus may still be accessed. Any read data is written into the SRAM Data Register and the control bit in the SRAM Address and Control Register is now cleared by the HDLC formatter 2, indicating that the access has been performed. If an access to the SRAM 20 is attempted before the previous access completes, an ESR bit is set.

Even though the SRAM 20 is 16 bits wide, only 32 bit accesses of the SRAM Data Register and the SRAM Address and Control Register are valid, and bits 31 down to 16 read as 0x0000.

4.9.1.4 Internal RAM Access

The PCI Access Controller 170 interfaces to the RAM arbiters in the Timeslot Mux RAM 42, the Timeslot Channel Map RAM 46, and the Channel Configuration RAM 48 for operational access of these internal RAMS. Additional RAMs may be accessed for diagnostics. As a target, the PCI Access Controller 170 decodes down to the address space of the RAM Blocks and generates a select to the appropriate RAM arbiter, along with a read/write indication. The PCI Access Controller 170 receives an acknowledge (and the appropriate data if performing a read access) from the selected RAM arbiter. The select is then de-asserted to indicate the end of the cycle. Unused bits read as zeros (0's).

4.9.2 PCI Core

The PCI Core provides a Revision 2.1 PCI-compliant macrocell for interfacing the HDLC formatter 2 to the PCI bus. One side of this core interface consists of a PCI bus interface, supporting most PCI functionality except for cacheable memory, 64 bit extensions, bus arbitration, VGA palette snooping, dual address, and special cycles as a target. The HDLC formatter 2 does not require any of the functionality which is unsupported by the PCI Core 174. The other side of the PCI Core 174 includes a FIFO bus (FBUS) interface to individual target (181) and initiator (182) FIFOs contained in the PCI Core for read and write data.

4.9.2.1 PCI Target Control Block

A PCI Target Control Block 184 (PCI Target Controller) in the PCI Core 174 provides control for latching the address in an Address and Data Mux Block 186, so that it can be decoded in the Configuration Block 176. If the cycle is to the HDLC formatter 2, the appropriate control signals for manipulating a plurality of Target FIFOs (see below) in the Target FIFO block 181 are generated by the Target Controller 184. The Target Controller 184 writes the address and command into a Target Address FIFO in the Target FIFO block 181, and asserts a request to the FBUS, indicating that a transfer from the PCI bus 16 is pending to the FBUS and that the address and command are available.

After the address and command are used by the FBUS, the FBUS asserts a Target Address FIFO Out signal to decrement the Target Address FIFO pointer, so that the next address and command entry of the FIFO become available. In the case of a read, the FBUS returns the data. First it checks for full status of a Target Read Data FIFO, and if this FIFO is not full, it then asserts a Target Read Data FIFO In signal to load data into the Target Read Data FIFO. In the case of a write, if the Target Write Data FIFO indicates it is not empty, the FBUS transfers the write data and the byte enables from the FIFO. Once the data is transferred, the FBUS asserts a Target Write Data FIFO Out signal to decrement the Target Write Data FIFO pointer.

A read prefetch mechanism is also supported by the Target Control Block of the PCI Core 174, but the HDLC formatter 2 does not need to utilize this.

4.9.2.2 Target FIFOs

As indicated above, the target FiFOs in the Target FIFO block 181 consist of a Target Address FIFO, a Target Read Data FIFO, and a Target Write Data FIFO. These FIFOs are 32 bits wide and can be up to 64 entries deep. The size is configured at the time of synthesis and the FIFOs need not be sized identically. They are capable of transferring data in/out on every clock edge as long as they are not full/empty. For the HDLC formatter 2, a FIFO depth of one (1) is used since the target does not support bursting.

4.9.2.3 PCI Initiator Control Block

A PCI Initiator Controller block 188 of the PCI Core 174 provides control for burst and non-burst cycles initiated from the HDLC formatter 2 via the FBUS. When running a cycle, if an Initiator Address FIFO in the Initiator FIFO block 182 is not full, the FBUS asserts an Initiator Address FIFO In signal to clock the address and command into this FIFO. For burst accesses, a single address is clocked in and multiple data are clocked into Initiator Data FIFOS located in the Initiator FIFO block 182. This is indicated to the PCI Core by asserting the Burst On signal.

In the case of a read, if an Initiator Read Data FIFO indicates it is not empty, the FBUS transfers the read data from the Initiator Read Data FIFO. Once the data is transferred, the FBUS asserts an Initiator Read Data FIFO Out signal to decrement an Initiator Read Data FIFO pointer. In the case of a write, the FBUS transfers the write data by first checking for full status in an Initiator Write Data FIFO. If it is not full, it then asserts an Initiator Write Data FIFO In signal to load the data and byte enables into the FIFO.

A posted read transfer mechanism from the PCI bus is also supported by the Initiator Controller Block 188 of the PCI Core 174, but the HDLC formatter 2 does not need to utilize this.

4.9.2.4 Initiator FIFOs

As indicated above, the initiator FIFOs in the Initiator FIFO block 182 consist of an Initiator Address FIFO, an Initiator Read Data FIFO, and an Initiator Write Data FIFO. These FIFOs are 32 bits wide and can be up to 64 entries deep. The size is configured at the time of synthesis and the FIFOs need not be sized identically. They are capable of transferring data in/out on every clock edge as long as they are not full/empty. For the HDLC formatter 2, the Initiator Address FIFO is 1 entry deep and the Initiator Data FIFO is 8 entries deep.

4.9.2.5 Configuration Register Block

Address decoding for the HDLC formatter 2 is performed in the Configuration Register Block 176 via the Base Address registers. Base Address Register 0 is reserved for decoding PCI configuration cycles to user-defined configuration registers on the FBUS, which are not used in the HDLC formatter 2.

Base Address Register 1 in the PCI Configuration block 176 can be used to decode the memory space of the HDLC formatter 2. This register provides the ability to relocate individual HDLC formatter 2 memory space.

4.9.2.6 Target Accesses

The HDLC formatter 2 is not required to support bursting as a target. An attempt to burst to PCI memory or configuration space will be target disconnected by the PCI Core 174. Fast back-to-back and locked cycles to the PCI Core 174 are supported, but not required of the HDLC formatter 2.

4.9.2.7 Target Terminations

Retry is supported by the PCI Core 174, transparent to the FBUS, if a read or write to the HDLC formatter 2 is attempted and the FBUS FIFOs are full. Specifically, if a write to the HDLC formatter 2 is attempted and the Target Write Data FIFO is full, the PCI Core asserts a retry to guarantee that the cycle will complete in less than 16 PCI clocks. Also, if an I/O read or write, or a memory read of the HDLC formatter 2 occurs when the Target Write Data FIFO contains data, a retry is asserted on the PCI bus 16 because there is no way to guarantee how much time it would take the FBUS to empty the Target Write Data FIFO before beginning the read transaction. Finally, if the FBUS is not able to return read data immediately, the FBUS asserts a Delay PCITRDY signal (see signal descriptions below) to the PCI Core 174 so that it can assert retry on the PCI bus for that read cycle. When the FBUS returns the read data to the Target Read Data FIFO, it de-asserts the Delay PCITRDY signal so that the PCI bus 16 can obtain the data when it retries the cycle.

Target disconnect is performed by the PCI Core 174 if a burst to PCI memory or configuration space is attempted. Target abort is performed if an address parity error is detected and the HDLC formatter 2 has asserted a PCIDEVSEL signal (see signal descriptions below).

4.9.2.8 Initiator Accesses

As an initiator, the PCI Core allows for both burst and non-burst cycles. Burst accesses must not cross a 1 K boundary and are always 32 byte aligned. Posted reads and locked cycles from the PCI Core are supported, but not needed by the HDLC formatter 2.

4.9.2.9 Initiator Terminations

Disconnect and retry are handled by the PCI Core 174 transparently to the FBUS. The PCI Core 174 asserts retry a fixed number of times according to a programmable retry counter before giving up the bus and asserting a System Error signal to the FBUS.

A target abort message given to the PCI Core 174 when it is acting as an initiator is handled with the System Error signal to the FBUS, allowing the FBUS to cause an interrupt and/or reset its logic; the FIFOs are also cleared when the target abort message is received. When the FBUS asserts the Interrupt Request signal to the PCI Core 174, this is forwarded as a PCIINTA signal (see signal descriptions below) onto the PCI bus 16.

4.9.3 PCI DMA Burst Controller

The PCI DMA Burst Controller 172 also works in conjunction with the PCI Core 174. It provides HDLC formatter 2-initiated burst accesses of the DRAM 8 for message data and pointers. The PCI DMA Burst Controller 172 terminates the Initiator FIFO bus protocol described in the previous section on the PCI Core 174, which in turn terminates the PCI protocol. The interface to the PCI Core 174 consists of an initiator bus comprised of 32 bits of address, 32 bits of read data, 32 bits of write data, and control and status. The PCI DMA Burst Controller 172 interfaces the Initiator FIFO buses of the PCI Core 174 to Receive and Transmit Message Feed Blocks.

4.9.3.1 Receive Message Transfer

As previously described, in the receive message direction, the HDLC formatter 2 transfers messages from the SRAM 20 up to the DRAM 8. The RCV FIFO 36 in the DRAM 8 containing message block pointers is populated by the processor 10. Each entry in the RCV FIFO 36 contains a 32 bit pointer to an available message block 30 in the DRAM 8, where one block 30 corresponds to one message. The message blocks 30 must be 32 byte aligned in memory. This is enforced by the HDLC formatter 2, which truncates the five least significant bits of its Message Buffer Base Address Register (see register descriptions below) and the message pointers, and replaces them with zeros. As shown in FIG. 2, each message block 30 is made up of consecutive memory locations, and can be of size 32 bytes up to 64 Kbytes based on the value programmed in the HDLC formatter's Message Buffer Size Register (see register descriptions below). The value in this register should not be changed dynamically. If a message is larger than the buffer size, it will be truncated and the Buffer Overrun bit will be set in the Status field of the DRAM Message Header.

There are four registers in the HDLC formatter 2 which allow the processor 10 and the HDLC formatter 2 to manipulate the FIFO entries for the received messages: the RCV FIFO Size Register, the RCV FIFO Start Address Register, the processor FIFO Pointer Register, and the HDLC formatter FIFO Pointer Register (see register descriptions below). The RCV FIFO Size Register and RCV FIFO Start Address Register contain the size of the RCV FIFO in number of bytes and a 32 bit address which points to the beginning of the RCV FIFO in the DRAM 8, respectively. The RCV FIFO must be 32 byte aligned in memory. As indicated above, this is enforced by the HDLC formatter 2 by truncating the five least significant bits of the RCV FIFO start address and replacing them with zeros. The PR_R_PTR field 68 (see FIG. 9) of the Processor FIFO Pointer Register contains a 16 bit long word address offset (from the RCV FIFO Start Address) pointing to a RCV FIFO entry. The FR_R_PTR field 70 of the HDLC formatter 2 RCV FIFO Pointer Register also contains a 16 bit long word address offset (from the RCV FIFO Start Address) pointing to a RCV FIFO entry. The processor 10 updates the PR_R_PTR field 68 periodically (and must also make sure it is initialized properly). If the PR_R_PTR field 68 is written with a value larger than the RCV FIFO Size Register, the HDLC formatter 2 sets the RCV FIFO Range Error bit in the ESR and halts the DMA transfer of message data until a good value (in range) is written to the PR_R_PTR field 68. When the processor constructs available message blocks in the DRAM 8, it populates the FIFO entries in the RCV FIFO 36 with message block pointers and updates the PR_R_PTR field 68 appropriately with a single-beat access of this HDLC formatter 2 register. When the HDLC formatter 2 receives a message via its serial interface and has constructed this message in the SRAM 20, it performs a burst read of message block pointers to available message blocks from the RCV FIFO 36 and stores them in the RCV Message Pointer Burst Cache 71. The HDLC formatter 2 determines if all message pointers burst in are actually valid, as it is possible that the burst read may have proceeded past the location pointed to by the PR_R_PTR field 68. Note that the HDLC formatter 2 does not support misaligned accesses when bursting in the message pointers. It reads in message pointers at the 32 byte alignment, and on any subsequent burst reads, goes back to the same location if initially not all 32 bytes contained message pointers. Once the message pointers are determined to be valid, they are updated in the RCV Message Pointer Burst Cache 71. A message can now be DMA-transferred to the DRAM 8. A message block pointer is skipped if its value plus the value in the Message Buffer Size Register does not fit within the region bounded by the Message Buffer Base Address Register and the Message Buffer Address Limit Register, in which case the Receive Message Pointer Out of Range Error bit is set in the ESR (see register descriptions below). If there are no message pointers available in the RCV FIFO 36 when a message is ready to be DMA-transferred, the RCVBUFLOS bit is set in the ESR (see register descriptions below). After completely transferring a message, the HDLC formatter 2 updates the FIFO Pointer Register appropriately to indicate to the processor that the message is complete.

4.9.3.2 Receive Burst Data Preparation

The PCI DMA Burst Controller 172 interfaces to the RCV PCI Linked List Controller 60 through the PCI RCV Message Feed 62. When a message is being DMA-transferred from the SRAM 20 to the DRAM 8, the PCI RCV Message Feed 62 provides the data to be constructed and put into the TX Burst Line 66. When a message is ready to be constructed in the TX Burst Line 66, the PCI RCV Message Feed 62 indicates this to the DMA Burst Controller 172 with a request. If there is at least one pointer in the RCV Message Pointer Burst Cache 71, the PCI DMA Burst Controller 172 can start preparing the burst data. Otherwise, more RCV message pointers must be burst in first. When the PCI DMA Burst Controller 172 sees this request, 32 bits at a time are transferred in parallel from the PCI RCV Message Feed 62 to the TX Burst Line 66. This process continues until the PCI DMA Burst Controller 172 determines that the TX Burst Line 66 is full (contains 32 bytes). If the entire message size (including header) is less than 33 bytes, the PCI RCV Message Feed 62 pads the remaining bytes up to 32. When the TX Burst Line 66 is full, the DMA Burst Controller 172 can run the cycle. If the entire message size is greater than 32 bytes, the first message data is burst to the DRAM 8 beginning at the location which is 32 bytes offset from the beginning of the message. This is done in order to skip the DMA of the first 32 bytes so that the PCI RCV Message Feed 62 can calculate the byte count and insert this information into the message descriptor. Then the DMA Burst Controller 172 determines that the TX Burst Line 66 is empty again and continues the process of constructing burst line data. If there is another request from the PCI RCV Message Feed 62, the message continues to be burst to the DRAM 8 until the RCV Message Feed 62 signals the end of the message (next to last burst transfer). The end of the message may not be enough to fill an entire TX Burst Line 66, but the PCI RCV Message Feed 62 pads out the extra bytes before giving the data to the PCI DMA Burst Controller 172. Finally, the first 32 bytes of the message (including header) are DMA-transferred to the DRAM 8 at the beginning of the message.

All burst accesses done by the HDLC formatter 2 for DMA transfer of messages to the DRAM 8 are performed as Memory Writes with all PCI Byte Enables active. In the linear increment mode, the PCI Bridge devices are expected to target disconnect at the cacheline boundary if the HDLC formatter 2 is attempting to burst data beyond this boundary (e.g. the Message Handler application will disconnect at 16 byte boundaries). If the access is target disconnected and the entire TX Burst Line 66 is not transferred, the HDLC formatter 2 initiates subsequent writes to complete transferring the 32 bytes of the TX Burst Line 66. This occurs even if the end of a message for a Message Handler pack implementation has been padded with more than 16 bytes.

4.9.3.3 Transmit Message Transfer

As previously described, in the transmit message direction, the HDLC formatter 2 transfers messages from the DRAM 8 to the SRAM 20. Two priorities of transmit messages are supported: a high priority transmit message and a transmit message.

For transfer of high priority messages, a High Priority Transmit Message register (see register descriptions below) holds a handshaking bit, an out of range indicator bit and a pointer to the high priority message. The handshake bit is constantly checked by the HDLC formatter 2 to determine if a high priority message is ready to be transferred from the DRAM 8. A current transmit message in progress is completely transferred from the DRAM 8 before beginning the high priority message. All receive messages, in progress or not, take a lower priority than the high priority transmit message. Before transferring the high priority message from the DRAM 8, the HDLC formatter 2 determines if the message pointer value plus the value in the Message Buffer Size Register fits within the region bounded by the Message Buffer Base Address Register and the Message Buffer Address Limit Register. If not, the Transmit Message Pointer Out of Range Error bit and the High Priority Message Done bit are set in the ESR, the out of range bit and handshaking bit are set in the High Priority Transmit Message register, and the high priority message is lost. If this range error does not occur and the DMA transfer takes place, once the high priority message is completely transferred from the DRAM 8, the handshaking bit is set and an ESR bit set to indicate the high priority message transfer is done.

For transfer of other transmit messages, the TX FIFO 34 in the DRAM 8 containing message block pointers is populated by the processor. Each entry in the TX FIFO 34 contains a 32 bit pointer to a message block in the DRAM 8, where one message corresponds to one block. The message blocks must be 32 byte aligned in memory. This is enforced by the HDLC formatter 2, which truncates the five least significant bits of the Message Buffer Base Address Register and the message pointers, and replaces them with zeros.

There are four registers in the HDLC formatter 2 which allow the processor 10 and the HDLC formatter 2 to manipulate the TX FIFO entries for the messages to be transmitted: the TX FIFO Size Register, the TX FIFO Start Address Register, the Processor FIFO Pointer Register, and the HDLC formatter FIFO Pointer Register. The TX FIFO Size Register and TX FIFO Start Address Register contain the size of the TX FIFO in bytes and a 32 bit address which points to the beginning of the TX FIFO in the DRAM 8 respectively. The TX FIFO must be 32 byte aligned in memory. This is enforced by the HDLC formatter 2 by truncating the five least significant bits of the TX FIFO starting address and replacing them with zeros. The PR_T_PTR field 74 (see FIG see FIG. 8) of the Processor TX FIFO Pointer Register contains a 16 bit long word address offset (from the TX FIFO Start Address) pointing to a TX FIFO entry. The FR_T_PTR field 72 of the HDLC formatter 2 TX FIFO Pointer Register also contains a 16 bit long word address offset (from the TX FIFO Start Address) pointing to a TX FIFO entry. The processor 10 updates the PR_T_PTR field 74 periodically (and must also make sure it is initialized properly). If the PR_T_PTR field 74 is written with a value larger than the TX FIFO Size Register, the HDLC formatter 2 sets the TX FIFO Range Error bit in the ESR and halts the DMA transfer of message data until a good value (in range) is written to the PR_T_PTR field 74. When the processor 10 has messages in the DRAM 8 that are ready to be transmitted, it populates the TX FIFO entries with message block pointers and updates the PR_T_PTR field 74 appropriately with a single-beat access of this HDLC formatter 2 register. The HDLC formatter 2 determines that there are message pointers ready to be burst in and performs a burst read of pointers to DRAM message blocks 30 from the TX FIFO 34 and stores them in the TX Message Pointer Burst Cache 75. The HDLC formatter 2 determines if all message pointers burst in are actually valid, as it is possible that the burst read may have proceeded past the location pointed to by the PR_T_PTR field 74. Note that the HDLC formatter 2 does not support misaligned accesses when bursting in the message pointers. It reads in message pointers at the 32 byte alignment, and on any subsequent burst reads, goes back to the same location if initially not all 32 bytes contained message pointers. Once the message pointers are determined to be valid, they are updated in the TX Message Pointer Burst Cache 75. A message can now be DMA-transferred from the DRAM 8. A message pointer and corresponding message is skipped if its value plus the value in the Message Buffer Size Register does not fit within the region bounded by the Message Buffer Base Address Register and the Message Buffer Address Limit Register, in which case the Transmit Message Pointer Out of Range Error bit is set in the ESR. After the complete message is transferred from the DRAM 8 into the HDLC formatter 2, the HDLC formatter 2 updates the FR_T_PTR field 72 in the HDLC formatter 2 TX FIFO Pointer Register appropriately.

4.9.3.4 Transmit Burst Data Preparation

The PCI DMA Burst Controller 172 also interfaces to the TX PCI Linked List Controller 84 through the PCI TX Message Feed 82 when a message is being DMA-transferred from the DRAM 8 to the SRAM 20. If there is at least one valid pointer in the TX Message Pointer Burst Cache 75, the PCI DMA Burst Controller 172 can request the burst data from the DRAM location pointed to by the TX message block pointer. Otherwise, more available TX message pointers must first be burst into the HDLC formatter 2. Before bursting in a TX message, the DMA Burst Controller 172 also checks that there is at least one RCV Message Pointer in the RCV Message Pointer Burst Cache 71, because bursting in a message could hold up bursting in any needed RCV pointers. When the RCV Burst Line 80 is empty, the PCI DMA Burst Controller 172 can run a cycle for a new message and inform the PCI TX Message Feed 82 about the start of message. After bursting in 32 bytes, the PCI DMA Burst Controller 172 transfers 32 bits at a time in parallel from the RCV Burst Line 80 to the PCI TX Message Feed 82. When the PCI TX Message Feed 82 has the 32 bytes of data, the PCI DMA Burst Controller 172 can burst in the next 32 bytes of the message. This handshaking continues for the remainder of the message, so that the message can continue to be burst from the DRAM 8 with additional 32 byte burst transfers (if needed), until the PCI TX Message Feed 82 identifies the end of the message based on the byte count in the message header. The last part of the message may contain bytes which were padded by the HDLC formatter 2. The HDLC formatter 2 performs the complete burst read, including the extra bytes. These bytes are also transferred to the PCI TX Message Feed 82, which contains the byte counter enabling it to drop the padded bytes so that they are not put into the SRAM 20. The PCI DMA Burst Controller 172 can then begin bursting in a new message.

All burst accesses done by the HDLC formatter 2 for DMA transfer of messages from the DRAM 8 are performed as memory reads with all PCI Byte Enables active. In the linear increment mode, the PCI Bridge devices are expected to target disconnect at the cacheline boundary if the HDLC formatter 2 is attempting to burst data beyond this boundary (e.g., a Message Handler application implementation will disconnect at 16 byte boundaries). If the access is target-disconnected and the entire RCV Burst Line 80 is not filled, the HDLC formatter 2 is required to initiate subsequent reads to complete filling the 32 bytes of the TX Burst Line.

4.9.4 PCI Clock Domain

The PCI Interface Block can run up to a maximum frequency of 33.3 MHz. The PCI clock is supplied externally to the device on the PCICLK input pin (see pin descriptions below). The PCI Interface Block crosses clock boundaries from the PCI clock domain to the system clock domain at interfaces to the two PCI Message Feed Blocks 62 and 82, the SRAM Data Register and SRAM Address and Control Register located in the SRAM register block 180, and the arbiters for the Timeslot Mux RAM 42, the Timeslot Channel Map RAM 46, and the Channel Configuration RAM.48.

4.10 Clock Domains

Figure 29B:
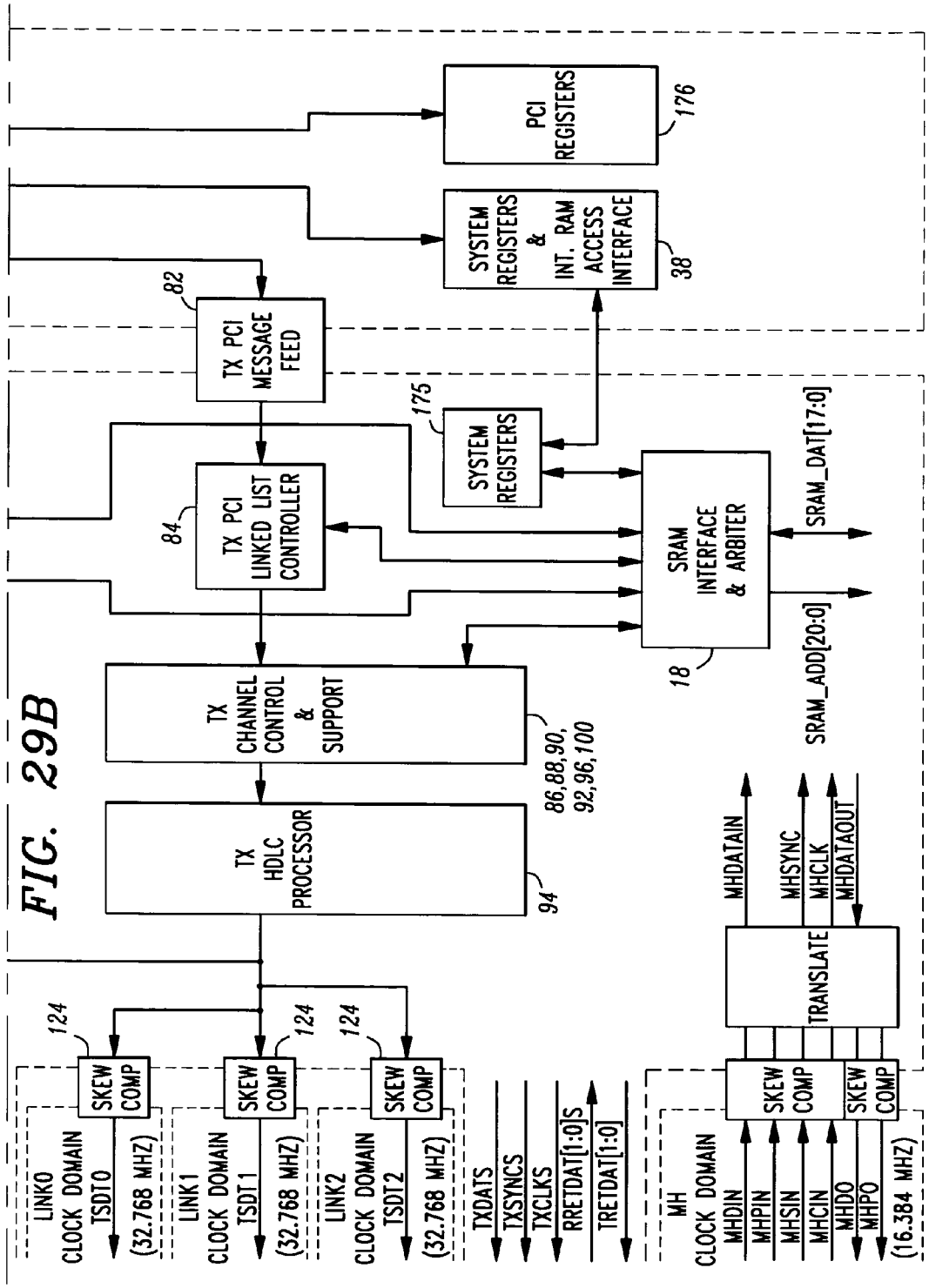
FIG. 29 is a functional block diagram showing clock domains for the HDLC formatter of FIG. 1.

The HDLC formatter 2 operates across multiple clock domains. FIG. 29 shows the boundaries between these domains. In particular, six clock domains exist. There are three 32.768 MHz link clocks, one 16.384 MHz Message Handling clock, one 65.536 MHz system clock, and one PCI clock domain up to 33.3 MHz.

4.11 Fill-In Signal Unit Hardware Assist

CCS7 hardware assist for Fill-In Signal Units (FISU) may be a desired function for future PH circuit pack implementations. At this time, however, the function is not fully defined.

5. Testability

5.1 Device BIST

As shown in FIG. 29, the HDLC formatter 2 include a Controller 190 for performing BIST (Built In Self Test) functions. These functions are implemented as follows:

Logic BIST is implemented using SPRUCE. BIST will be performed on logic in the SYSCLK domain only.

The PCI bus 16 will remain active during BIST. During BIST, software will be able to perform read and write accesses to all registers in the HDLC formatter 2. If the register being accessed is BISTed, the read or write cycle will complete properly even though no data will actually be written or garbage will be returned for a read. The PCI Configuration Registers will not be BISTed and can be accessed with valid data during BIST.

All RAMs are BISTed using a combination of BISTed RAM macrocells and a custom controller.

The RAM BIST and logic BIST are independently controlled. This allows the HDLC formatter 2 to run BIST on the various blocks sequentially for power considerations.

BIST is controllable through both the PCI interface and the JTAG interface.

Outputs are tristated during BIST except for the PCI bus and PLL support signals which will remain operational.

The following procedure will run device BIST through the PCI interface:

Reset the device (using either RSTN or PCIRST).
Write the BIST register (a PCI configuration register) with 0x40 to start BIST.
Wait 3 msec.
Read the BIST register (see register descriptions below). The register should contain the value 0x80.
Read the Signature Analysis Register. The register should contain the value 0xDCA2_3FFF.
Reset the device.
Write the Signature Analysis Register to 0x00008000 to set the BISTFAIL bit.
Write the BIST register (a PCI configuration register) with 0x40 to start BIST.
Wait 10 usec.
Read the BIST register. The register should contain the value 0x8A to indicate BIST failed.
Reset the device.

5.2 External SRAM BIST

External SRAM BIST is supported. BIST is executed by setting the SRAM-BEN bit in the Diagnostic Register to a one (1) (see register descriptions below). Once the SRAM-BDN bit returns a 1, the SRAM-BPF bit can be read to determine whether BIST passed or failed. The SRAM-BPF bit can be forced low (fail) by setting the SRAM-BFC to a 1. The HDLC formatter 2 performs the pattern write/read algorithm to test the SRAM. The algorithm has five passes and is of magnitude 15N. It can be described with the following notation: $\boxed{W_5}_{\uparrow}$, $\boxed{RW_aW_5W_a}_{\uparrow}$, $\boxed{RW_5W_a}_{\uparrow}$, $RW_5$, $W_aW_5$, $RW_aW_5$; where R is a read of a location, $W_x$ is a write of all x's to a location, the box indicates ascending order, and the underbar indicates descending order. For example, the pass $\boxed{RW_5W_a}_{\uparrow}$, means read the first location, write fives (5's) to the first location, write a's to the first location, increment the address and repeat until all addresses have been accessed. Read values are compared against expected values, instead of signature compression, because the size of the RAM is variable.

A device reset is required after running External SRAM BIST. The following procedure will run SRAM BIST (information about registers referred to is provided in the register descriptions below):

Set bit 31 (KEY) in the Master Configuration Register.
Write the Diagnostic Register to 0x00010000 to enable SRAM BIST.
Poll the Diagnostic Register until bit 18 (SRAM_BDN) =1. This will take approximately 200 msec for a 256Kx116 SRAM.
Verify that bit 19 (SRAM_BPF) is set to a 1 (BIST passed).
Set bit 17 (SRAM_BFC) to a 1 to force a fail flag.
Verify that Bit 19 (SRAM_BPF) is equal to 0 (flag is functioning properly).

5.3 Channel Monitor

A serial channel data and clock output port can be configured to monitor a single serial receive and transmit channel. The clock is a gated 16 MHz one, since it will be active only when data is valid. Note that the data will be bursty depending on the timeslot to channel mapping. The monitored data will always be in the non-inverted state, regardless of the state of the INVERT bit in the Channel Configuration RAM 48.

5.4 Serial Channel Loopback

Each bibble of each timeslot in the transmit (TX) serial stream can be looped back to the receive (RCV) serial input. This flexibility allows the looping of a single channel without affecting other channels. Programming is done on a timeslot basis—it is up to the programmer to do the timeslot/channel mapping. An internal 256×8 Loop RAM 200 (see FIGS. 3 and 4) will be used to buffer an entire frame of data for the loopback function. All bibbles looped back will also be transmitted.

5.5 All Serial Loopback

Loopback on all timeslots can be done by setting a bit in the Diagnostic Register (see register descriptions below). Proper timing between the TX and RCV serial interfaces is maintained. All timeslots will continue to be transmitted.

5.6 Message Loopback

Received messages stored in the SRAM 20 can be looped back to the serial transmit side either globally or on a per-channel basis. The receive messages will not be DMA-transferred to the DRAM 8 when message loopback is enabled.

5.7 Boundary Scan

JTAG 1149.1 boundary scan is supported through a JTAG interface (BS_TDI, BS_TDO, BS_TMS, BS_TCK, BS_RSTN) (see signal descriptions below). Due to timing issues, the following I/O signals (see signal descriptions below) are not part of the boundary scan chain:

PFIRST
SRAM_DAT[15:0]
SRAM_PARL
SRAM_PAR.H
SRAM_ADD[20:0]
SRAM_WEN
SRAM_OEN

The PFIRST input should always he pulled high. The SRAM interface 18 is fully tested through the SRAM BIST. For information on executing the boundary scan instructions, refer to the applicable circuit pack.

5.8 Error Monitors

An Error Source Register provides a wide variety of error checks. The bits in this register are maskable and are summed together to trigger interrupt outputs. The summary of the unmasked ESR bits activates both the INTN signal and the PCIINTN signal. For a detailed list of the errors provided, refer to the register descriptions below.

5.9 Error Forcing

An Error Force Register (see register descriptions below) is provided to force errors that are difficult to force through "normal" operations. The following describes the method for forcing each of the ESR errors.

ILLACCES (Illegal Access)
This error can be forced from the host processor in 1 of 4 ways: execute a misaligned access, access an unused address in the HDLC formatter 2 memory space, write to a key protected register when the key is not set, and writing a read-only register other than those in the PCI Configuration space.

PARERR (Parity Error on PCI Bus)
This error can be forced by setting the DETPAR bit of the PCI Status Register to a one (1), or via the host processor e.g. by using the PCI Maintenance Register on the MCA740 to invert address or data parity for master-initiated PCI cycles.

SYSERR (System Error on PCI bus)
This error can be forced by setting the SSYSERR bit of the PCI Status Register to a one (1), or via the host processor e.g. by using the PCI Maintenance Register on the MCA740 to invert address parity for master-initiated PCI cycles. Parity response and SERR must be enabled in the HDLC formatter 2 PCI Command Register.

RXMSTAB (Receive Master Abort on PCI Bus)
This error can be forced by setting the RCVMSTAB bit of the PCI Status Register to a one (1), or via the host processor e.g. by manipulating the base address register(s) on the MCA740 such that it does not respond to an HDLC formatter 2 initiated cycle, the HDLC formatter 2 will master abort.

RXTARAB (Receive Target Abort on PCI Bus)
This error can be forced by setting the RCVTARAB bit of the PCI Status Register to a one (1), or via the processor 10, e.g., by using a PCI Maintenance Register to generate a target abort followed by a HDLC formatter 2 initiated PCI cycle to the target machine.

TARAB (Target Abort on PCI Bus)
This error can be forced by setting the SIGTARAB bit of the PCI Status Register to a one (1) or by setting the FTARAB bit in the Force Error Register to a one (1) followed by a target access of the HDLC formatter 2.

DATPARER (Data Parity Error on PCI Bus)
This error can be forced by setting the DPERRDET bit of the PCI Status Register to a one (1), or via the processor 10, e.g., by using a PCI Maintenance Register to check for inverted parity when in target mode followed by an HDLC formatter 2 initiated cycle to the target machine.

SRAMACC (SRAM Access Error)
This error can be forced by setting the FSRAMACC bit in the Force Error Register to a one (1) followed by an access to the SRAM 20.

SCRUBHIT (Scrub Recovery)
This error can be forced by putting a transmit message in the TX FIFO 34 for a channel that is not assigned to a timeslot. The Scrub Recovery will occur after the time in the Scrub Time Register has elapsed.

SRAMDNGR (SRAM Danger)
This warning can be forced by freezing the pointer PR-R-PTR 68 while the HDLC formatter 2 is receiving messages. Received messages will not be able to DMA-transfer to the DRAM 8. Once enough messages have been received, the SRAM Danger level should be reached.

CRCTHR (CRC Error Threshold)
This error can be forced by transmitting to the HDLC formatter 2 messages that have bad CRC. The CRC Threshold Register can be set low to cause this error to occur rapidly. Messages with bad CRC can be generated by turning on the serial loopback (LOOPSER= 1 in the Diagnostic Register) and placing TX messages in the DRAM 8 that have the Force CRC Error bit set in the message header.

LONGTHR (Long Frame Error Threshold)
This error can be forced by setting the Long Frame Threshold Register to a one (1) and setting the Long Frame Size Register to a zero (0), followed by the HDLC formatter 2 receiving any messages. Messages can he generated by turning on the serial loopback (LOOPSER=1 in the Diagnostic Register) and placing TX messages in the DRAM 8.

SHORTRHR (Short Frame Error Threshold)
This error can be forced by setting the Short Frame Threshold Register to a one (1) followed by the HDLC formatter 2 receiving a message under 4 bytes (including CRC). Messages under 4 bytes can be generated by turning on the serial loopback (LOOPSER=1 in the Diagnostic Register) and placing a zero (0) or a one (1) byte TX message in DRAM.

MSGOOR (Message Out of Range)
This error can be forced from the host processor by placing an entry in the RCV FIFO 36 that points to a message outside of the allowable range. This error can also be forced by writing the Message Buffer Base Address Register and the Message Buffer Address Limit Register to artificially small address ranges.

RCVCCOF (Receive Channel Cache Overflow)
This error can be forced by freezing the pointer PR_R_PTR 68 while the HDLC formatter 2 is receiving messages. Once the SRAM 20 runs out of buffers, the RCV Channel Cache will overflow.

SSYNCERR (System Sync Error)
This error can be forced setting the FSYSSYNC bit in the Force Error Register to a one (1) followed by waiting 125 usec. This will not affect the operation of the HDLC formatter 2.

RFFPNTR (RCV FIFO Pointer Out of Range)
This error can be forced writing the pointer PR_R_PTR 68 to a value outside of the RCV FIFO address range.

TFFPNTR (TX FEFO Pointer Out of Range)
This error can be forced writing the pointer PR_T_PTR 74 to a value outside of the TX FIFO address range.

TXCCLOSS (TX Channel Cache Loss)

This error can be forced writing the RTXCCLOS bit in the Force Error Register to a one (1) followed by the HDLC formatter 2 transmitting a message.

LLERR (Linked List Error)

This error can be forced altering the linked list headers in the SRAM 20.

RBUFLOSS (RCV Buffer Loss)

This error can be forced by freezing the pointer PR_R_PTR 68 while the HDLC formatter 2 is receiving messages. Once a RCV message has been received and no DRAM message buffers are available, this error will be set.

SRAMOF (SRAM overflow)

This error can be forced by freezing the pointer PR_R_PTR 68 while the HDLC formatter 2 is receiving messages. Once a RCV message has been received and no SRAM buffers are available, this error will be set.

SRAMPAR (SRAM Parity Error)

This error can be forced by setting the FSRAMPAR bit in the Force Error Register followed by a read of the SRAM 20.

SYNCERR[2:0] (Serial Sync Error)

This error can be forced by setting the corresponding FSYCNER[2:0] bit in the Force Error Register. A 125 usec delay can occur before the error bit will be set.

SLPAR[2:0] (Serial Parity Error)

This error can be forced by sending serial data with bad parity from the serial link source.

HDLC Errors

The FFRAMERR bit in the Force Error Register can cause framing errors on the input serial channels. This error will be reported in the Message Buffer header. The FRCVOFF bit in the Force Error Register can cause Receiver turned off flags to be set on input serial channels. This error will be reported in the Message Buffer header. This bit is used instead of simply turning off a channel to ensure that the channel is turned off in the middle of a message.

HDLC ABORT can be forced by enabling serial loopback, loading a TX message into the SRAM 20, and immediately turning off the TXON bit in the Channel Configuration RAM 48 for the channel.

CRC errors and CRC Threshold errors can be forced by enabling serial loopback and then transmitting a message with the force CRC bit set in the message header.

Short Frame errors and Short Frame Threshold errors can be forced by enabling serial loopback and then transmitting a message with a size of less than 2 bytes.

Long Frame errors and Long Frame Threshold errors can be forced by enabling serial loopback, setting the Long Frame Size register to 0x00, and then transmitting a message. Overrun Buffer errors can be forced by enabling serial loopback, freezing the TSLLC (by setting the TSLLCFRZ bit in the Diagnostic Register), transmitting a message from the DRAM 8 to the SRAM 20, resizing the Message Buffer Size register to a value smaller than the message, and then unfreezing the TSLLC.

5.10 Capacity Monitors

Several registers provide capacity monitors to enable evaluation of capacity demands and diagnose problems. These registers contain both a current level field as well as a high water mark.

SRAM Usage Register: This register monitors how many external SRAM blocks are used for storing messages.

RCV Channel Cache Usage Register: This register monitors how much of the (internal) RCV Channel Cache RAM being used.

Scrub Count/Information Registers: These registers provide information on how many blocks have been recovered by scrubbing and information about the last recovered block.

5.11 Message Processing Errors

Several registers provide information regarding lost message data. These are provided to aid in diagnosing errors in transmitting and receiving messages.

Channel Linked List Error Register: This register saves the last channel number that received a linked list error (reported in the Error Source Register).

Channel Cache Loss Register: This register saves the last channel number for which data was not available in time for transmission (reported in the Error Source Register).

5.12 Linked List Test Functions

A method of freezing the RCV and TX messages in the SRAM 20 is needed to diagnose the linked list controllers 56, 60, 84 and 86. In the RCV direction, simply leaving the DRAM RCV FIFO 36 empty will freeze a RCV message in the SRAM 20 because it has nowhere to go. In the TX direction, a diagnostic control bit is needed to freeze the TX Serial Linked List Controller 86. When frozen, the TX Serial Linked List Controller 86 informs the TX Channel Cache 92 that no messages are available. The RCV and TX Channel Pointer RAMs 58 and 88 are PCI accessible. These pointers, along with SRAM access, allow a complete evaluation of messages in the SRAM 20.

Another bit in the Diagnostic Register allows the DRAM RCV FIFO to "free run". In this mode, no checking of FIFO pointers will be done, and message pointers in the FIFO will be used as needed. This will prevent the RCV section from using all of the SRAM buffers when real-time operational code is not running.

5.13 Internal RAM Diagnostic/Testability/Observability Strategy)

The table below summarizes the available capabilities for diagnosing, testing and observing the various RAMs of the HDLC formatter 2:

TABLE 1

RAM Information

| RAM | PCI Access | Parity | BIST | POR Init Routine |
|---|---|---|---|---|
| External SRAM | Indirect | Yes | Yes | Yes |
| Loop | None | No | Yes | No |
| Timeslot Mux | Direct | No | Yes | Yes |
| TS Channel Map | Direct | No | Yes | Yes |
| Channel Configuration | Direct | No | Yes | Yes |
| RCV HDLC Status | none | No | Yes | Yes |
| TX HDLC Status | none | No | Yes | Yes |
| RCV Channel Cache | none | No | Yes | No |
| TX Channel Cache | None | No | Yes | No |
| TX Channel Cache Status | None | No | Yes | Yes |
| TX Subrate Cache Task FIFO | None | No | Yes | Yes |
| RCV Channel Pointers | Direct | No | Yes | Yes |
| TX Channel Pointers | Direct | No | Yes | Yes |

Note: Internal RAM parity bits are not observable by the PCI interface.

6. RESET

Two resets are provided: An RSTN input signal and a PCI reset signal. These two resets operate differently. The PCI reset signal resets the entire device, while the RSTN signal resets everything except the PCI macro and the PCI configuration registers. Both resets do the following (information about the registers referred to is available in the register descriptions below):

BIST (if running) will be halted.

All memory mapped registers are preset to a fixed value except for the PFI register and the Miscellaneous Output Control Register. The PFI register has its own reset pin.

The STANDBY bit in the Master Control Register is set to prevent any processing of messages.

The ICMPLT (Initialization Complete) bit in the Master Status Register is cleared.

All state machines are set to the default state.

Upon exiting reset, the following actions are taken automatically by hardware:

All locations of selected internal RAMs are written with default data and proper parity.

The size of the SRAM 20 size is autodetected; size is written to the SRAM Size Register.

All locations of the SRAM 20 is written with default data and proper parity.

The free linked list is constructed out of the entire SRAM 20.

Once completed, the ICMPLT bit is set in the Master Status Register, informing the processor that initialization has been completed. Initialization with a 256K×16 SRAM 20 will take approximately 8 msec.

Upon exiting reset, the following action must be taken by software:

Initialize the PCI Configuration registers including the PCI Base Address Register.

Once the processor sees the ICMPLT bit set, it must do the following to start normal operation:

Write the Master Configuration Register.

Write the Message Buffer Size Register.

Configure all sync control and sync position registers.

Configure RCV and TX FIFO addresses and sizes.

Configure message buffer base address and size.

Write the HDLC formatter FIFO Pointer Register (note that this is normally only read by the processor). The pointers in this register should be initialized to the last location of the FIFOS.

Write the processor FIFO Pointer Register. The pointers in this register should be initialized to the last location of the FIFOS.

Clear the STANDBY bit in the Master Control Register to enable message processing.

To enable the processing of messages, the Timeslot Mux RAM 42, the Timeslot Channel Map RAM 46, and the Channel Configuration RAM 48 must be written with the appropriate data (in that order).

The following registers (described in the register descriptions below) should not be altered after STANDBY has been cleared. Altering these registers can result in loss of message data and require a device reset:

MCONTROL—Master Control Register.
SYNCOFF—Sync Offset Register.
RCVPOS—Receive Data-Sync Position Register.
TXPOS—Transmit Data-Sync Position Register.
TFFSTART—Transmit FIFO Start Address Register.
TFFSIZE—Transmit FIFO Size Register.
RFFSTART—Receive FIFO Start Address Register.
RFFSIZE—Receive FIFO Size Register.
MSGSIZE—Message Buffer Size Register.

7. Pin Descriptions

The HDLC formatter 2 has 197 I/O pins classified as System Signals, Serial Interface, Serial Format Conversion Signals, Board Synchronization Signals, PCI Interface, SRAM Interface, and Test Signals. Each of the signals is listed in the following tables. The pins include 48 input connections, 87 output connections, and 62 bidirectional connections. All device I/O will be 3.3V.

TABLE 2

System Signals

| Signal Name | I/O | Act | Description |
| --- | --- | --- | --- |
| SYSCLK | I | — | 65.536 MHz board clock. This clock will be phase locked to the selected serial link clock. |
| SYSSYNC | I | 0 | 8 KHz board sync. This sync will be selected from the selecte serial link sync. |
| CK1MI | I | — | 1 MHz synchronization signal from the PLL. This signal is used for the skew compensation. |
| BON | I | 0 | Output enable. A '0' tristates all outputs on the device. |
| MOD_SEL | I | — | Mode Selection. A '0' selects the Serial Format Conversion Interface. A '1' selects the differential input Serial Interface. |
| RSTN | I | 0 | Hardware reset. See the section on reset for the effects of RSTN. |
| INTN | 0 | 0 | Interrupt. This summarizes the status of the ESR/ESR Mask registers. |

TABLE 3

Serial Interface

| Signal Name | I/O | Act | Description |
| --- | --- | --- | --- |
| RDAT[2:0]P | I | — | Receive serial data (1 per link) differential positive. |
| RDAT[2:0]N | I | — | Receive serial data (1 per link) differential negative. |
| RSYNC[2:0]P | I | 0 | Receive sync (1 per link) differential positive. |
| RSYNC[2:0]N | I | 0 | Receive sync (1 per link) differential negative. |
| RCLK[2:0]P | I | — | 32.768 MHz receive clock (1 per link) differential positive. |
| RCLK[2:0]N | I | — | 32.768 MHz receive clock (1 per link) differential negative. |
| RTAPDAT2 | O | — | Output tap of the received link 2 data. |
| RTAPSYNC2 | O | 0 | Output tap of the received link 2 sync. |
| RTAPCLK2 | O | — | Output tap of the received link 2 clock. |
| TSDAT[2:0]P | O | — | Transmit skew compensated data (synchronized to RCLK[2:0]) differential positive. |
| TSDAT[2:0]N | O | — | Transmit skew compensated data (synchronized to RCLK[2:0]) differential negative. |
| TXDAT[2:0]P | O | — | Transmit synchronized data (synchronized to SYSCLK) differential positive. |
| TXDAT[2:0]N | O | — | Transmit synchronized data (synchronized to SYSCLK) differential negative. |
| TXSYNC[2:0]P | O | 0 | Transmit sync (synchronized to SYSCLK) differential positive. |
| TXSYNC[2:0]N | O | 0 | Transmit sync (synchronized to SYSCLK) differential Negative. |
| TXCLK[2:0]P | O | — | Transmit clock (synchronized to SYSCLK) differential positive. |
| TXCLK[2:0]N | O | — | Transmit clock (synchronized to SYSCLK) differential negative. |
| TXDATS | O | — | Transmit synchronized data single-ended. |
| TXSYNCS | O | 0 | Transmit sync single-ended. |
| TXCLKS | O | — | Transmit clock single-ended. |
| RRETDAT[1:0]S | O | — | Single-ended return data. |
| TRETDAT[1:0]P | O | — | Transmit RRETDATS data (synchronized to SYSCLK) Differential positive. |
| TRETDAT[1:0]N | O | — | Transmit RRETDATS data (synchronized to SYSCLK) differential negative. |

TABLE 4

Serial Format Conversion Signals

| Signal Name | I/O | Act | Description |
|---|---|---|---|
| MHDATIN_16 | I | — | 16 Mbit format serial input data. |
| MHPARIN_16 | I | — | 16 Mbit serial input parity. |
| MHSYNC_16 | I | 0 | 8 KHz serial sync for 16 Mbit link. |
| MHCLK_16 | I | — | 16.384 MHz link clock. |
| MHDATOUT_16 | O | — | 16 Mbit serial output data. |
| MHPAROUT_16 | O | — | 16 Mbit serial output parity. |
| MHCK1MO | O | — | 1.024 MHz PLL input clock from Conversion interface. |

TABLE 5

Board Synchronization Support Signals

| Signal Name | I/O | Act | Description |
|---|---|---|---|
| CK1MA | O | — | 1.024 MHz link 1 clock. |
| CK1MB | O | — | 1.024 MHz link 2 clock. |
| SYNCA | O | 0 | 8 KHz link 1 sync. |
| SYNCB | O | 0 | 8 K.Hz link 2 sync. |
| CK1MUXA | I | — | 1.024 MHz mux input. |
| CK1MUXB | I | — | 1.024 MHz mux input. |
| CK1MO | O | — | 1.024 MHz PLL input clock. |
| SYNCMUXA | I | 0 | 8 KHz sync mux input. |
| SYNCMUXB | I | 0 | 8 KHz sync mux input. |
| SYNCS | O | 0 | 8 KHz system sync output. |

TABLE 6

PCI Interface

| Signal Name | I/O | Act | Description |
|---|---|---|---|
| PCIAD[31:0] | I/O | — | PCI address/data bus. |
| PCICBE[3:0] | I/O | — | PCI command/byte enable bus. |
| PCIPAR | I/O | — | PCI parity over address/data bus and command/byte Enable bus. |
| PCIFRAME | I/O | 0 | PCI cycle frame indicates beginning and duration of the PCI access. |
| PCITRDY | I/O | 0 | PCI target ready to complete the current data phase. |
| PCIIRDY | I/O | 0 | PCI initiator ready to complete the current data phase. |
| PCISTOP | I/O | 0 | PCI stop current transaction requested by the target. |
| PCIDEVSEL | I/O | 0 | PCI device select. |
| PCIIDSEL | I | 1 | PCI initialization device select for configuration cycles. |
| PCIPERR | I/O | 0 | PCI data parity error indication. |
| PCISERR | O | 0 | PCI system error (including address parity) indication. |
| PCIREQ | O | 0 | PCI bus request. |
| PCIGNT | I | 0 | PCI bus grant. |
| PCICLK | I | — | PCI clock (up to 33⅓ MHz). |
| PCIRST | I | 0 | PCI reset. |
| PCIINTA | O | 0 | PCI interrupt. This open drain signal is equivalent to the INTN signals. |
| PCILOCK | I/O | 0 | PCI lock for atomic operations requiring multiple Transactions to complete; the HDLC formatter 2 does not use this functionality. |

TABLE 7

SRAM Interface

| Signal Name | I/O | Act | Description |
|---|---|---|---|
| SRAM_DAT[15:0] | I/O | — | SRAM Data bus. |
| SRAM_PARL | I/O | — | SRAM Data bus even parity for low byte (bits 7–0). |
| SRAM_PARH | I/O | — | SRAM Data bus even parity for high byte (bits 15–8). |
| SRAM_ADD[20:0] | O | — | SRAM Address bus. |
| SRAM_WEN | O | 0 | SRAM Write Enable. |
| SRAM_OEN | O | 0 | SRAM Output Enable. |

TABLE 8

Test Signals

| Signal Name | I/O | Act | Description |
| --- | --- | --- | --- |
| BS_TDI | I | — | Boundary Scan Test Data Input. |
| BS_TDO | O | — | Boundary Scan Test Data Output. |
| BS_TMS | I | — | Boundary Scan Test Mode Select. |
| BS_TCK | I | — | Boundary Scan Test Clock. |
| BS_TRSTN | I | 0 | Boundary Scan Test Reset. |
| RCV_CHOUT | O | — | Receive Test Channel Output. This signal outputs a Selected channel from the serial RCV links for a protocol Analyzer. The data will be in a non-inverted state. |
| RCV_CHCLK | O | — | Receive Test Channel Clock. This clock will be active When the Test Channel Output data is valid. |
| TX_CHOUT | O | — | Transmit Test Channel Output. This signal outputs a Selected channel from the serial TX links for a protocol Analyzer. The data will be in a non-inverted state. |
| TX_CHCLK | O | — | Transmit Test Channel Clock. This clock will be active When the Test Channel Output data is valid. |
| MIC[3:0] | I | — | Miscellaneous Input Control. The value of these signals can be read from the MIC field of the MOC register. |
| MOC[3:0] | O | — | Miscellaneous Output Control. The value of these signals Directly reflects the value of the MOC register. |
| PFIRST | I | 1 | Physical Fault Insertion Reset. When low, the PFI Register is enabled. When high, the PFI register is reset. |
| PFI[7:0] | O | 0 | Physical Fault Insertion. When PFIRST = 1, these signals are "1" (inactive). When PFIRST = 0, these signals will be controlled by the PFI_EXT field of the PFI register. |
| TESTNO | I | — | Test Input. For simulation and test vector purposes only. |

8. REGISTERS
HDLC FORMATTER DEVICE REGISTER LAYOUT

| ADDRESS | DESCRIPTION | Reset Value | Clock | R/W[1,2] |
|---|---|---|---|---|
| 0x0000 | Master Status Register | 0x0000_0000 | SYSCLK | R |
| 0x0004 | Master Control Register | 0x0000_0001 | SYSCLK | R/W |
| 0x0008 | Master Configuration Register | 0x0000_0007 | SYSCLK | R/W |
| 0x000C | Long Frame Size Register | 0x0000_ffff | SYSCLK | R/W |
| 0x0010 | Sync Control Register | Not applicable | SYSCLK | R/W |
| 0x0014 | Sync Offset Register | Not applicable | SYSCLK | R/W |
| 0x0018 | RCV Data-Sync Position Register | 0x0000_0000 | SYSCLK | R/W |
| 0x001C | TX Data-Sync Position Register | 0x0000_0000 | SYSCLK | R/W |
| 0x0020 | TX FIFO Start Address Register | 0xffff_ffe0 | PCICLK | R/W |
| 0x0024 | TX FIFO Size Register | 0x0000_0000 | PCICLK | R/W |
| 0x0028 | RCV FIFO Start Address Register | 0xffff_ffe0 | PCICLK | R/W |
| 0x002C | RCV FIFO Size Register | 0x0000_0000 | PCICLK | R/W |
| 0x0030 | Processor FIFO Pointers Register | 0x0000_0000 | PCICLK | R/W |
| 0x0034 | HDLC Formatter FIFO Pointers Register | 0x0000_0000 | PCICLK | R/W |
| 0x0038 | Message Buffer Base Address Register | 0xffff_ffe0 | PCICLK | R/W |
| 0x003C | Message Buffer Address Limit Register | 0xffff_ffff | PCICLK | R/W |
| 0x0040 | High Priority Transmit Message Register | 0x0000_0001 | PCICLK | R/W |
| 0x0044 | Message Buffer Size Register | 0x0000_03e0 | SYSCLK | R/W |
| 0x0048 | Receive Message Queue Size Register | 0x0000_0000 | SYSCLK | R |
| 0x004C | Miscellaneous Output Control Register | Not applicable | SYSCLK | R/W |
| 0x0050 | SRAM Address and Control Register | 0x0000_0000 | SYSCLK | R/W |
| 0x0054 | SRAM Data Register | 0x0000_0000 | SYSCLK | R/W |
| 0x0058 | TS Mux Override Register | 0x0000_0000 | SYSCLK | R/W |
| 0x005C | Error Source Register | 0x0000_0000 | SYSCLK | R/SC |
| 0x0060 | ESR Mask Register | 0x7fff_ffff | SYSCLK | R/W |
| 0x0064 | Short Frame Threshold Register | 0x0000_ffff | SYSCLK | R/W |
| 0x0068 | Long Frame Threshold Register | 0x0000_ffff | SYSCLK | R/W |
| 0x006C | CRC Error Threshold Register | 0x0000_ffff | SYSCLK | R/W |
| 0x0070 | Channel Linked List Error Register | 0x0000_0000 | SYSCLK | R/W |
| 0x0074 | Channel Cache Loss Register | 0x0000_0000 | SYSCLK | R/W |
| 0x0078 | SRAM Usage Level Register | 0x0000_0000 | SYSCLK | R/W |
| 0x007C | SRAM Danger Level Register | 0x0000_0fff | SYSCLK | R/W |
| 0x0080 | RCV Channel Cache Usage Register | 0x0000_0000 | SYSCLK | R/W |
| 0x0084 | Scrub Time Register | 0x0000_0000 | SYSCLK | R/W |
| 0x0088 | Scrub Count Register | 0x0000_0000 | SYSCLK | R/W |
| 0x008C | Scrub Information Register | 0x0000_0000 | SYSCLK | R/W |
| 0x0090 | Signature Analysis Register | 0x0000_0000 | SYSCLK | R/W |
| 0x0094 | Physical Fault Insertion Register | Not applicable[3] | SYSCLK | R/W |
| 0x0098 | SRAM Size Register | Autodetect | SYSCLK | R/WK |
| 0x009C | Diagnostic Register | 0x0000_0000 | SYSCLK | R/WK |
| 0x00A0 | Error Force Register | 0x0000_0000 | SYSCLK | R/WK |
| 0x00A4 | Free List Head Pointer Register | 0x0000_0000 | SYSCLK | R/WK |
| 0x00A8 | Free List Tail Pointer Register | 0x0000_0000 | SYSCLK | R/WK |
| 0x00AC | RCV Message Feed Head Pointer Register | 0x0000_0000 | SYSCLK | R/WK |
| 0x00B0 | RCV Message Feed Tail Pointer Register | 0x0000_0000 | SYSCLK | R/WK |
| 0x00B4 | TX Message Feed Head Pointer Register | 0x0000_0000 | SYSCLK | R/WK |
| 0x00B8 | TX Message Feed Tail Pointer Register | 0x0000_0000 | SYSCLK | R/WK |

HDLC FORMATTER RAM LAYOUT

| ADDRESS | DESCRIPTION | Reset Value | Clock | R/W[1,2] |
|---|---|---|---|---|
| 0x1000–0x1FFC | Timeslot Channel Map RAM | 0x0000_0000 | SYSCLK | R/W |
| 0x2000–0x23FC | Timeslot Mux RAM | 0x0000_0000 | SYSCLK | R/W |
| 0x2400–0x27FC | Channel Configuration RAM | 0x0000_0000 | SYSCLK | R/W |
| 0x3000–0x33FC | RCV Channel Head Pointer RAM | 0x0000_0000 | SYSCLK | R/WK |
| 0x3400–0x37FC | RCV Channel Tail Pointer RAM | 0x0000_0000 | SYSCLK | R/WK |
| 0x3800–0x3BFC | TX Channel Head Pointer RAM | 0x0000_0000 | SYSCLK | R/WK |
| 0x3C00–0x3FFC | TX Channel Tail Pointer RAM | 0x0000_0000 | SYSCLK | R/WK |

PCI CONFIGURATION REGISTERS

| PCICONFIG ADDRESS OFFSET[4] | DESCRIPTION | Reset Value | Size (bits) | R/W[1,2] |
|---|---|---|---|---|
| 0x00 | Vendor Identification Register | 0x11C1 | 16 | R |

| | | | | | |
|---|---|---|---|---|---|
| 0x02 | Device Identification Register | 0x2100 | 16 | R | |
| 0x04 | Command Register | 0x0000 | 16 | R/W | |
| 0x06 | Status Register | 0x0280 | 16 | R/W | |
| 0x08 | Revision Identification Register | 0x00 | 8 | R | |
| 0x09 | Program Interface Register | 0x00 | 8 | R | |
| 0x0A | Sub-Class Register | 0x80 | 8 | R | |
| 0x0B | Base Class Register | 0x07 | 8 | R | |
| 0x0C | Reserved (Cacheline Size Register is unused) | 0x00 | 8 | R | |
| 0x0D | Latency Timer | 0x00 | 8 | R/W | |
| 0x0E | Header Type Register | 0x00 | 8 | R | |
| 0x0F | BIST Register | 0x8F | 8 | R/W | |
| 0x10 | Base Address Register 0 | 0x00000000 | 32 | R/W | |
| 0x14–0x3B | Reserved | 0x00000000 | 32 | R | |
| 0x3C | Interrupt Line Register | 0x00 | 8 | R/W | |
| 0x3D | Interrupt Pin Register | 0x01 | 8 | R | |
| 0x3E | Minimum Grant Register | 0x00 | 8 | R | |
| 0x3F | Maximum Latency Register | 0x00 | 8 | R | |

Note 1: WK = Write protected with key.
Note 2: SC = Set/clear.
Note 3: The Physical Fault Insertion Register is not affected by reset. It is cleared to 0x0000_0000 by the PFIRST input pin.
Note 4: PCI Configuration Space addressing is little endian format.

8.1 Detailed Description of Register Contents Master Status Register (0x0000)

Figure 30:
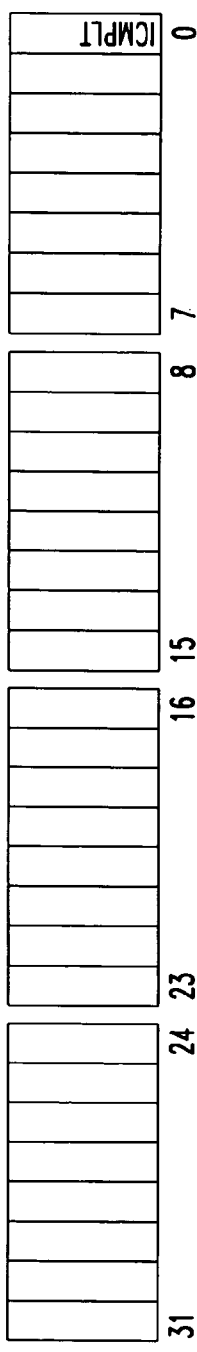
FIG. 30 is a bit field diagram of a Master Status Register in the HDLC formatter of FIG. 1.

This register provides critical HDLC formatter 2 status information associated with the start-up sequence after reset. It includes an ICMPLT bit, illustrated in FIG. 30, as follows:

| Bit | Identifier | Description |
|---|---|---|
| 0 | ICMPLT | Initialization of HDLC formatter and local SRAM completed. 0 not completed; 1 initialization complete. |

Master Control Register (0x0004)

Figure 31:
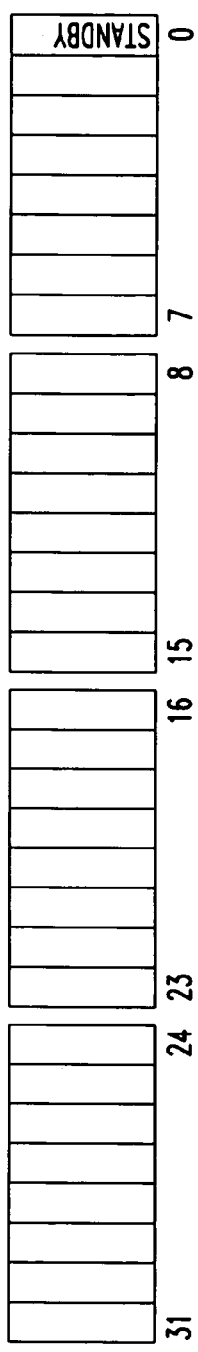
FIG. 31 is a bit field diagram of a Master Control Register in the HDLC formatter of FIG. 1.

This register provides critical HDLC formatter 2 operational control information. It includes a STANDBY bit, illustrated in FIG. 31, as follows:

| Bit | Identifier | Description |
|---|---|---|
| 0 | STANDBY | Informs HDLC formatter to prevent any processing (used during start-up configuration). 0 = normal; 1 = standby. Refer to the RESET section for further details. This bit is set to a 1 by hardware during reset, and should be set to a 0 by software after configuration has been completed. Software should never set this bit to a 1. |

Master Configuration Register (0x0008)

Figure 32:
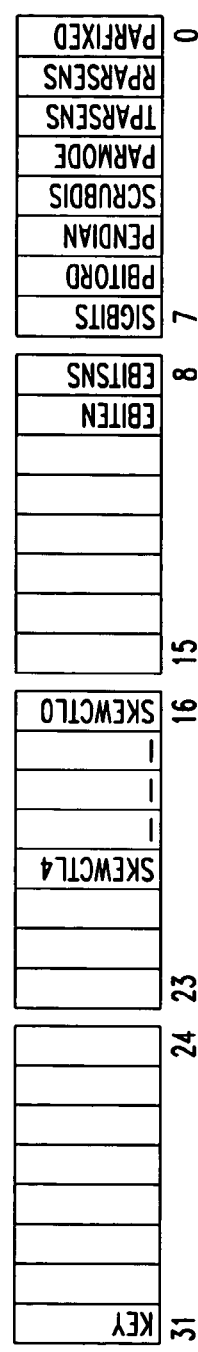
FIG. 32 is a bit field diagram of a Master Configuration Register in the HDLC formatter of FIG. 1.

This register provides miscellaneous configuration options. It includes a number of defined bit fields, illustrated in FIG. 32, as follows:

| Bit | Identifier | Description |
|---|---|---|
| 31 | KEY | Must be set to 1 to enable the writing of key protected registers. The Key will remain enabled until written with a 0. This bit does not Affect the reading of any registers. |
| 20–16 | SKEWCTL [4:0] | Controls the skew compensator timing. For hardware testing only. Always set to 0x00 for proper operation. |
| 9 | EBITEN | Controls the function of the E bit for all timeslots; 0 = E bit will have the value specified in SIGBITS bit. 1 = E bit will be set active or inactive based on whether any bibbles in the corresponding timeslot are active. The EBITSNS bit will determine what value for the E bit will indicate an Active timeslot. |
| 8 | EBITSNS | Controls the sense of the E signaling bit when EBITEN is active. 0 = Active timeslots have E bits set to 0, 1 = Active timeslots have E bits set to 1. |
| 7 | SIGBITS | Controls the sense of the signaling bits of all timeslots (except the E bit when EBITEN is active); 0 = A through G of all timeslots are set to 0, 1 = A through G of all timeslots are set to 1. |
| 6 | PBITORD | Controls the bit order of messages in DRAM buffers. 0 = bit 0 in a byte is first; 1 = bit 7 in a byte is first. |
| 5 | PENDIAN | Controls the byte order for messages in DRAM buffers. 0 = bits 31–24 are the first message byte (big endian); 1 = bits 7–0 are the first message byte (little endian). |
| 4 | SCRUBDIS | Disables the scrub function if set to a 1. |
| 3 | PARMODE | It fixed parity on the serial interface is used, this bit determines Whether every timeslot or every eighth timeslot is checked for Receive parity. 0 = check every timeslot, 1 = check every eighth Timeslot (timeslot 0,8,16,etc.). |
| 2 | TPARSENS | If fixed parity on the serial interface is used, this bit determines Whether even or odd parity is generated on transmit data. 0 = even; 1 = odd. |
| 1 | RPARSENS | If fixed parity on the serial interface is used, this bit determines Whether even or odd parity is checked on receive data. 0 = even; 1 = odd. |
| 0 | PARFIXED | Determines whether walking parity or fixed parity is generated and Checked on the serial interface. 0 = walking; 1 = fixed. |

Long Frame Size Register (0x000C)

Figure 33:
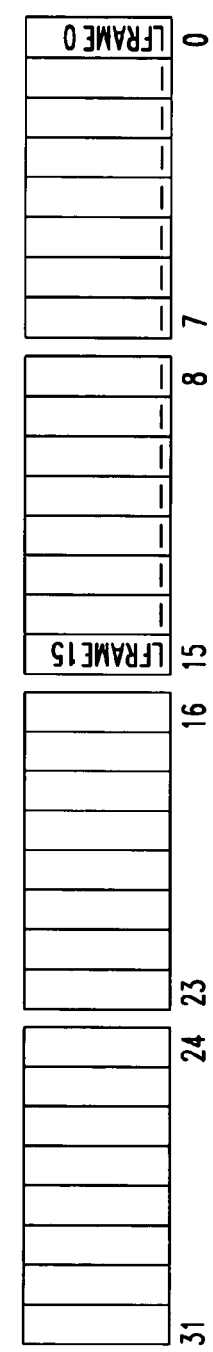
FIG. 33 is a bit field diagram of a Long Frame Size Register in the HDLC formatter of FIG. 1.

Any frames received (including CRC) that are larger than the size specified in this register are flagged as a Long Frame Detected in the message header. The register includes an LFRAME bit field, illustrated in FIG. 33, as follows:

| Bit | Identifier | Description |
| --- | --- | --- |
| 15–0 | LFRAME[15:0] | Size of the message frame including CRC for detecting a long frame. |

Sync Control Register (0x0010)

Figure 34:
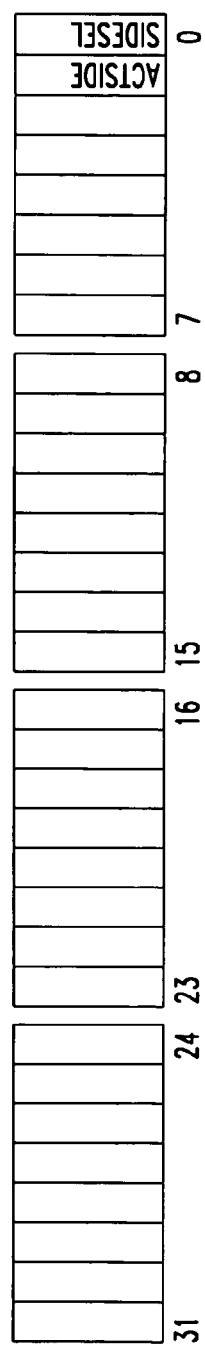
FIG. 34 is a bit field diagram of a Sync Control Register in the HDLC formatter of FIG. 1.

This register provides the link selection for synchronization. The register is not affected by reset (RSTN) or BIST. Refer to the section titled "Synchronization" for further details. It includes ACTSIDE and SIDESEL bits, illustrated in FIG. 34, as follows:

| Bit | Identifier | Description |
| --- | --- | --- |
| 1 | ACTSIDE | Identifies which link is active (Read only). 0 = link 1; 1 = link 2. |
| 0 | SIDESEL | Selects the link for deriving the PLL support signals. 0 = link 1; 1 = link 2. Link 0 cannot be selected. |

Sync Offset Register (0x0014)

This register determines the offset from the skew adjusted link sync pulse to the system (and transmit) output sync pulse. Initialization of the register by software is necessary for the serial links to properly transmit and receive data. This register is not affected by reset (RSTN). It includes MSYOFF and SYOFF bit fields, illustrated in FIG. 35, as follows:

| Bit | Identifier | Description |
| --- | --- | --- |
| 27–16 | MSYOFF[11:0] | Mirrored offset value in link clock cycles (32 MHz). This field is for flexibility in future applications. |
| 11–0 | SYOFF[11:0] | Offset value in link clock cycles (32 MHz). |

RCV Data—Sync Position Register (0x0018)

This register identifies which timeslot/bit of the receive data is positioned over the receive sync pulse. Initialization of the register by software is necessary for the serial links to properly receive data. It includes RCVTS and RCVBIT bit fields, illustrated in FIG. 36, as follows:

| Bit | Identifier | Description |
| --- | --- | --- |
| 11–4 | RCVTS[7:0] | Receive timeslot number positioned over the sync pulse. |
| 3–0 | RCVBLT[3:0] | Receive bit number positioned over the sync pulse. |

TX Data—Sync Position Register (0x001C)

This register identifies which timeslot/bit of the transmit data is positioned over the transmit sync pulse. Initialization of the register by software is necessary for the serial links to properly transmit data. It includes TXTS and TXBIT bit fields, illustrated in FIG. 37, as follows:

| Bit | Identifier | Description |
| --- | --- | --- |
| 11–4 | TXTS[7:0] | Transmit timeslot number positioned over the sync pulse. |

-continued

| Bit | Identifier | Description |
| --- | --- | --- |
| 3–0 | TXBIT[3:0] | Transmit bit number positioned over the sync pulse. |

TX FIFO Start Address Register (0x0020)

This register specifies the start address for the TX FIFO 34 in the DRAM 8. It includes a TFF_ST bit field, illustrated in FIG. 38, and shown below. The lowest order 5 bits are forced to 0 by the HDLC formatter 2 to enforce 32-byte alignment of the TX FIFO 34.

| Bit | Identifier | Description |
| --- | --- | --- |
| 31–5 | TFF_ST[31:5] | Starting address for the TX FIFO in DRAM. |
| 4–0 | TFF_ST[4:0] | Always 0 - all addresses must be on 32-byte boundary. |

TX FIFO Size Register (0x0024)

This register specifies the size of the TX FIFO 34 (in bytes). The TX FIFO start address plus the size provides the TX FIFO end address. The register includes a TFF_SZE bit field, illustrated in FIG. 39, and shown below. The lowest order 5 bits are forced to 0 by the HDLC formatter 2 to enforce 32-byte alignment of the TX FIFO 34. The TX FIFO size is equal to (TFF_SZE[17:0]+0x20). The address of the last TX FIFO entry is equal to (TFF_ST[31:0]+TFF_SZE[17:0]+0x 1C).

| Bit | Identifier | Description |
| --- | --- | --- |
| 17–5 | TFF_SZE[17:5] | Size of the TX FIFO in DRAM. FIFO size = TFF_SZE[17:0] + 0x20. |
| 4–0 | TFF_SZE[4:0] | Always 0 - FIFO size must be a multiple of 32 bytes. |

RCV FIFO Start Address Register (0x0028)

Figure 40:
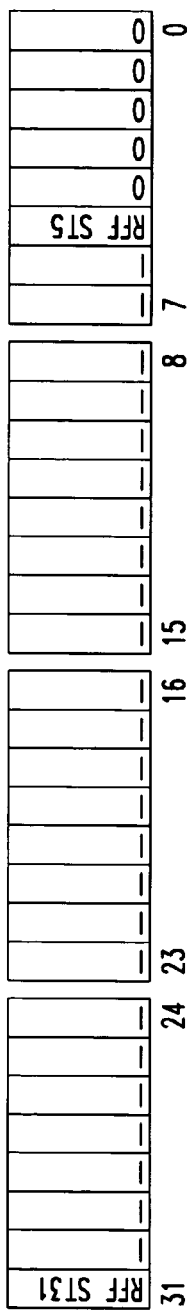
FIG. 40 is a bit field diagram of a RVC FIFO Start Address Register in the HDLC formatter of FIG. 1.

This register specifies the start address for the RCV FIFO 36 in the DRAM 8. It includes a RFF_ST bit field, illustrated in FIG. 40, and shown below. The lowest order 5 bits are forced to 0 by the HDLC formatter 2 to enforce 32 byte alignment of the RCV FIFO.

| Bit | Identifier | Description |
| --- | --- | --- |
| 31–5 | RFF_ST[31:5] | Starting address for the RCV FIFO in DRAM. |
| 4–0 | RFF_ST[4:0] | Always 0 - all addresses must be on 32-byte boundary. |

RCV FIFO Size Register (0x002C)

Figure 41:
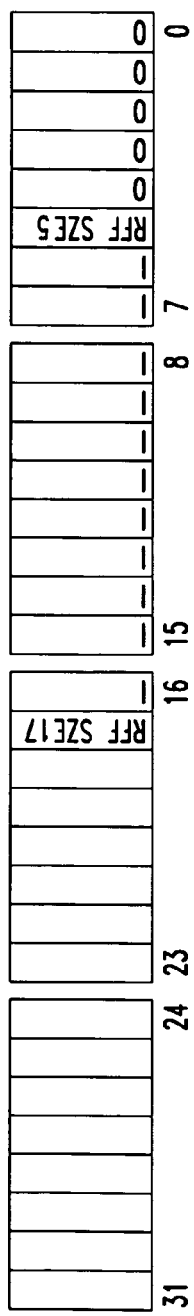
FIG. 41 is a bit field diagram of a RCV FIFO Size Register in the HDLC formatter of FIG. 1.

This register specifies the size of the RCV FIFO 36 (in bytes). The RCV FIFO start address plus the size provides the RCV FIFO end address. This register includes an RFF_SZE bit field, illustrated in FIG. 41, and shown below. The lowest order 5 bits are forced to 0 by the HDLC formatter 2 to enforce 32-byte alignment of the RCV FIFO 36. The RCV FIFO size is equal to (RFF_SZE[17:0]+0x20). The address of the last FIFO entry is equal to (RFF_ST[31:0]+RFF_SZE[17:0]+0x1C).

| Bit | Identifier | Description |
| --- | --- | --- |
| 17–5 | RFF_SZE[17:5] | Size of the RCV FIFO in DRAM. FIFO size = RFF_SZE[17:0] + 0x20. |
| 4–0 | RFF_SZE[4:0] | Always 0 - FIFO size must be a multiple of 32 bytes. |

Processor FIFO Pointers Register (0x0030)

Figure 42:
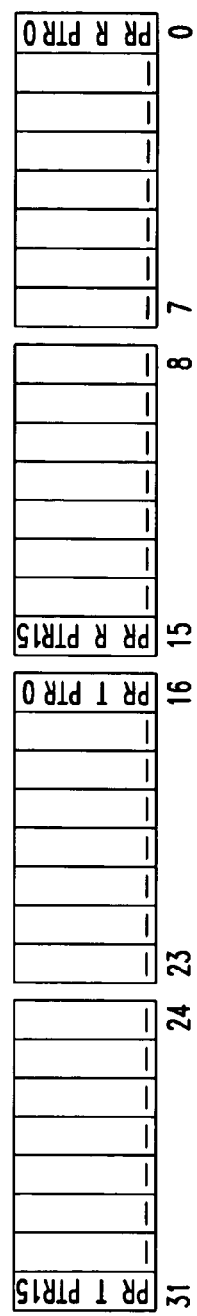
FIG. 42 is a bit field diagram of a Processor FIFO Pointers Register in the HDLC formatter of FIG. 1.

This register is written by the processor 10 with FIFO pointer information. It includes PR_T_PTR 74 and PR_R_PTR 68 bit fields, illustrated in FIG. 42, and shown below. As previously described, the PR_T_PTR bits 74 hold the processor-controlled pointer to the TX FIFO 34 in the DRAM 8. The value in this register is a long word offset to the TX FIFO Start Address. The data in the TX FIFO 34 that this register points to is the last queued message available to the HDLC formatter 2 for transmitting. A TX FIFO Range error bit is set in the Error Source Register if the value written by the processor is greater than the value in the TX FIFO Size register.

As also previously described, the PR_R_PTR bits 68 hold the processor-controlled pointer to the RCV FIFO 36 in the DRAM 8. The value in this register is a long word offset to the RCV FIFO Start Address. The data in the RCV FIFO 36 that this register points to is the last available message buffer pointer available to the HDLC formatter 2 for receive messages. A RCV FIFO Range error bit is set in the Error Source Register if the value written by the processor is greater than the value in the RCV FIFO Size register.

The TX FIFO 34 is empty when the HDLC formatter TX FIFO index pointer FR_T_PTR 72 equals the processor TX FIFO index pointer PR_T_PTR 74, and the RCV FIFO 36 is empty when the HDLC formatter RCV FIFO index pointer FR_R_PTR 70 equals the processor RCV FIFO index pointer PR_R_PTR 68. Each pointer should be initialized on reset to the last location of the corresponding FIFO.

| Bit | Identifier | Description |
| --- | --- | --- |
| 31–16 | PR_T_PTR[15:0] | Processor TX FIFO pointer offset. Address = (PR_T_PTR * 4) + TFF_ST. |
| 15–0 | PR_R_PTR[15:0] | Processor RCV FIFO pointer offset. Address = (PR_R_PTR * 4) + RFF_ST. |

HDLC Formatter FIFO Pointers Register (0x0034)

Figure 43:
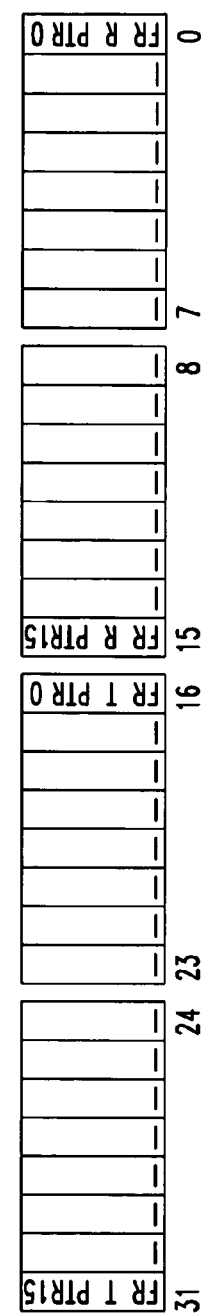
FIG. 43 is a bit field diagram of an HDLC formatter FIFO Pointers Register in the HDLC formatter of FIG. 1.

This register is written by the HDLC formatter 2 with FIFO pointer information. It includes the FR_T_PTR 72 and FR_R_PTR 70 bit fields, illustrated in FIG. 43, and shown below. As previously described, the FR_T_PTR bits 72 hold the HDLC formatter-controlled pointer to the TX FIFO 34 in the DRAM 8. The value in this register is a long word offset to the TX FIFO Start Address. The data in the TX FIFO 34 that this register points to is the last message retrieved by the HDLC formatter 2 for transmitting.

As also previously described, the FR_R_PTR bits 70 hold the HDLC formatter-controlled pointer to the RCV FIFO 36 in the DRAM 8. The value in this register is a long word offset to the RCV FIFO Start Address. The data in the FIFO that this register points to is the last received message.

The TX FIFO 34 is empty when the HDLC formatter TX FIFO index pointer FR_T_PTR 72 equals the processor TX FIFO index pointer PR_T_PTR 74, and the RCV FIFO 36 is empty when the HDLC formatter RCV FIFO index pointer FR_R_PTR 72 equals the processor RCV FIFO index pointer PR_R_PTR 68. Each pointer should be initialized on reset to the last location of the corresponding FIFO.

| Bit | Identifier | Description |
| --- | --- | --- |
| 31–16 | FR_T_PTR[15:0] | HDLC formatter TX FIFO pointer offset. Address = (FR_T_PTR * 4) + TFF_ST. |
| 15–0 | FR_R_PTR[15:0] | HDLC formatter RCV FIFO pointer offset. Address = (FR_R_PTR * 4) + RFF_ST. |

Message Buffer Base Address Register (0x0038)

Figure 44:
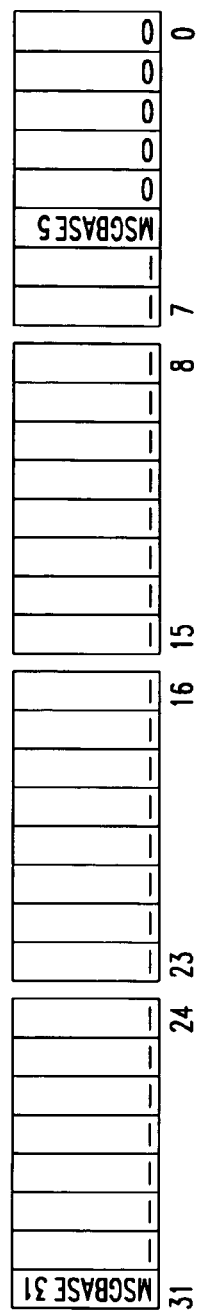
FIG. 44 is a bit field diagram of a Message Buffer Base Address Register in the HDLC formatter of FIG. 1.

This register holds the base address for the message buffers. No messages will be written or read to/from the DRAM 8 below this address. This register includes an MSGBASE bit field, illustrated in FIG. 44, and shown below. The lowest order 5 bits are forced to 0 by the HDLC formatter 2 to maintain 32-byte alignment of messages.

| Bit | Identifier | Description |
| --- | --- | --- |
| 31–5 | MSGBASE[31:5] | Message base address. |
| 4–0 | MSGBASE[4:0] | Always 0 - all addresses must be on 32-byte boundary |

Message Buffer Address Limit Register (0x003C)

Figure 45:
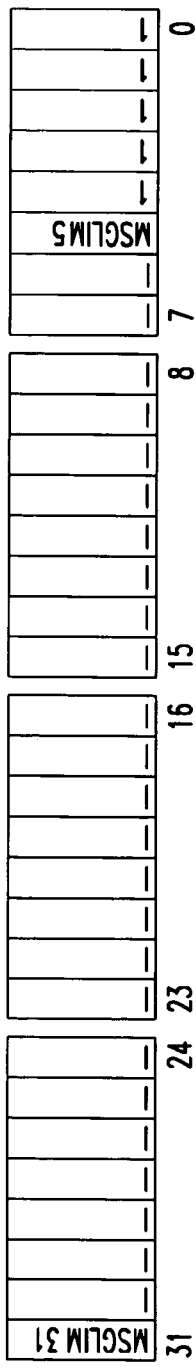
FIG. 45 is a bit field diagram of a Message Buffer Address Limit Register in the HDLC formatter of FIG. 1.

This register holds the upper address limit for message buffers. No messages will be written or read to/from the DRAM 8 above this address. The register includes several bit fields, illustrated in FIG. 45, and shown below. The lowest order 5 bits are forced to one (1) by the HDLC formatter 2 to maintain 32-byte alignment of messages.

| Bit | Identifier | Description |
| --- | --- | --- |
| 31–5 | MSGLIM[31:5] | Highest address allowable for writing message. |
| 4–0 | MSGLIM[4:0] | Always 1 - all addresses must be on 32-byte boundary. |

High Priority Transmit Message Register (0x0040)

This register holds a transmit message buffer address. It includes HPMSG, HPMSGOOR and HPMSGDN bit fields, illustrated in FIG. 46, and shown below. If the register is written, the message pointed to by the address will be transferred to the SRAM 20 before the next FIFO transmit message. This allows software to bypass the entries in the TX FIFO 34. This register will also provide a way to transmit a single message when the TX FIFO 34 is "frozen" due to SRAM usage surpassing the danger level. Bit 0 will act as a handshaking bit to inform the processor when the message buffer has been emptied. Once the transfer has been completed, the HPMSGDN bit will be set, and the HPM-DONE bit in the Error Source Register will be set. Bit 1 will act as an out-of-range indicator for the message address. If the address is outside of the range bounded by the Message Buffer Base Address Register and the Message Buffer Address Limit Register, this bit and the TMSGOOR bit in the Error Source Register will be set at the same time the HPMSGDN bit is set. If out of range, the message will not be transmitted.

| Bit | Identifier | Description |
|---|---|---|
| 31–5 | HPMSG[31:5] | Message base address. |
| 4–2 | HPMSG[4:1] | Always 0 - all addresses must be on 32-byte boundary. Bit 0 of The address will also be fixed at the value of 0. |
| 1 | HPMSGOOR | If the High Priority Message Base Address is out of range, this bit and the TMSGOOR bit in the ESR will be set. The value of this bit will not affect the message base address. |
| 0 | HPMSGDN | When this register is written, this bit will be set by hardware to 0 Indicating the message transfer has not completed. When the Transfer has completed, this bit will be set to 1. The value of this bit will not affect the message base address. |

Message Buffer Size Register (0x0044)

Figure 47:
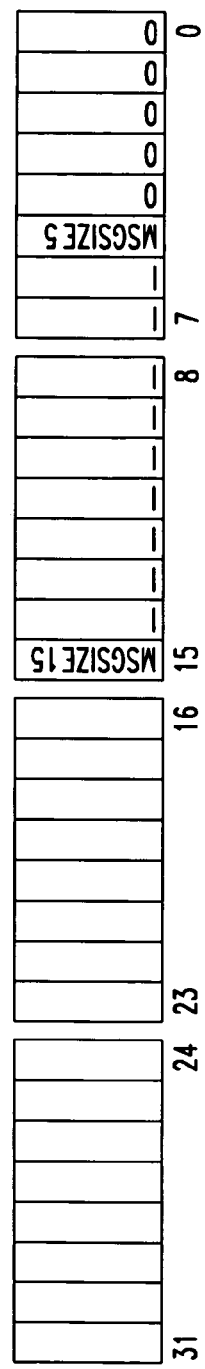
FIG. 47 is a bit field diagram of a Message Buffer Size Register in the HDLC formatter of FIG. 1.

This register specifies the message buffer size in the DRAM 8. This size affects all RCV and TX message buffers and should not be changed during normal operation. The register includes a MSGSIZE bit field, illustrated in FIG. 47, as follows:

| Bit | Identifier | Description |
|---|---|---|
| 15–5 | MSGSIZE[15:5] | Message buffer size. Programmable in 32-byte increments from 32 bytes to 64K bytes. Buffer size = MSGSIZE[15:0] + 0x20. |
| 4–0 | MSGSIZE[4:0] | Always 0 - buffer size must be in multiples of 32 bytes. |

Receive Message Queue Size Register (0x0048)

Figure 48:
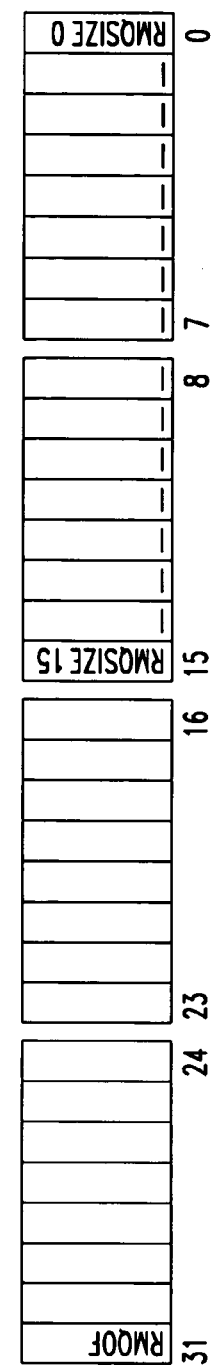
FIG. 48 is a bit field diagram of a Receive Message Queue Size Register in the HDLC formatter of FIG. 1.

This read-only register contains a count equal to the number of receive messages queued up to be transferred to the DRAM 8. It includes RMQOF and RMQSIZE bit fields, illustrated in FIG. 48, as follows:

| Bit | Identifier | Description |
|---|---|---|
| 31 | RMQOF | Indicates an overflow condition for the RMQSIZE field. |
| 15–0 | RMOSIZE[15:0] | Indicates the number of received messages queued up in SRAM to be DMA-transferred to DRAM. |

Miscellaneous Output Control Register (0x004C)

Figure 49:
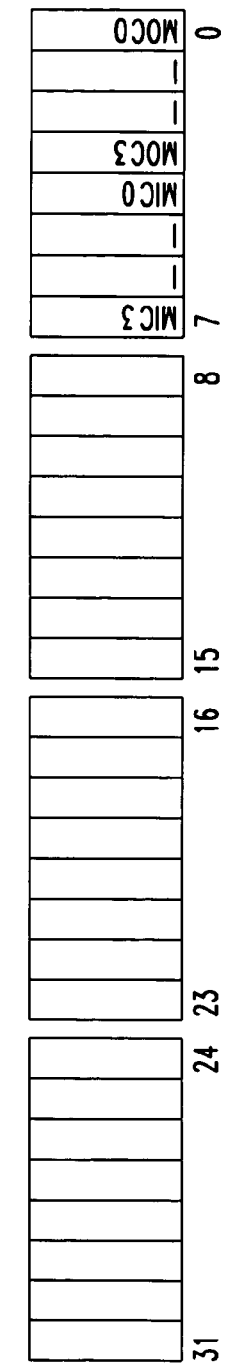
FIG. 49 is a bit field diagram of a Miscellaneous Output Control Register in the HDLC formatter of FIG. 1.

The value written to this register is directly driven on the MOC[3:0] output pins. These output pins are available to control board level functions. This register is not affected by reset (RSTN), BIST, or boundary scan. It includes MIC and MOC bit fields, illustrated in FIG. 49, as follows:

| Bit | Identifier | Description |
|---|---|---|
| 7–4 | MIC[3:0] | Read only. This field contains the value of the MIC[3:0] input pins. |
| 3–0 | MOC[3:0] | The value to be driven on the MOC[3:0] output pins. |

SRAM Address and Control Register (0x0050)

This register provides indirect access to the SRAM 8. The address to be accessed is written to this register along with control data to start the access. Data for write operations should be written to the SRAM Data Register first. The register includes SRAMCTL, SRAMRW and SRAMADD bit fields, illustrated in FIG. 50, as follows:

| Bit | Identifier | Description |
|---|---|---|
| 22 | SRAMCTL | Writing a 1 to this bit starts the access. When the access has been completed, the HDLC formatter resets this bit back to a 0. |
| 21 | SRAMRW | Read/write control. 0 = write; 1 = read. |
| 20–0 | SRAMADD[20:0] | SRAM address. |

SRAM Data Register (0x0054)

This register provides indirect access to the SRAM 20. For a write operation, the processor puts the SRAM write data into this register before writing to the SRAM Address and Control Register. For a read operation, the HDLC formatter 2 places the read data into this register before clearing the SRAMCTL bit in the SRAM Address and Control Register. The register includes an SRAMDAT bit field, illustrated in FIG. 51, as follows:

| Bit | Identifier | Description |
|---|---|---|
| 15–0 | SRAMDAT[15:01] | SRAM data |

TS Mux Override Register (0x0058)

If the value in the Timeslot Mux RAM 42 specifies that this override register should be used, the value in the register is used to determine the link selected. This allows software to switch links on multiple timeslots with a single write to this register. The register includes an ORLINK bit field, illustrated in FIG. 52, as follows:

| Bit | Identifier | Description |
|---|---|---|
| 1–0 | ORLINK[1:0] | Specifies the link to be selected in the timeslot mux: 0 = link 0; 1 = link 1; 2 = link 2; 3 = undefined. |

Error Source Register (0x005(C)

This register summarizes all of the detected errors. An error condition sets the appropriate bit in the register. Processor writes to his register either set or clear selected bits based on the set/clear bit. If any unmasked bits are set in this register, the INTN signal and the PCIINTA signal are pulled low. Writing bits to a 1 will not cause the error to be forced. This register includes several defined bit fields, illustrated in FIG. 53, as follows:

| Bit | Identifier | Description |
|---|---|---|
| 31 | SETCLR | If written to a 1, all other bits written with a 1 will be set. If written to a 0, all other bits written with a 1 will be cleared. |
| 30 | ILLACCES | Indicates that an illegal access of the HDLC |

-continued

| Bit | Identifier | Description |
|---|---|---|
| | | formatter was performed. This bit is set if any of the following accesses are attempted: A misaligned access is performed, i.e. the two least significant bits of the address are not both 0 or if an access other than a long word is performed, i.e., the four Byte Enable bits are not all 0 (this does not apply to PCI Configuration registers). An access of an unused memory space address is performed (this does not apply to PCI Configuration space). A write to a key protected register with the key disabled. A write to a read-only register (this does not apply to PCI Configuration Registers). |
| 29 | PARERR | Indicates that a parity error was detected on the PCI bus. This bit is set to 1 when the DETPERR bit of the PCI Status Register is set or written to 1. However clearing the DETPERR bit in the PCI Status register does not clear this bit. Both registers must be cleared. |
| 28 | SYSERR | Indicates that the HDLC formatter asserted SERR# on the PCI bus. This bit is set to 1 when the SSYSERR bit of the PCI Status Register is set or written to 1. However clearing the SSYSERR bit in the PCI Status register does not clear this bit. Both registers must be cleared. |
| 27 | RXMSTAB | Indicates that the HDLC formatter initiator terminated its transaction with Master Abort. This bit is set to 1 when the RCVMSTAB bit of the PCI Status Register is set or written to 1. However clearing the RCVMSTAB bit in the PCI Status register does not clear this bit. Both registers must be cleared. |
| 26 | RXTARAB | Indicates that the HDLC formatter initiator had its transaction terminated with Target Abort. This bit is set to 1 when the RCVTARAB bit of the PCI Status Register is set or written to 1. However, clearing the RCVTARAB bit in the PCI Status register does not clear this bit. Both registers must be cleared. |
| 25 | TARAB | Indicates that the HDLC formatter terminated its transaction with Target Abort. This bit is set to 1 when the SIGTARAB bit of the PCI Status Register is set or written to 1. However, clearing the SIGTARAB bit in the PCI Status register does not clear this bit. Both registers must be cleared. |
| 24 | DATPARER | Indicates that the HDLC formatter asserted PERR# or observed PERR# asserted on the PCI bus and acted as the initiator for the operation in which the error occurred as long as bit 6 of the PCI Command register is set. This bit is set to 1 when the DPERRDET bit of the PCI Status Register is set or written to 1. However, clearing the DPERRDET bit in the PCI Status register does not clear this bit. Both registers must be cleared. |
| 23 | SRAMACC | Indicates a PCI access to SRAM was attempted before the previous cycle to SRAM had completed. |
| 22 | SCRUBHIT | Indicates a block was recovered from scrub. |
| 21 | SRAMDNGR | Indicates the SRAM usage hit the danger level specified in the SRAM Danger Register. |
| 20 | CRCERR | Indicates that the CRC Error Threshold was reached within a 10 msec window. A counter keeps track of CRC errors across all channels. When the counter reaches the CRC Error Threshold Register value, this bit is set. |
| 19 | LONGERR | Indicates that the Long Frame Threshold was reached within a 10 msec window. A counter keeps track of long frame errors across all channels. When the counter reaches the Long Frame Threshold Register value, this bit is set. |
| 18 | SHORTERR | Indicates that the Short Frame Threshold was reached within a 10 msec window. A counter keeps track of short frame errors across all channels. When the counter reaches the Short Frame Threshold Register value, this bit is set. |

-continued

| Bit | Identifier | Description |
|---|---|---|
| 17 | RMSGOOR | Receive message pointer is out of the DRAM message buffer range. |
| 16 | TMSGOOR | Transmit message pointer or High Priority Transmit Message Pointer is out of the DRAM message buffer range. |
| 15 | RCVCCOF | Indicates the RCV Channel Cache overflowed. |
| 14 | SSYNCERR | Indicates an error in the SYSSYNC signal. |
| 13 | RFFPNTR | Indicates that the RCV FIFO pointer written by the processor is outside of the RCV FIFO address range. |
| 12 | TFFPNTR | Indicates that the TX FIFO pointer written by the processor is outside of the TX FIFO address range. |
| 11 | TXCCLOSS | Indicates data was not available in time for transmitting from the TX linked list controller. The channel in error will be put into the TX Channel Cache Loss Register. |
| 10 | LLERR | Indicates a linked list error. The Channel Linked List Error Register will hold the channel number that caused the last error (RCV or TX), as an indication of the source of the error. |
| 9 | RBUFLOSS | Indicates a received message was available for DMA but no message buffers were available. The message will not be lost until the SRAM overflows. |
| 8 | SRAMOF | Indicates the system has run out of external SRAM buffers. This bit will be set even if the 2K bytes of reserved storage for high priority TX messages has not been used. |
| 7 | SRAMPAR | SRAM data parity error detected. |
| 6 | HPMDONE | Indicates the transfer of the high priority transmit message to SRAM has been completed. |
| 5 | SYNCERR2 | Indicates a sync error or loss of clock detected on link 2. |
| 4 | SYNCERR1 | Indicates a sync error or loss of clock detected on link 1. |
| 3 | SYNCERR0 | Indicates a sync error or loss of clock detected on link 0. |
| 2 | SLPAR2 | Indicates a parity error detected on link 2 receive data. |
| 1 | SLPAR1 | Indicates a parity error detected on link 1 receive data. |
| 0 | SLPAR0 | Indicates a parity error detected on link 0 receive data. |

ESR Mask Register (0x0060)

This register provides the post-register mask for the Error Source Register. It includes an EMR bit field, illustrated in FIG. 54, and shown below. A one (1) indicates the error is masked at the output of the ESR Register bit.

| Bit | Identifier | Description |
|---|---|---|
| 31 | RESERVED | |
| 30–0 | EMR[30:0] | HESR mask bits. 0 = unmasked; 1 = masked. |

Short Frame Threshold Register (0x0064)

This register indicates how many short frame errors are needed within a IO msec window to set the corresponding ESR bit. A short frame is defined as any frame less than 4 bytes including the 2 CRC bytes. The register includes a SHORTTHR bit field, illustrated in FIG. 55, as follows:

| Bit | Identifier | Description |
|---|---|---|
| 15–0 | SHORTTHR[15:0] | The number of short frame errors within a 10 |

-continued

| Bit | Identifier | Description |
|---|---|---|
| | | msec window that will trigger an interrupt. |

Long Frame Threshold Register (0x0068)

This register indicates how many long frame errors are needed within a 10 msec window to set the corresponding ESR bit. It includes a LONGTHR bit field, illustrated in FIG. 56, as follows:

| Bit | Identifier | Description |
|---|---|---|
| 15–0 | LONGTHR[15:0] | The number of long frame errors within a 10 msec window that will trigger an interrupt. |

CRC Error Threshold Register (0x006C)

This register indicates how many CRC errors are needed within a IO msec window to set the corresponding ESR bit. It includes a CRCTHR bit field, illustrated in FIG. 57, as follows:

| Bit | Identifier | Description |
|---|---|---|
| 15–0 | CRCTHR[15:0] | The number of CRC errors within a 10 msec window that will trigger an interrupt. |

Channel Linked List Error Register (0x0070)

This register saves the channel number when a linked list error occurs. It includes several defined bit fields, illustrated in FIG. 58, and shown below. When any of these bit fields are set, the LLERR bit in the Error Source Register will be set to indicate an error occurred.

| Bit | Identifier | Description |
|---|---|---|
| 11 | FRLLERR | Indicates a problem with the free linked list. This is a catastrophic error that may require initialization of the device. Once set, this bit can only be cleared by software. |
| 10 | RECLLERR | Indicates a problem with the recovery linked list. The CHLLERR field will indicate the channel affected. All blocks on the recovery linked list will be abandoned, but this will not affect any active channel messages. Once set, this bit can only be cleared by software. |
| 9 | RMQLLERR | Indicates a problem with the RCV PCI message linked list resulting in all RCV queued messages thrown away. The CHLLERR field will indicate the channel associated with the problem messages, but all queued messages will be abandoned. Once set, this bit can only be cleared by software. |
| 8 | CHTMULT | Indicates more than one error has occurred since the LLERR bit was set in the ESR. |
| 7–0 | CHLLERR[7:0] | Last channel number to have a linked list error. If the LLERR bit is not set in the ESR register, this value is meaningless. If multiple errors occur, this field will contain information for the last error only. A channel linked list error affects all stored messages associated with the channel. |

Channel Cache Loss Register (0x0074)

This register saves the channel number when the Transmit Channel Cache does not have valid data when needed. It includes CCLMULT and CHCL bit fields, illustrated in FIG. 59, and shown below. When any of these bits are set, the TXCACHELOSS bit in the Error Source Register will be set to indicate an error occurred.

| Bit | Identifier | Description |
|---|---|---|
| 8 | CCLMULT | Indicates more than one error has occurred since the TXCACHELOSS bit was set in the ESR. |
| 7–0 | CHCL[7:0] | Last channel number to have a channel cache underrun error. If the corresponding bit is not set in the ESR register, this value is meaningless. |

SRAM Usage Level Register (0x0078)

This register identifies how much of the SRAM 20 is and has been used for linked list structures. The register includes SRAMHW and SRAMCUR bit fields, illustrated in FIG. 60 as follows:

| Bit | Identifier | Description |
|---|---|---|
| 31–16 | SRAMHW[15:0] | SRAM High Water Mark. Indicates the maximum amount of 64 byte blocks that have been in use since this register was cleared. This field is cleared by writing to a 0. Once cleared, the field will immediately load the value in the SRAMCUR field. |
| 15–0 | SRAMCUR[15:0] | The current SRAM usage value in 64 byte blocks. This value will include 2 blocks prefetched for the TSLLC and the TPLLC controllers. Therefore, in an idle device, the SRAMCUR field may have a value of 2. This field is read only. |

SRAM Danger Level Register (0x007C)

This register identifies how much of the SRAM 20 can be used before an SRAM Danger bit is set in the Error Source Register. When this SRAM usage level is hit, the TX DMA transfers will halt until the usage drops. The register includes an SDANGER bit field, illustrated in FIG. 61, as follows:

| Bit | Identifier | Description |
|---|---|---|
| 15–0 | SDANGER[15:0] | The SRAM usage level in 64 byte blocks necessary to trigger an SRAM Danger event. |

RCV Channel Cache Usage Register (0x0080)

This register identifies how much of the RCV Channel Cache 52 is and has been used for message data. It includes RCVCCHW and RCVCCCUR bit fields, illustrated in FIG. 62, and shown below. Writing this register with the value "0" will reset the RCVCCHW high water mark.

| Bit | Identifier | Description |
|---|---|---|
| 24–16 | RCVCCHW[8:0] | RCV Channel Cache High Water Mark. The maximum amount of FIFO locations that have been in use since this register was cleared. This field can be cleared by writing the register to '0'. |

-continued

| Bit | Identifier | Description |
|---|---|---|
| | | (Writing this field to a non-'0' value requires a write to register bits 8–0. The RCVCCCUR field will be unaffected by this action.) |
| 8–0 | RCVCCCUR[8:0] | The current RCV FIFO usage value in locations. Read only. |

Scrub Time Register (0x0084)

This register identifies how long the HDLC formatter 2 should wait between scrub routines. It includes the BIGTIME and MEDTIME bit fields, illustrated in FIG. 63, as follows:

| Bit | Identifier | Description |
|---|---|---|
| 31–16 | BIGTIME[15:0] | The time between starting Scrub functions in 100 msec intervals. This time is equal to (BIGTIME + 1) * 100 msec. |
| 15–0 | MEDTIME[15:0] | The time between Scrub initialization and the Scrub block recovery function. This time is equal to (MEDTIME + 1) * 100 msec. |

Scrub Count Register (0x0088)

This register identifies how many 64 byte blocks have been recovered from scrub since this register was cleared. Software may use this register as it sees fit. The register includes a SCRUBCNT bit field, illustrated in FIG. 64, as follows:

| Bit | Identifier | Description |
|---|---|---|
| 15–0 | SCRUBCNT[15:0] | The number of 64 byte blocks that have been recovered from scrub since the register was cleared. This counter will not roll over when 0xffff has been reached. |

Scrub Information Register (0x008C)

Figure 65:
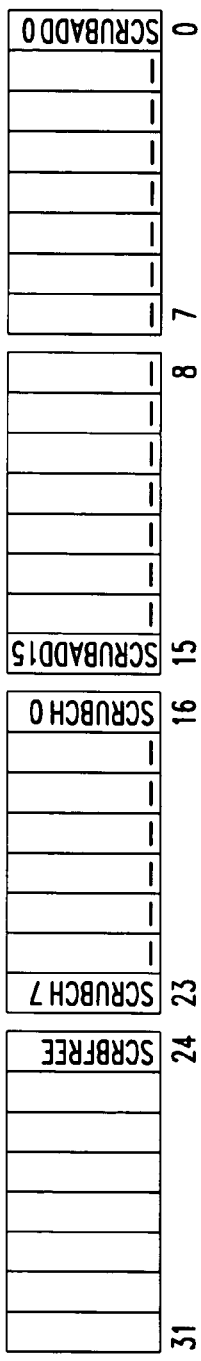
FIG. 65 is a bit field diagram of a Scrub Information Register in the HDLC formatter of FIG. 1.

This register contains information about the last scrub to aid in diagnostics. It includes the SCRBFREE, SCRUBCH and SCRUBADD bit fields, illustrated in FIG. 65, as follows:

| Bit | Identifier | Description |
|---|---|---|
| 24 | SCRBFREE | Indicates the scrubbed block was last identified as a free block. 0 = channel block; 1 = free list block. |
| 23–16 | SCRUBCH[7:0] | Channel number associated with the last scrub. |
| 15–0 | SCRUBADD[15:0] | Address pointer for the last block scrubbed. |

Signature Analysis Register (0x0090)

Figure 66:
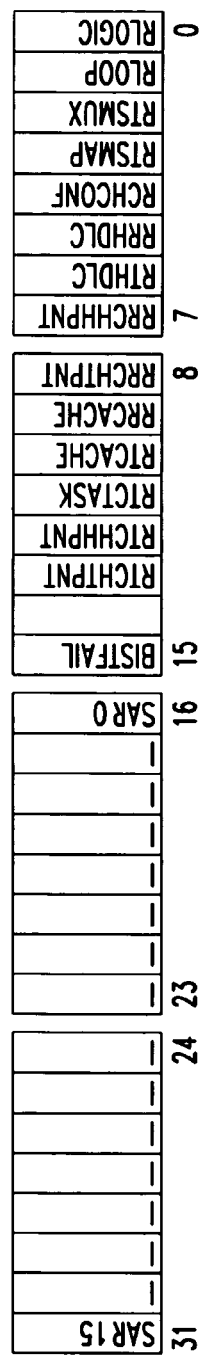
FIG. 66 is a bit field diagram of a Signature Analysis Register in the HDLC formatter of FIG. 1.

This register is used for holding the signature after BIST completes, and the results of individual BIST functions. The PCI BIST register in the PCI Configuration Space will indicate when BIST has completed. The register includes several defined bit fields, illustrated in FIG. 66, as follows:

| Bit | Identifier | Description |
|---|---|---|
| 31–16 | SAR[15:0] | The Signature Analysis Register. This field does not need to be initialized before running BIST. |
| 15 | BISTFAIL | A 1 forces the BIST flags to fail. |
| 14 | | |
| 13 | RTCHTPNT | A 1 indicates BIST passed for the TX Channel Tail Pointer RAM. |
| 12 | RTCHHPNT | A 1 indicates BIST passed for the TX Channel Head Pointer RAM. |
| 11 | RTCTASK | A 1 indicates BIST passed for the TX Channel Cache Task RAM. |
| 10 | RTCACHE | A 1 indicates BIST passed for the TX Channel Cache RAM. |
| 9 | RRCACHE | A 1 indicates BIST passed for the RCV Channel Cache RAM. |
| 8 | RRCHTPNT | A 1 indicates BIST passed for the RCV Channel Tail Pointer RAM. |
| 7 | RRCHHPNT | A 1 indicates BIST passed for the RCV Channel Head Pointer RAM. |
| 6 | RTHDLC | A 1 indicates BIST passed for the TX HDLC Status RAM. |
| 5 | RRHDLC | A 1 indicates BIST passed for the RCV HDLC Status RAM. |
| 4 | RCHCONF | A 1 indicates BIST passed for the Channel Configuration RAM. |
| 3 | RTSMAP | A 1 indicates BIST passed for the Timeslot to Channel Map RAM. |
| 2 | RTSMUX | A 1 indicates BIST passed for the Timeslot MUX RAM. |
| 1 | RLOOP | A 1 indicates BIST passed for the Loop RAM. |
| 0 | RLOGIC | A 1 indicates BIST passed for the random logic BIST. |

Physical Fault Insertion (PFI) Register (0x0094)

Figure 67:
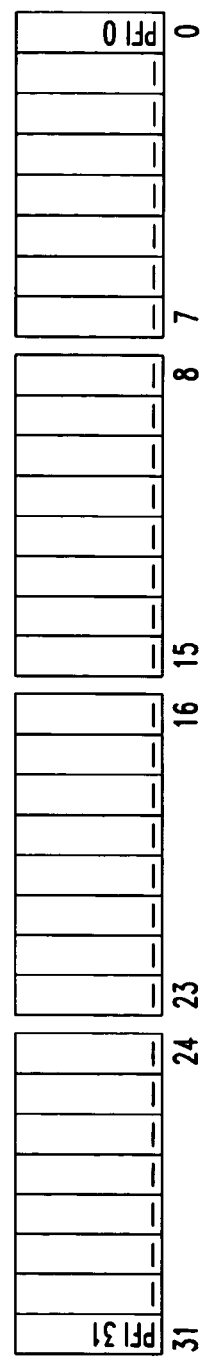
FIG. 67 is a bit field diagram of a Physical Fault Insertion Register in the HDLC formatter of FIG. 1.

This register is reset to all zeros (0's) when the PFIRST input signal is high. When PFIRST is low, this register can be written with fault data. Device reset (RSTN) will not affect this register or its operation. The register includes a number of PFI bits, illustrated in FIG. 67, and shown below. Operational characteristics include:

All faults will be activated 10 to 20 msec after setting a bit in the register.

All faults will be inactivated as soon as the register bit is cleared.

Transient faults will be activated for 10 msec and will clear the corresponding bit in the PFI register.

If bit 23 is set to a one (1), all PFI faults will be transient. If bit 23 is set to a zero (0), all PFI faults will be steady-state. This control bit must be set properly at the same time as the other bits.

All bits in the PFI register are active high; the external PFI[7:0] signals are active low (setting PFI_EXT[0] to a one (1) will cause PFI[0] to go to a zero (0).

| Bit Name | Description | Effect |
|---|---|---|
| 0 PFI_CK1_1 | Force CK1MO output to '1'. | PLL will free run causing synchronization errors through the skew compensators. |
| 1 PFI_MCK1_1 | Force MHCK1MO output to '1'. | PLL will free run causing synchronization errors through the skew compensators. |

-continued

| Bit | Name | Description | Effect |
|---|---|---|---|
| 2 | PFI_SYNC_1 | Force SYNCS output to '1'. | 125 usec system sync pulse to all HDLC formatters will not occur. This will cause an ESR event in the HDLC formatters to occur, but data will not be affected since counters will free run. |
| 3 | PFI_SYNC_0 | Force SYNCS output to '0'. | 125 usec system sync pulse to all HDLC formatters will always occur, causing serial interface parity, data, and sync errors. |
| 4 | PFI_SADR_1 | Force SRAM_ADR[1] output to '1'. | SRAM data will be written to wrong addresses causing linked list errors. |
| 5 | PFI_SWEN_1 | Force SRAM_WEN output to '1'. | Disables all SRAM data writes causing linked list errors. |
| 6 | PFI_SOEN_1 | Force SRAM_OEN output to '1'. | SRAM data read will be garbage; causing linked list errors. |
| 7 | PFI_SDAT_0 | Force SRAM DAT[0] output to '0'. | HDLC formatter will write bad data and bad parity to SRAM locations. |
| 8 | PFI_SDRV_1 | Force internal SRAM_DAT output enable. | All SRAM writes will occur with garbage data causing linked list errors. |
| 9 | PFI_PREQ_0 | Force PCIREQ output to '0'. | PCI bus requests will occur continuously. |
| 10 | PFI_INT_0 | Force PCIINTA and INTN outputs to '0' | Interrupts will occur continuously. |
| 11 | PFI_SERR_0 | Force a PCISERR error. | PCI system error will occur one time after this bit is activated. |
| 12 | PFI_SACK_0 | Force SRAM arbiter to never provide acknowledges to any internal circuit. | All linked list controllers will stop working. Transmit data will not be available and receive data will overflow the buffers. |
| 13 | PFI_LNK0_0 | Force TSDAT[0] and TXDAT[0] to '0'. | Serial transmit data for link 0 will contain bad data and panty. |
| 14 | PFI_LNK1_0 | Force TSDAT[1] and TXDAT[1] to '0'. | Serial transmit data for link 1 will contain bad data and parity. |
| 15 | PFI_LNK2_0 | Force TSDAT[2] and TXDAT[2] to '0'. | Serial transmit data for link 2 will contain bad data and parity. |
| 16 | PFI_LPAC_0 | Force TXDATS to a '0'. | Single-ended serial transmit data to the PACMAN will contain bad data and parity. |
| 17 | PFI_MDAT_0 | Force MHDATOUT_16 to a '0'. | Serial transmit data on the Message Handler Interface will contain bad data and parity. |
| 18 | PFI_BON_0 | Force all outputs to tristate. | Device will appear dead. |
| 19 | PFI_LCK0_0 | Force TXCLK[0] to '0'. | Serial clock for link 0 will be dead. |
| 20 | PFI_LCK1_0 | Force TXCLK[1] to '0'. | Serial clock for link 1 will be dead. |
| 21 | PFI_LCK2_0 | Force TXCLK[2] to '0'. | Serial clock for link 2 will be dead. |
| 22 | Unused | | |
| 23 | PFI_INTRM | Intermittent fault control. | If set to a '1', all faults will self clear 10 msec after firing. |
| 24–31 | PFI_EXT[7:0] | Force the corresponding PFI[7:0] output signal to the active value '0'. | Control of board level PFI functions. |

SRAM Size Register (0x0098)

Figure 68:
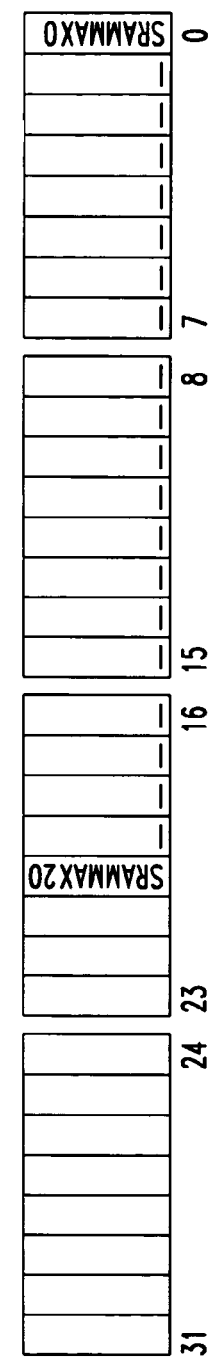
FIG. 68 is a bit field diagram of an SRAM Size Register in the HDLC formatter of FIG. 1.

This register indicates the SRAM size that was autodetected on power-up. Normally a read-only register, this register can be written to force a certain size to be recognized. Upon writing the register, the SRAM 20 will be re-initialized and the free linked list rebuilt. The STANDBY bit in the Master Control Register must be set before writing to this register. The register is key protected (through the KEY bit in the Master Configuration Register). The register includes an SRAMMAX bit field, illustrated in FIG. 68, as follows:

| Bit | Identifier | Description |
|---|---|---|
| 20–0 | SRAMMAX[20:0] | Address of the last word (16 bits) in SRAM. Bits 4-0 are forced to 1's by hardware. |

Diagnostic Register (0x009C)

Figure 69:
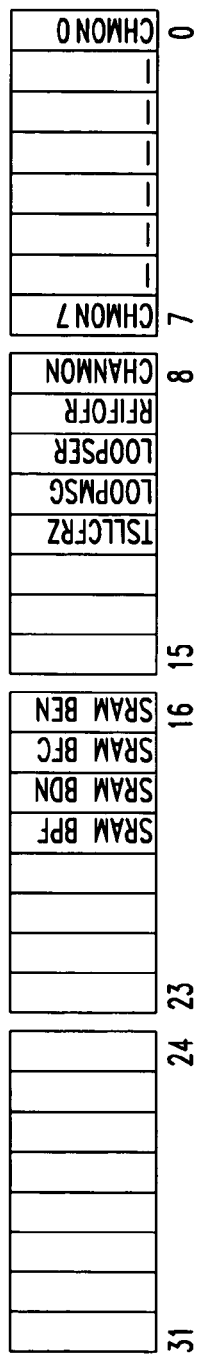
FIG. 69 is a bit field diagram of a Diagnostic Register in the HDLC formatter of FIG.

This register provides diagnostic functions for the HDLC formatter 2. This register is key protected (through the KEY bit in the Master Configuration Register). The register includes several defined bit fields, illustrated in FIG. 69, as follows:

| Bit | Identifier | Description |
|---|---|---|
| 19 | SRAM_BPF | Read-only; a 1 indicates the external SRAM BIST has passed. This bit is valid when SRAM_BDN is a 1. Setting SRAM_BFC to a 1 will also cause SRAM_BPF to be set to a 1. |
| 18 | SRAM_BDN | Read only; a 1 indicates the external SRAM BIST has completed. This bit is cleared by the HDLC formatter immediately after SRAM_BEN has been written to a 1. |
| 17 | SRAM_BFC | A 1 forces the SRAM_BPF to be set to a 0. |
| 16 | SRAM_BEN | A 1 enables BIST of the external SRAM. |
| 12 | TSLLCFRZ | Freeze the TX Serial Linked List Controller. Used for freezing a TX message in SRAM for hardware testing purposes only 0 = do not freeze; 1 = freeze. |
| 11 | LOOPMSG | Loop all received messages in SRAM to the transmit side without sending any data over the PCI bus. 0 = do not loop; 1 = loop. |

-continued

| Bit | Identifier | Description |
|---|---|---|
| 10 | LOOPSER | Loop the entire serial interface from transmit to receive. 0 = do not loop; 1 = loop. |
| 9 | RFIFOFR | Free run the RCV FIFO in DRAM. This bit is for hardware testing only 0 = do not free run; 1 = free run. |
| 8 | CHANMON | Enables the monitoring of receive and transmit channel data on the RCV_CHOUT and TX_CHOUT output pins. The data will not be inverted, regardless of the INVERT bit in the Channel Configuration RAM. |
| 7–0 | CHMON[7:0] | Channel number for monitoring. The channel identified is directed to an output pin along with a clock that is active only when channel data is active. This affects both the receive channel monitor output and the transmit channel monitor output. |

Error Force Register (0x00A0)

This register forces various errors for diagnostic purposes. The register is key protected (through the KEY bit in the Master Configuration Register). It includes several defined bit fields, illustrated in FIG. 70, as follows:

| Bit | Identifier | Description |
|---|---|---|
| 31–26 | Unused | |
| 25 | FTARAB | Set to 1 to force the HDLC formatter to signal a target abort on the PCI bus on a processor initiated cycle to the HDLC formatter. After setting this bit to 1, the subsequent PCI cycle must be performed to the HDLC formatter after waiting for a minimum delay of 17 PCI clock periods. This delay must be achieved via an external (not within the HDLC formatter) timer. This cycle will then be terminated by the HDLC formatter with target abort and the STOP signal on the PCI bus will be used to clear this register bit. |
| 24 | Unused | |
| 23 | FSRAMACC | Set to 1 to force a SRAMACC error. This will force the SRAMCTL bit in the SRAM Address and Control Register to be stuck at 1 indicating the previous access never completed. This will not affect the actual accesses to SRAM. |
| 22–16 | Unused | |
| 15 | FSYSSYNC | Set to 1 to force a loss of system sync. This will affect only the SYSSYNC input of the HDLC formatter. The SYSSYNC output will remain unaffected. This will mask out the input sync to simulate a lost sync. This may not affect the operation of the HDLC formatter since internal counters should roll over properly. (Note that if system sync errors are already occurring due to the SYSSYNC input being stuck low, turning on this bit will cause the errors to stop occurring.) |
| 14–13 | Unused | |
| 12 | FTXCCLOS | Set to 1 to force a TXCACHELOSS error. This will not affect the first word of a message to prevent missing the error between messages. For all other words, the TX Channel Cache will respond with inactive data. This will also result in the HDLC TX processor aborting the message. |
| 11–8 | Unused | |
| 7 | FSRAMPAR | Set to 1 to force a SRAMPAR error. This will affect only the SRAM parity checker, and won't actually insert bad parity into the SRAM. |
| 6 | | |

-continued

| Bit | Identifier | Description |
|---|---|---|
| 5 | FSYNCER2 | Set to 1 to force a loss of sync for link 2. This will mask out the input sync to simulate a lost sync. This will not affect the received data since internal counters should roll over properly. |
| 4 | FSYNCER1 | Set to 1 to force a loss of sync for link 1. This will mask out the input sync to simulate a lost sync. This will not affect the received data because since internal counters should roll over properly. |
| 3 | FSYNCER0 | Set to 1 to force a loss of sync for link 0. This will mask out the input sync to simulate a lost sync. This will not affect the received data because internal counters should roll over properly. |
| 2 | Unused | |
| 1 | FFRAMERR | Set to 1 to force a framing error on the input serial data channels. This will result in trashed receive messages. |
| 0 | FRCVOFF | Set to 1 to force a Receiver-Turned-Off HDLC error. This will not affect the first word of a message to prevent missing the error between messages. Except for the first word, all messages will be truncated as it the receiver had been turned off. This will result in trashed receive messages. |

Free List Head Pointer Register (0x00A4)

This register contains the head pointer to the free linked list. The register is entirely hardware controlled and is accessible for hardware testing only. It is key protected (through the KEY bit in the Master Configuration Register). Writing to this register will result in a catastrophic failure of the device requiring a device reset. The register includes the FRHEAD bit field, illustrated in FIG. 71, as follows:

| Bit | Identifier | Description |
|---|---|---|
| 15–0 | FRHEAD[15:0] | Free Linked List Head pointer. This field points to the first block in the free linked list. The address associated with this pointer is FRHEAD * 64. |

Free List Tail Pointer Register (0x00A8)

This register contains the tail pointer to the free linked list. The register is entirely hardware controlled and is accessible for hardware testing only. It is key protected (through the KEY bit in the Master Configuration Register). Writing to this register will result in a catastrophic failure of the device requiring a device reset. The register includes the FRTAIL bit field, illustrated in FIG. 72, as follows:

| Bit | Identifier | Description |
|---|---|---|
| 15–0 | FRTAIL[15:0] | Free Linked List Tail pointer. This field points to the last block in the free linked list. The address associated with this pointer is FRTAIL * 64. |

RCV Message Feed Head Pointer Register (0x00AC)

This register contains the head pointer to the RCV Message Feed linked list. The register is entirely hardware controlled and is accessible for hardware testing only. It is key protected (through the KEY bit in the Master Configuration Register). Writing to this register will result in a catastrophic failure of the device requiring a device reset. The register includes the RMPACT and RhhPHEAD bit fields, illustrated in FIG. 73, as follows:

| Bit | Identifier | Description |
| --- | --- | --- |
| 21 | RMPACT | RCV Message Feed Active. If 1 the RCV Message Feed head and tail pointers are valid. |
| 20–0 | RMPHEAD[20:0] | RCV Message Feed Linked List Head pointer. This field points to the current read address in the RCV Message Feed linked list. The address associated with this pointer is RMPHEAD * 2. |

RCV Message Feed Tail Pointer Register (0x00B0)

This register contains the tail pointer to the RCV Message Feed linked list. The register is entirely hardware controlled and is accessible for hardware testing only. It is key protected (through the KEY bit in the Master Configuration Register). Writing to this register will result in a catastrophic failure of the device requiring a device reset. The register includes the RMPHTMIL bit field, illustrated in FIG. 74, as follows:

| Bit | Identifier | Description |
| --- | --- | --- |
| 15–0 | RMPHTAIL[15:0] | RCV Message Feed Linked List Tail pointer. This field points to the last block in the RCV Message Feed linked list. The address associated with this pointer is RMPTAIL * 64. |

TX Message Feed Head Pointer Register (0x000B4)

Figure 75:
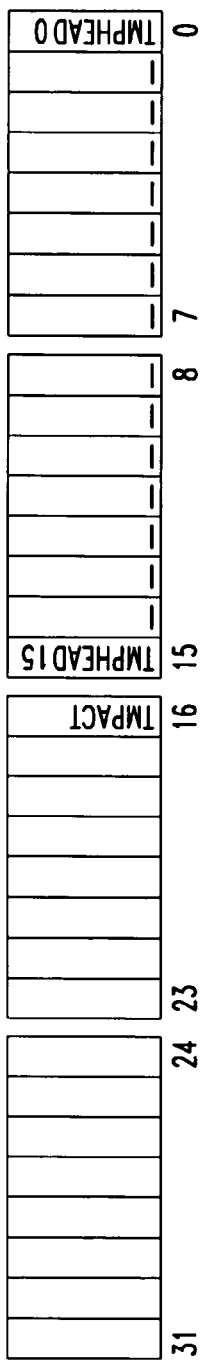
FIG. 75 is a bit field diagram of a TX Message Feed Head Pointer Register in the HDLC formatter of FIG. 1.

This register contains the head pointer to the TX Message Feed linked list. The register is entirely hardware controlled and is accessible for hardware testing only. It is key protected (through the KEY bit in the Master Configuration Register). Writing to this register will result in a catastrophic failure of the device requiring a device reset. The register includes the TMPACT and TMPHEAD bit fields, illustrated in FIG. 75, as follows:

| Bit | Identifier | Description |
| --- | --- | --- |
| 16 | TMPACT | TX Message Feed Active. If 1 the TX Message Feed head and tail pointers are valid. |
| 15–0 | TMPHEAD[15:0] | TX Message Feed Linked List Head pointer. This field points to the first block in the TX Message Feed linked list. The address associated with this pointer is TMPHEAD * 64. |

TX Message Feed Tail Pointer Register (0x00B8)

Figure 76:
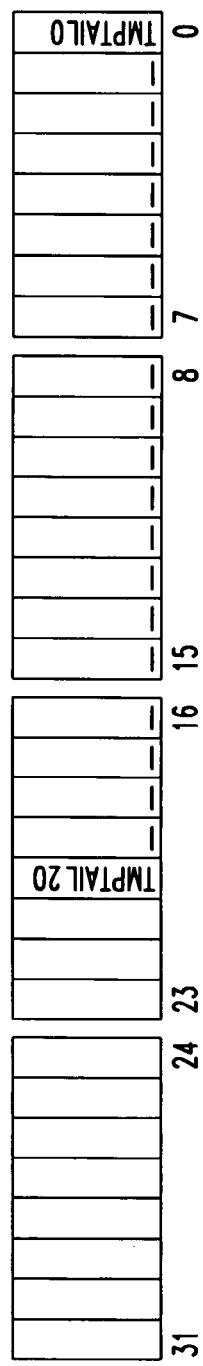
FIG. 76 is a bit field diagram of a TX Message Feed Tail Pointer Register in the HDLC formatter of FIG. 1.

This register contains the tail pointer to the TX Message Feed lined list. The register is entirely hardware controlled and is accessible for hardware testing only. It is key protected (through the KEY bit in the Master Configuration Register). Writing to this register will result in a catastrophic failure of the device requiring a device reset. The register includes the TMPTAIL bit field, illustrated in FIG. 76, as follows:

| Bit | Identifier | Description |
| --- | --- | --- |
| 20–0 | TMPTAIL [20:0] | TX Message Feed Linked List Tail pointer. This field points to the current write address in the TX Message Feed linked list. The address associated with this pointer is TMPTAIL * 2. |

8.2 Detailed Description of Internal RAM Contents Timeslot Channel Map RAM (1024 locations—one per bibble) (0x1000-0xIFFC)

Figure 77:
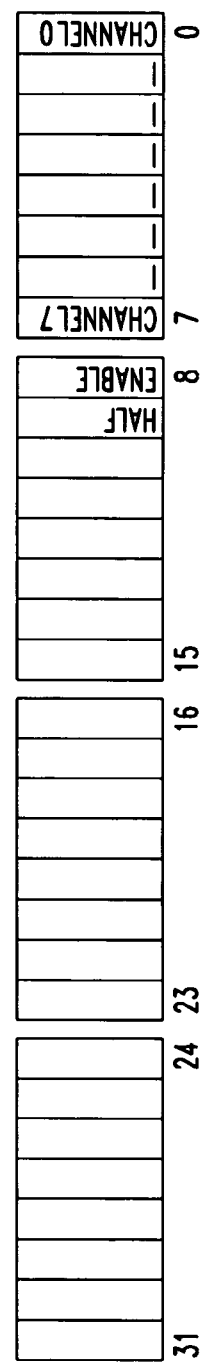
FIG. 77 is a bit field diagram of a Timeslot Channel Map RAM Register in the HDLC formatter of FIG. 1.

As previously described, the Timeslot Channel Map RAM 46 provides timeslot-to-channel mapping for serial data. Each location in this SRAM corresponds to a bibble in the serial data. The first four locations correspond to the four bibbles of the first timeslot. Each memory location includes the HALF, ENABLE and CHANNEL bit fields, illustrated in FIG. 77, as follows:

| Bit | Identifier | Description |
| --- | --- | --- |
| 9 | HALF | Determines if the second bit of the bibble should be included in the channel. 0 = include the second bit; 1 = drop the second bit. |
| 8 | ENABLE | Determines if the bibble is assigned to any channel. If enable = 0, this bibble is discarded. |
| 7–0 | CHANNEL[7:0] | Channel number corresponding to the bibble. |

Timeslot Mux RAM (256 locations—one per timeslot) (0x2000-0x23FC)

Figure 78:
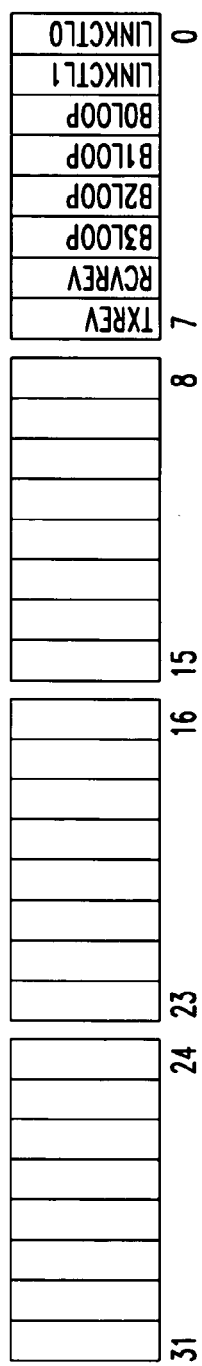
FIG. 78 is a bit field diagram of a Timeslot MUX RAM Register in the HDLC formatter of FIG. 1.

As previously described, the Timeslot Mux RAM 42 provides the timeslot multiplexing control data for the serial links. Each location in this SRAM corresponds to a timeslot in the serial data. If the TS Mux Override Register is selected, link selection is performed according to the ORLINK in the TS Mux Override Register. Loopback functions override the link selections. Note that while timeslot Muxing is performed on a times lot basis, loopback can be performed on bibbles. Each memory location includes several defined bit fields, illustrated in FIG. 78, as follows:

| Bit | Identifier | Description |
| --- | --- | --- |
| 7 | TXREV | Reverse the bit order in the transmit timeslot. Reversal is performed before assigning bits to specific bibbles. 0 = do not reverse; 1 = reverse. |
| 6 | RCVREV | Reverse the bit order in the received timeslot. Reversal is performed before assigning bits to specific bibbles. 0 = do not reverse; 1 = reverse. |
| 5 | B3LOOP | Select TX loopback data for the fourth bibble in the timeslot. 0 = do not loop; 1 = loop. |
| 4 | B2LOOP | Select TX loopback data for the third bibble in the timeslot. 0 = do not loop; 1 = loop. |
| 3 | B1LOOP | Select TX loopback data for the second bibble in the timeslot. 0 = do not loop; 1 = loop. |
| 2 | B0LOOP | Select TX loopback data for the first bibble in the timeslot. 0 = do not loop; 1 = loop. |
| 1–0 | LINKCTL[1:0] | Select the link specified in these bits for the timeslot. 0 = link 0; 1 = link 1; 2 = link 2; 3 = Override Register. |

Channel Configuration RAM (256 locations—1 per channel) (0x2400-0x27FC)

Figure 79:
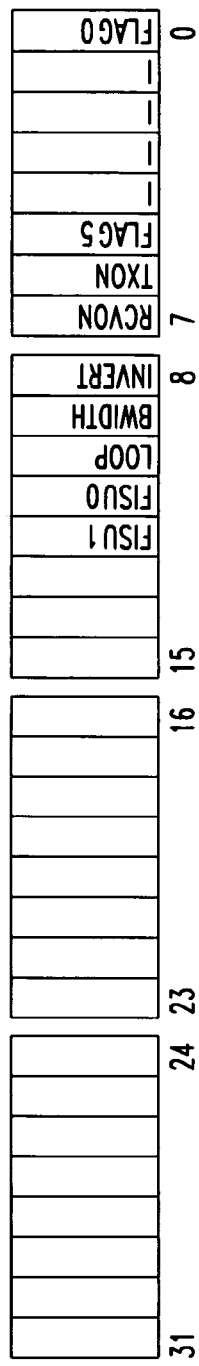
FIG. 79 is a bit field diagram of a Channel Configuration RAM Register in the HDLC formatter of FIG. 1.

As previously described, the Channel Configuration RAM 48 provides per-channel configuration information. Each memory location includes several defined bit fields, illustrated in FIG. 79, as follows:

| Bit | Identifier | Description |
| --- | --- | --- |
| 12 | FISU1 | Not used. For future FISU development. |
| 11 | FISU0 | Not used. For future FISU development. |
| 10 | LOOP | Loop the received channel message to the serial transmit side (bypassing the PCI interface). 0 = not looped; 1 = looped. |
| 9 | BWIDTH | Indicates non-timeslot-shared channel (high bandwidth). 0 = non-timeslot shared; 1 = timeslot shared. |
| 8 | INVERT | Invert the data. 0 = do not invert; 1 = invert. |
| 7 | RCVON | If 1, the receive channel is active. If 0, receive data is ignored. |
| 6 | TXON | If 1, the transmit channel is active. If 0, flags will be sent on the channel. |
| 5–0 | FLAG[5:0] | The number of additional flags to be inserted between messages. A value of 0 indicates 1 flag between messages; a value of 63 indicates 64 flags between messages. A flag is defined as the bit pattern 01111110. |

RCV Channel Head Pointer RAM (256 locations—1 per channel) (0x3000-0x33FC)

The RCV Channel Head Pointer RAM is part of the RCV Channel Pointer RAM 58. It contains the head pointers for the RCV Serial Channel linked lists. This memory is entirely hardware controlled and is accessible for hardware testing only. The memory is key protected (through the KEY bit in the Master Configuration Register). Writing to this memory will result in a catastrophic failure of the device requiring a device reset. Each memory location includes the RCPACT and RCPHEAD bit fields, illustrated in FIG. 80, as follows:

| Bit | Identifier | Description |
| --- | --- | --- |
| 16 | RCPACT | RCV Channel Active. If 1 the RCV Channel head and tail pointers are valid. |
| 15–0 | RCPHEAD[15:0] | RCV Channel Linked List Head pointer. This field points to the first block in the RCV Channel linked list. The address associated with this pointer is RCPHEAD * 64. |

RCV Channel Tail Pointer RAM (256 locations—1 per channel) (0x3400-0x37FC)

The RCV Channel Tail Pointer RAM is part of the RCV Channel Pointer RAM 58. It contains the tail pointers for the RCV Serial Channel linked lists. The memory is entirely hardware controlled and is accessible for hardware testing only. It is key protected (through the KEY bit in the Master Configuration Register). Writing to this memory will result in a catastrophic failure of the device requiring a device reset. Each memory location includes the RCPCNT and RCPTAIL bit fields, illustrated in FIG. 81, as follows:

| Bit | Identifier | Description |
| --- | --- | --- |
| 31–21 | RCPCNT[10:0] | RCV Channel Linked List Block Counter. Indicates the number of blocks used for the current message. Used to prevent massive RAM loss due to a runaway message. |
| 20–0 | RCPTAIL[20:0] | RCV Channel Linked List Tail pointer. This field points to the current write address in the RCV Channel linked list. The address associated with this pointer is RCPTAIL * 2. |

TX Channel Head Pointer RAM (256 locations—1 per channel) (0x3800-0x3BFC)

The TX Channel Head Pointer RAM is part of the TX Channel Pointer RAM 88. It contains the tail pointers for the TX Serial Channel linked lists. The memory is entirely hardware controlled and is accessible for hardware testing only. It is key protected (through the KEY bit in the Master Configuration Register). Writing to this memory will result in a catastrophic failure of the device requiring a device reset. Each memory location includes several defined bit fields, illustrated in FIG. 82, as follows:

| Bit | Identifier | Description |
| --- | --- | --- |
| 28 | TCPACT | TX Channel Active. If 1 the TX Channel head and tail pointers are valid. |
| 27 | TCPEOM | TX Channel Block End of Message. If 1 the TX Channel head pointer is in a block identified as the end of message block. |
| 26–21 | TCPCNT[5:0] | TX Channel Count. This value identifies how many valid bytes are in the block. This value only has meaning for EOM blocks. |
| 20–0 | TCPHEAD[20:0] | TX Channel Linked List Head pointer. This field points to the current read address in the TX Channel linked list. The address associated with this pointer is TCPHEAD * 2. |

TX Channel Tail Pointer RAM (256 locations—1 per channel) (0x3C00-0x3FFC)

The TX Channel Tail Pointer RAM is part of the TX Channel Pointer RAM 88. It contains the tail pointers for the RCV Serial Channel linked lists. The memory is entirely hardware controlled and is accessible for hardware testing only. It is key protected (through the KEY bit in the Master Configuration Register). Writing to this memory will result in a catastrophic failure of the device requiting a device reset. The register includes the TCPTAIL bit field, illustrated in FIG. 83, as follows:

| Bit | Identifier | Description |
| --- | --- | --- |
| 15–0 | TCPTAIL[15:0] | TX Channel Linked List Tail pointer. This field points to the last block in the TX Channel linked list. The address associated with this pointer is TCPTAIL * 64. |

8.3 Detailed Description of PCI Configuration Space Register Contents Vendor Identification Register (0x00)

This read-only register in PCI Configuration Space identifies the manufacturer of the HDLC formatter 2 with a value supplied by the PCI SIG. The register includes the VENID bit field, illustrated in FIG. 84, as follows:

| Bit | Identifier | Description |
| --- | --- | --- |
| 15–0 | VENID[15:0] | Value for Vendor ID provided by the PCI SIG. |

Device Identification Register (0x02)

This read-only register in PdI Configuration Space identifies the HDLC formatter 2 with a value supplied by the device vendor. The register includes the DEVID bit field, illustrated in FIG. 85, as follows:

| Bit | Identifier | Description |
| --- | --- | --- |
| 15–0 | DEVID[15:0] | Device Vendor ID value |

Command Register (0x04)

This register in PdI Configuration Space allows control over the HDLC formatter 2 to generate and respond to PCI cycles. When 0x00 is written to the register, the HDLC formatter 2 is logically disconnected from the PCI bus for all accesses except configuration accesses. The register includes several defined bit fields, illustrated in FIG. 86, and shown below. PERRSP, BUSMSTR, and MEMSPACE should be enabled upon initialization for normal operation in switching control module applications.

| Bit | Identifier | Description |
| --- | --- | --- |
| 15–10 | RESERVED | Read-only bits with a value of 0. |
| 9 | FBBEN | R/W bit for Fast Back to Back enable; If 0, Fast Back to Back capability is disabled. |
| 8 | SERREN | R/W bit is the enable for the SERR# driver. If 1, the SERR# driver is enabled. This bit, and bit 6, must be on to report address parity errors. |
| 7 | WTCYCCTL | Read-only bit for wait cycle control. The value 0 indicates that the HDLC formatter never does adress/data stepping. |
| 6 | PERRSP | R/W bit to define parity error response. If 0, the HDLC formatter ignores any detected parity errors and continues normal operation. |
| 5 | VGASNOOP | Read-only with a value of 0. (Unimplemented bit for VGA compatible devices.) |
| 4 | MEMWREN | Read-only bit for using the Memory Write & Invalidate command. A 0 indicates that memory write and invalidate commands are converted to memory write commands. |
| 3 | SPECCYC | Read-only with a value of 0. (Unimplemented bit for Special Cycle Monitoring). |
| 2 | BUSMSTR | R/W bit to enable bus mastering. If 0, the HDLC formatter is disabled from generating PCI accesses. |
| 1 | MEMSPACE | R/W bit to control response to memory space accesses. If 0, the HDLC formatter is unable to respond to memory space accesses. |
| 0 | IOSPACE | Read-only bit for IO space access response. A 0 indicates that the HDLC formatter does not respond to IO space accesses. |

Status Register (0x06)

This register in PCI Configuration Space records status information for PCI bus related events. Bits in this register are not written like that of a typical R/W register. A bit is reset to zero (0) whenever that bit position is written with a value of one (1). Writing a bit position with a value of zero (0) has no effect. The register includes several defined bit fields, illustrated in FIG. 87, as follows:

| Bit | Identifier | Description |
| --- | --- | --- |
| 15 | DETPERR | R/W bit set to 1 when the HDLC formatter detects a parity error, even if parity error handling is disabled by bit 6 of the Command Register. |
| 14 | SSYSERR | R/W bit set to 1 when the HDLC formatter asserts SERR# due to detecting an address parity error. Once set, this bit must be cleared to allow SERR# to be asserted again on any subsequent detection of an address parity error. |
| 13 | RCVMSTAB | R/W bit set to 1 when the HDLC formatter initiator terminates its transaction with Master Abort. |
| 12 | RCVTARAB | R/W bit set to 1 when the HDLC formatter initiator has its transaction terminated with Target Abort. |
| 11 | SIGTARAB | R/W bit set to 1 when the HDLC formatter target terminates its transaction with Target Abort. |
| 10–9 | DEVSEL[1:0] | Read-only bits for indicating the slowest time that the HDLC formatter asserts DEVSEL# for any bus command except Configuration Read or Write. The value 0x01 indicates that the HDLC formatter asserts DEVSEL# no more than 2 clocks following FRAME#. |
| 8 | DPERRDET | R/W bit set to 1 when three conditions are met: the HDLC formatter asserted PERR# or observed PERR# asserted, the HDLC formatter acted as the initiator for the operation in which the error occurred, and bit 6 of the Command Register is set. |
| 7 | FBB | Read-only bit with a value of 1 for indicating that the HDLC formatter is Fast Back to Back Capable. |
| 6 | UDFSUP | Read-only with a value of 0. (Unimplemented bit for User Definable Features). |
| 5 | 66 MHZ | Read-only bit with a value of 0. (Unimplemented bit for 66 MHz operation; HDLC formatter is not capable of 66 MHz operation.). |
| 4–0 | RESERVED | Read-only bits with a value of 0. |

Revision ID Register (0x08)

This read-only register in PCI Configuration Space records the revision number of the HDLC formatter 2 device. The register includes the REVID bit field illustrated in FIG. 88, as follows:

| Bit | Identifier | Description |
| --- | --- | --- |
| 15–0 | REVID[7:0] | Read-only bits. |

Program Interface Register (0x09)

This read-only register in PCI Configuration Space is used as a sub-field of the 24 bits of the Class Code (Program interface, Sub-Class, and Base-Class) to identify the generic function of the HDLC formatter 2. The register includes the PRGMIF bit field, illustrated in FIG. 89, as follows:

| Bit | Identifier | Description |
| --- | --- | --- |
| 7–0 | PRGMIF[7:0] | A value of 0x00 indicates the "other" category of the simple communication device group. |

Sub-Class Code Register (0x0A)

This read-only register in PCI Configuration Space is used as a sub-field of the 24 bits of the Class Code (Program interface, Sub-Class, and Base-Class) to identify the generic function of the HDLC formatter 2. The register includes the SUBCLS bit fields, illustrated in FIG. 90, as follows:

| Bit | Identifier | Description |
|---|---|---|
| 7–0 | SUBCLS[7:0] | A value of 0x80 indicates the "other" category of the simple communication device group. |

Base-Class Code Register (0x0B)

This read-only register in PCI Configuration Space is used as a sub-field of the 24 bits of the Class Code (Program interface, Sub-Class, and Base-Class) to identify the generic function of the HDLC formatter 2. The register includes the BASEECLS bit field, illustrated in FIG. 91, as follows:

| Bit | Identifier | Description |
|---|---|---|
| 7–0 | BASECLS[7:0] | A value of 0x07 indicates the "simple communication device" category. |

Latency Timer Register (0x0D)

This register in PCI Configuration Space must be implemented by any master device that can burst more than two data phases. This value specifies, in number of PCI clocks, the minimum amount of time that as bus master, the HDLC formatter 2 is permitted to retain ownership of the bus whenever it acquires bus ownership and initiates a transaction. The register includes the LATTIM bit field, illustrated in FIG. 92, as follows:

| Bit | Identifier | Description |
|---|---|---|
| 7–0 | LATTIM[7:0] | R/W latency timer value in units of PCI clocks. |

Header Type Register (0x0E)

This read-only register in PCI Configuration Space identifies the type of layout of the second part of the predefined header in user configuration space and indicates that the HDLC formatter 2 is a single function device. The register includes the MULTIFNC and HDRTYP bit fields, illustrated in FIG. 93, as follows:

| Bit | Identifier | Description |
|---|---|---|
| 7 | MULTIFNC | A value of 0 indicates the device is a single function device. |
| 6–0 | HDRTYP[6:0] | A value of 0x00 indicates the header type starting at address 0x10 is a type "00" PCI Configuration Space header. |

BIST Register (0x0F)

This register in PCI Configuration Space is used for control and status of BIST for the HDLC formatter 2. The register includes the BISTCAP, BISTACT and COMPCODE bit fields, illustrated in FIG. 94, as follows:

| Bit | Identifier | Distribution |
|---|---|---|
| 7 | BISTCAP | Read-only bit where the value of 1 indicates that the HDLC formatter is BIST capable. |
| 6 | BISTACT | R/W bit for starting BIST. Writing a 1 to this bit invokes BIST. When BIST is complete, the HDLC formatter will clear this bit. BIST is required to complete within 3 milliseconds or software should fail the device. |
| 5–4 | RESERVED | Read-only bits with a value of 00. |
| 3–0 | COMPCODE[3:0] | Read-only bits for the completion code resulting from running BIST. A value of 0x0 indicates BIST completed successfully. A value of 0xa indicates BIST failed. This field is automatically set to 0x5 by the HDLC formatter whenever bit 6 is written to 1 to initiate a BIST. This field is automatically set to 0xf by the HDLC formatter whenever bit 6 is written to 0. |

Base Address Register 0 (0x10)

This register in PdI Configuration Space is used for relocating the HDLC formatter 2 device. On power-up reset, this register is initialized to 0x00000000. Once this register is programmed via a PCI configuration cycle, the HDLC formatter 2 claims any PCI memory cycle whose address is located within 16K bytes swing at the 32 bit base address contained in this register. The register includes several defined bit fields, illustrated in FIG. 95, as follows:

| Bit | Identifier | Description |
|---|---|---|
| 31–14 | BASE[31:14] | R/W base address bits for relocating the HDLC formatter. |
| 13–4 | BASE[13:4] | Read-only base address bits with a value of 0, which in conjunction with bits 0–3, allocate 16Kbytes of memory spectrum to the HDLC formatter. |
| 3 | PREFETCH | Read-only bit with a value of 0 indicates that data is not prefetchable i.e. PCI byte enables are not always ignored. |
| 2–1 | TYPE | Read-only bits with a value of 00 indicates that this base address register is 32 bits wide and can be located anywhere in the 32 bit address space. |
| 0 | MEMSP | Read-only bit with a value of 0 indicates that this register maps to memory space. |

Interrupt Line Register (0x3C)

This read/write register in PCI Configuration Space is used for communicating interrupt line routing information for the HDLC formatter 2 to the system interrupt controller. Device drivers and operating systems typically use this information to determine priority and vector information. The HDLC formatter 2 itself does not use this value, so this register can be used as a scratch register if desired. Me register includes the INTLINE bit field, illustrated in FIG. 96, as follows:

| Bit | Identifier | Description |
|---|---|---|
| 7–0 | INTLINE[3:0] | R/W bits for indicating which line of the system interrupt controller the HDLC formatter INTA pin is connected to. |

Interrupt Pin Register (0x3D)

This read-only register in PdI Configuration Space specifies which interrupt pin the HDLC formatter 2 uses. The register includes the INTPIN bit field, illustrated in FIG. 97, as follows:

| Bit | Identifier | Description |
| --- | --- | --- |
| 7–0 | INTPIN[7:0] | Read-only bits; a value of 0x01 indicates the INTA pin is used for the HDLC formatter interrupt. |

Minimum Grant Register (0x3E)

This read-only register in PCI Configuration Space specifies the minimum grant latency the HDLC formatter 2 should use. The register includes the MINGRT bit field, illustrated in FIG. 98, as follows:

| Bit | Identifier | Description |
| --- | --- | --- |
| 7–0 | MINGRT[7:0] | Read-only bits; a value of 0x00 indicates that the HDLC formatter has no major requirement for minimum grant latency. |

Maximum Latency Register (0x3F)

This read-only register in PCI Configuration Space specifies the maximum latency the HDLC formatter 2 should use when gaining access to the PCI bus. The register includes the MAXLAT bit field, illustrated in FIG. 99, as follows:

| Bit | Identifier | Description |
| --- | --- | --- |
| 7–0 | MAXLAT[7:0] | Read-only bits; a value of 0x00 indicates that the HDLC formatter has no major requirement for maximum latency. |

Accordingly, a high speed multi-port serial-to-PCI bus interface has been described. While various embodiments have been disclosed, it should be apparent that many variations and alternative embodiments could be implemented in accordance with the invention. It is understood, therefore, that the invention is not to be in any way limited except in accordance with the spirit of the appended claims and their equivalents.

What is claimed is:

1. In a combination including an HDLC formatter and a message processing core, a high speed message exchange interface for transferring messages between said HDLC formatter and said message processing core with minimal utilization of processing resources, comprising:

a memory shared by said HDLC formatter and said message processing core;

a handshaking system for coordinating message storage and retrieval in said shared memory by said HDLC formatter and said message processing core, said handshaking system implementing an information exchange mechanism whereby said HDLC formatter and said message processing core share memory location information relative to messages said HDLC formatter and said message processing core have respectively stored and retrieved in said shared memory;

said information exchange mechanism being periodically initiated by said processor core accessing said HDLC formatter;

said handshaking system including a shared storage location in said HDLC formatter containing pointers that provide information about locations in said shared memory where receive messages have been stored and transmit messages have been retrieved by said HDLC formatter, where transmit messages have been stored by said message processing core, and where receive messages can be stored by said HDLC formatter;

said pointers including first and second pointers written by said HDLC formatter and respectively indicating where messages have been stored and retrieved in said shared memory by said HDLC formatter, and third and fourth pointers written by said message processing core and respectively indicating where messages have been stored in said shared memory by said message processing core and where messages can be stored by said HDLC formatter;

said pointers being index pointers that point to locations in corresponding FIFOs, each FIFO containing pointers to message blocks in said shared memory;

said FIFOs including a RCV FIFO for Receive messages placed in said shared memory by said HDLC formatter and a TX FIFO for Transmit messages placed in said shared memory by said message processing core;

said shared location containing said pointers being part of said HDLC formatter but accessible by said message processing core via single-beat PCI bus accesses;

said first pointer pointing to a location in said RCV FIFO that contains a pointer to a last Receive message stored in said shared memory by said HDLC formatter;

said second pointer pointing to a location in said TX FIFO that contains a pointer to a last Transmit message retrieved from said shared memory by said HDLC formatter;

said third pointer pointing to a location in said RCV FIFO that contains a pointer to a last Receive message buffer area made available in said shared memory by said message processing core; and said fourth pointer pointing to a location in said TX FIFO that contains a pointer to a last Transmit message stored in said shared memory by said message processing core.

2. A combination in accordance with claim 1 further including a high priority message override system for bypassing said TX FIFO for high priority messages.

3. A combination in accordance with claim 2 further including a bus extending between said HDLC formatter and said message processing core, and a bus communication system for performing HDLC formatter-initiated burst transfers of messages over said bus between said HDLC formatter and said shared memory.

4. A combination in accordance with claim 1 wherein said combination includes a plurality of said HDLC formatters sharing said shared memory with said message processing core.

5. A combination in accordance with claim 1 wherein said messages are written as blocks from said HDLC formatter to said shared memory, with the first message block being written last in order to allow collection of message header information.

6. A combination in accordance with claim 1 wherein cyclic redundancy checking (CRC) is performed on said messages as they are written from said HDLC formatter to said shared memory.

7. A combination in accordance with claim 1 wherein said HDLC formatter includes a message buffer memory for temporarily storing said messages in linked lists of message buffer memory blocks, each of said linked lists corresponding to a message-bearing channel.

8. A combination in accordance with claim 7 further including a scrub system for clearing said message buffer memory of blocks that have become disassociated morn said linked lists.

9. A combination in accordance with claim 7 further including a message buffer memory throttle for providing notification of high message buffer memory usage and throttling the reading of messages from said shared memory by the HDLC formatter until message buffer memory usage decreases.

10. A combination in accordance with claim 7 further including a linked list integrity checker means for isolating errors in one of said message bearing channels to prevent said errors from affecting other message bearing channels, and for providing recovery from corrupted linked lists.

11. A combination in accordance with claim 7 further including a message loopback system for looping back messages by exchanging pointers to said linked lists between a Receive side of said HDLC formatter and a Transmit side of said HDLC formatter.

12. A combination in accordance with claim 7 wherein said HDLC formatter further includes:
   a first linked list controller for assembling Receive message linked lists for Receive message storage in said message buffer memory;
   a second linked list controller for disassembling said Receive message linked lists for Receive message retrieval from said message buffer memory;
   a third linked list controller for assembling Transmit message linked lists for Transmit message storage in said message buffer memory; and
   a fourth linked list controller for disassembling said Transmit message linked lists for Transmit message retrieval from said message buffer memory.

13. A combination in accordance with claim 12 wherein said linked list controllers operate independently of each other with assigned access priorities to said message buffer memory.

14. A combination in accordance with claim 12 wherein some of said message bearing channels are high bandwidth channels corresponding to a single serial link timeslot, and other of said message bearing channels are low bandwidth channels that share correspondence to one or more serial link timeslots with other low bandwidth channels, and wherein in said combination further includes a dual prefetch system for retrieving Transmit messages from said Transmit message linked lists, said prefetch system providing real-time data access for said high bandwidth message channels and batch data access for said low bandwidth message channels.

15. A combination in accordance with claim 1 wherein said HDLC formatter includes a serial link input interface for inputting RCV messages into said HDLC formatter in multiple timeslots.

16. A combination in accordance with claim 15 further comprising a link selector for performing link select changes, said link selector including a timeslot MUX memory and timeslot MUX override register that provides link selection information to said timeslot MUX memory.

17. A combination in accordance with claim 15 wherein said HDLC formatter includes a serial link output interface for sending Transmit messages out of said HDLC formatter in multiple timeslots, and further including a serial loopback system including a serial loopback random access memory for looping back messages from said output interface to said input interface.

18. A method for rapid, high volume message exchange between an HDLC formatter and a message processing core, comprising the steps of:
   establishing a shared memory for storing said messages, said shared memory being independently accessible by said HDLC formatter and said message processing core;
   establishing a RCV FIFO containing pointers to Receive messages placed in said shared memory by said HDLC formatter and a TX FIFO containing pointers to Transmit messages placed in said shared memory by said message processing core;
   establishing a shared storage location containing index pointers to said FIFOs, said pointers including:
   a first index pointer pointing to a location in said RCV FIFO that contains a pointer to the last Receive message stored in said shared memory by said HDLC formatter;
   a second index pointer pointing to a location in said TX FIFO that contains a pointer to the last Transmit message retrieved from said shared memory by said HDLC formatter;
   a third index pointer pointing to a location in said RCV FIFO that contains a pointer to the last Receive message buffer area made available in said shared memory by said message processing core; and
   a fourth index pointer pointing to a location in said TX FIFO that contains a pointer to the last Transmit message stored in said shared memory by said message processing core; and
   said HDLC formatter and said message processing core using said index pointers to negotiate access to said share memory.

19. A combination comprising:
   an HDLC formatter;
   a message processing core for processing messages;
   said HDLC formatter having a serial interface for receiving/transmitting messages on one or more serial links carrying said messages in multiple timeslots;
   said HDLC formatter further including a timeslot-to-channel conversion circuit for extracting message information from said serial timeslots and placing it in corresponding message bearing channels;
   said HDLC formatter being adapted to access a message buffer memory for storing messages waiting to be transferred to, and which have been received from, said message processing core; said message buffer memory maintaining a linked list for each of said message bearing channels to store messages relative to each channel;
   said HDLC formatter further including a parallel interface for transferring said messages to and from said message processing core;
   said message processing core including a processor for processing messages provided by said HDLC formatter;
   a shared memory for storing said messages, said shared memory being independently accessible by said HDLC formatter and said message processing core;
   a RCV FIFO containing pointers to RCV messages placed in said shared memory by said HDLC formatter;
   a TX FIFO containing pointers to TX messages placed in said shared memory by said message processing core;

a shared storage location containing index pointers to said
FIFOs, said pointers including:

a first index pointer pointing to a location in said RCV
FIFO that contains a pointer to the last RCV message
stored in said shared memory by said HDLC formatter;

a second index pointer pointing to a location in said TX
FIFO that contains a pointer to the last TX message
retrieved from said shared memory by said HDLC
formatter;

a third index pointer pointing to a location in said RCV
FIFO that contains a pointer to the last RCV message
buffer area made available in said shared memory by
said message processing core; and a fourth index pointer pointing to a location in said TX
FIFO that contains a pointer to the last TX message
stored in said shared memory by said message processing core; and respective means in said HDLC formatter and said message processing core for utilizing said index pointers to
negotiate access to said shared memory.

* * * * *